United States Patent
Watanabe

(10) Patent No.: US 8,810,825 B2
(45) Date of Patent: Aug. 19, 2014

(54) ENHANCED CLOUD PRINT SYSTEM, APPARATUS AND METHOD

(75) Inventor: Atsushi Watanabe, River Edge, NJ (US)

(73) Assignee: Ricoh Company, Ltd., Tokyo (JP)

(*) Notice: Subject to any disclaimer, the term of this patent is extended or adjusted under 35 U.S.C. 154(b) by 182 days.

(21) Appl. No.: 13/427,367

(22) Filed: Mar. 22, 2012

(65) Prior Publication Data
US 2013/0222827 A1 Aug. 29, 2013

Related U.S. Application Data

(63) Continuation-in-part of application No. 13/405,704, filed on Feb. 27, 2012, now Pat. No. 8,760,679.

(51) Int. Cl.
*G06F 15/00* (2006.01)

(52) U.S. Cl.
USPC .......................................................... 358/1.14

(58) Field of Classification Search
CPC .............................. G06F 3/1238; G06F 3/1239
USPC ........................................................ 358/1.14
See application file for complete search history.

(56) References Cited

U.S. PATENT DOCUMENTS

| 6,181,893 B1 | 1/2001 | Collard et al. |
| 2001/0000027 A1 | 3/2001 | Collard et al. |
| 2002/0135797 A1 | 9/2002 | Al-Kazily et al. |
| 2008/0030769 A1 | 2/2008 | Hanaoka et al. |
| 2009/0225334 A1* | 9/2009 | Takamiya et al. .............. 358/1.9 |
| 2010/0106958 A1 | 4/2010 | Watanabe |
| 2011/0176163 A1 | 7/2011 | Towata |
| 2012/0044088 A1 | 2/2012 | Watanabe et al. |
| 2013/0163027 A1* | 6/2013 | Shustef ........................ 358/1.14 |

FOREIGN PATENT DOCUMENTS

EP 0944239 9/1999

OTHER PUBLICATIONS

U.S. Appl. No. 13/405,704, filed Feb. 27, 2012.
European Search Report dated Jan. 15, 2014 in corresponding European patent application No. 13 15 6834.7.

* cited by examiner

*Primary Examiner* — Saeid Ebrahimi Dehkordy
(74) *Attorney, Agent, or Firm* — Cooper & Dunham LLP

(57) ABSTRACT

Systems, apparatus and methods are provided to allow users to print to a print device from their computers or portable devices through a cloud print service. In an aspect, each of a client terminal and a guest terminal can access the print device through the cloud print service. In another aspect, the print device can be provided with a user interface that allows a guest to retrieve a print job submitted through the cloud print service, as well as allow a user having user credentials to retrieve a submitted job. Many other cloud print features can be included.

20 Claims, 40 Drawing Sheets

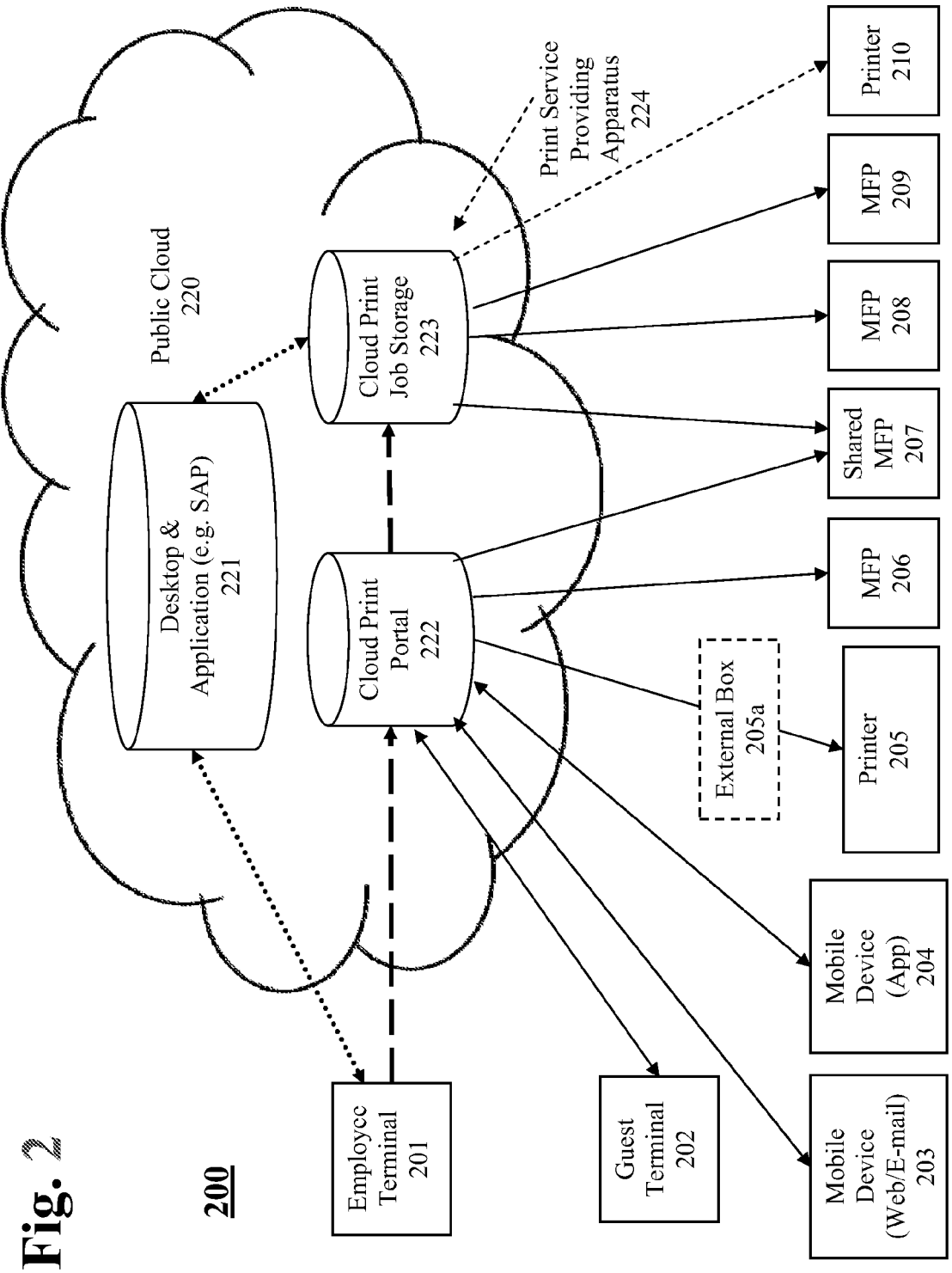

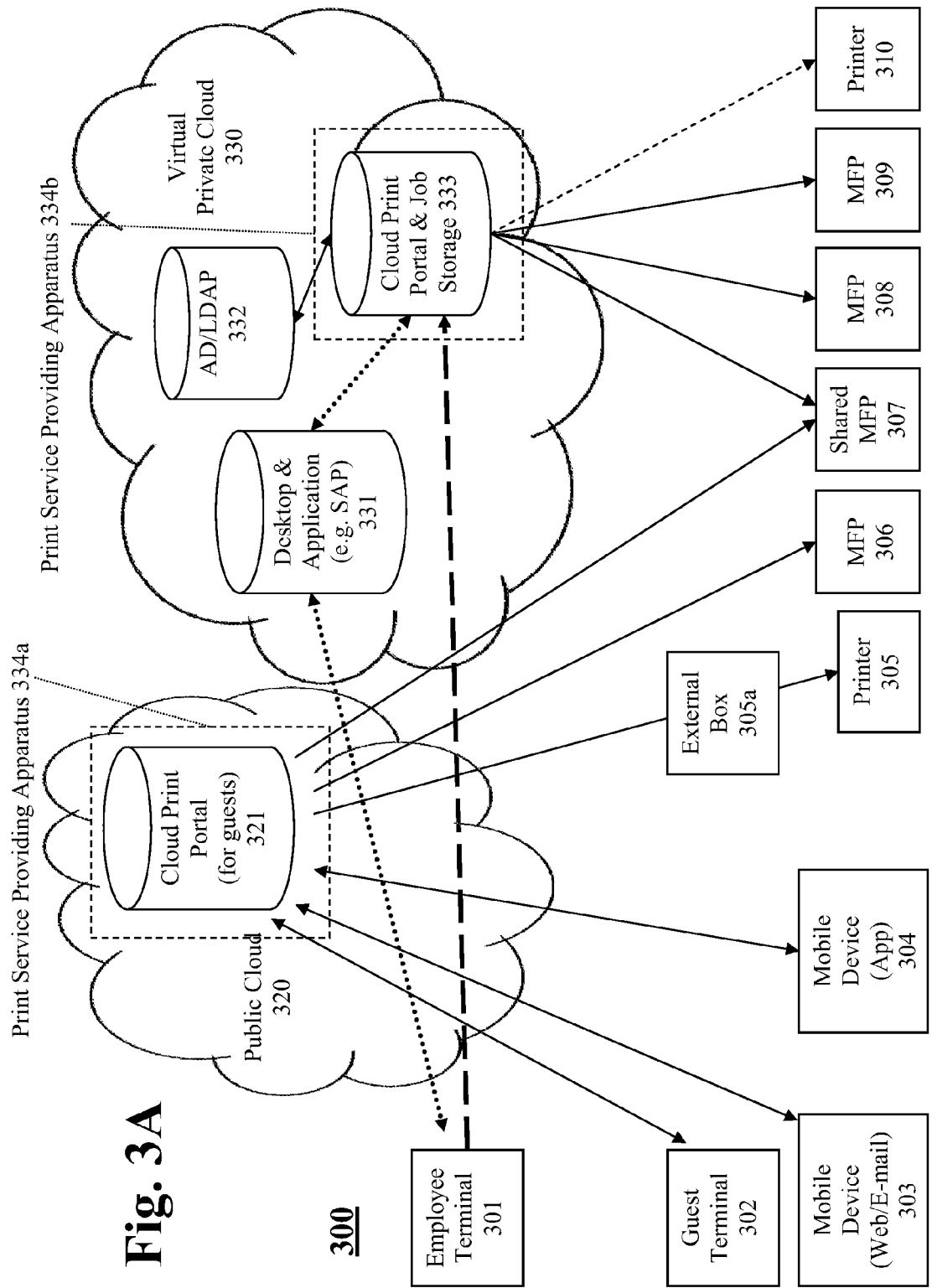

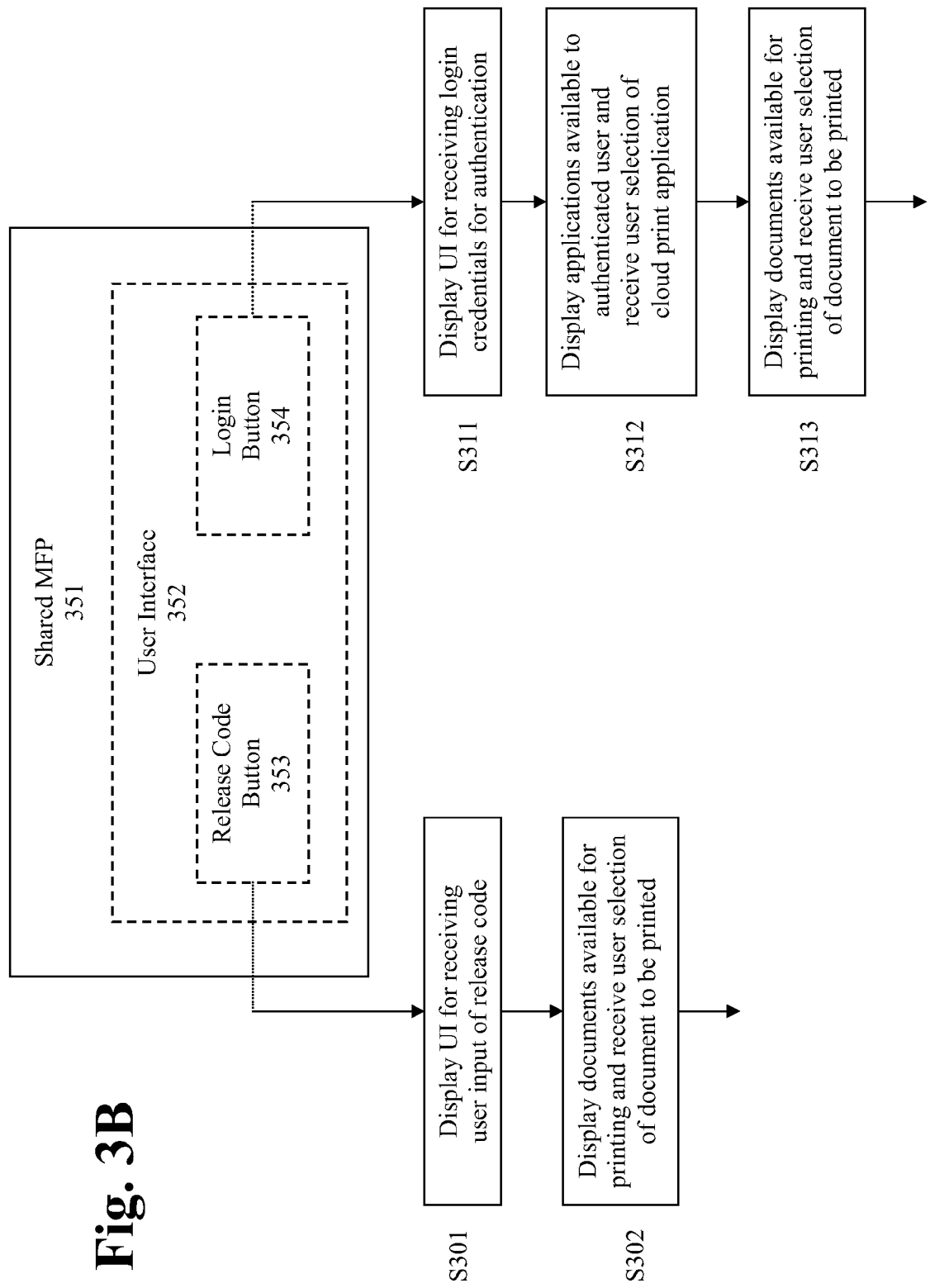

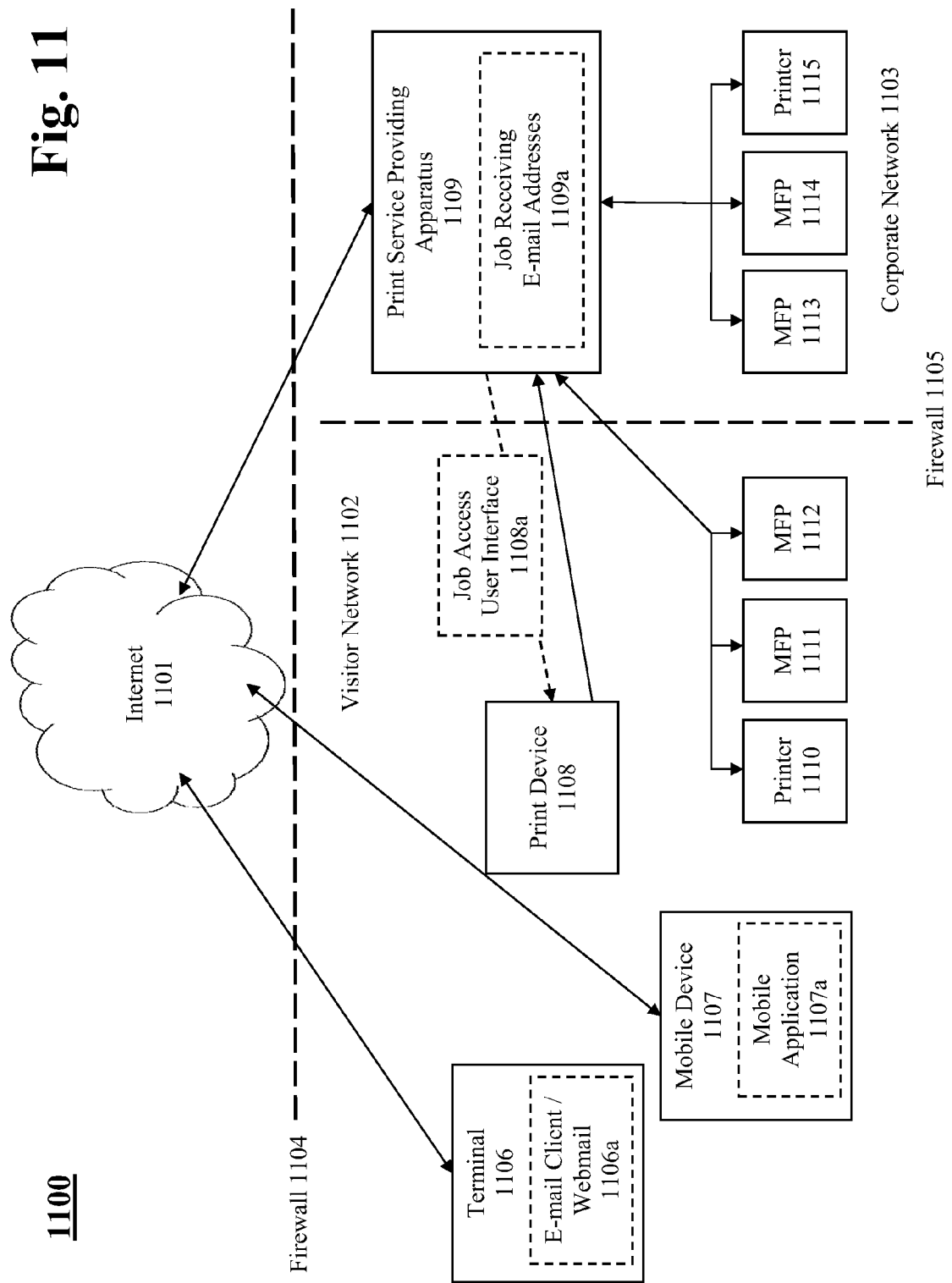

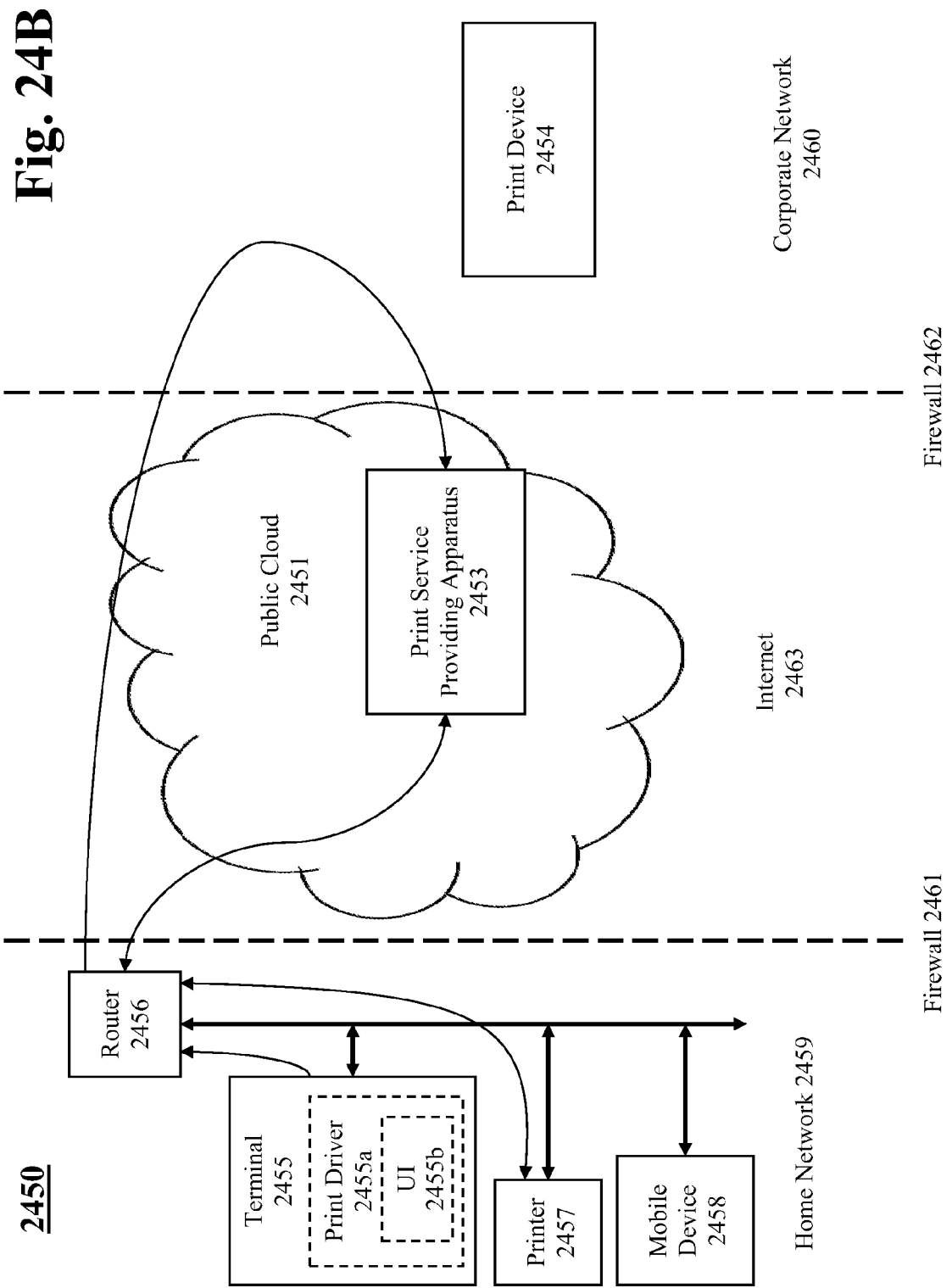

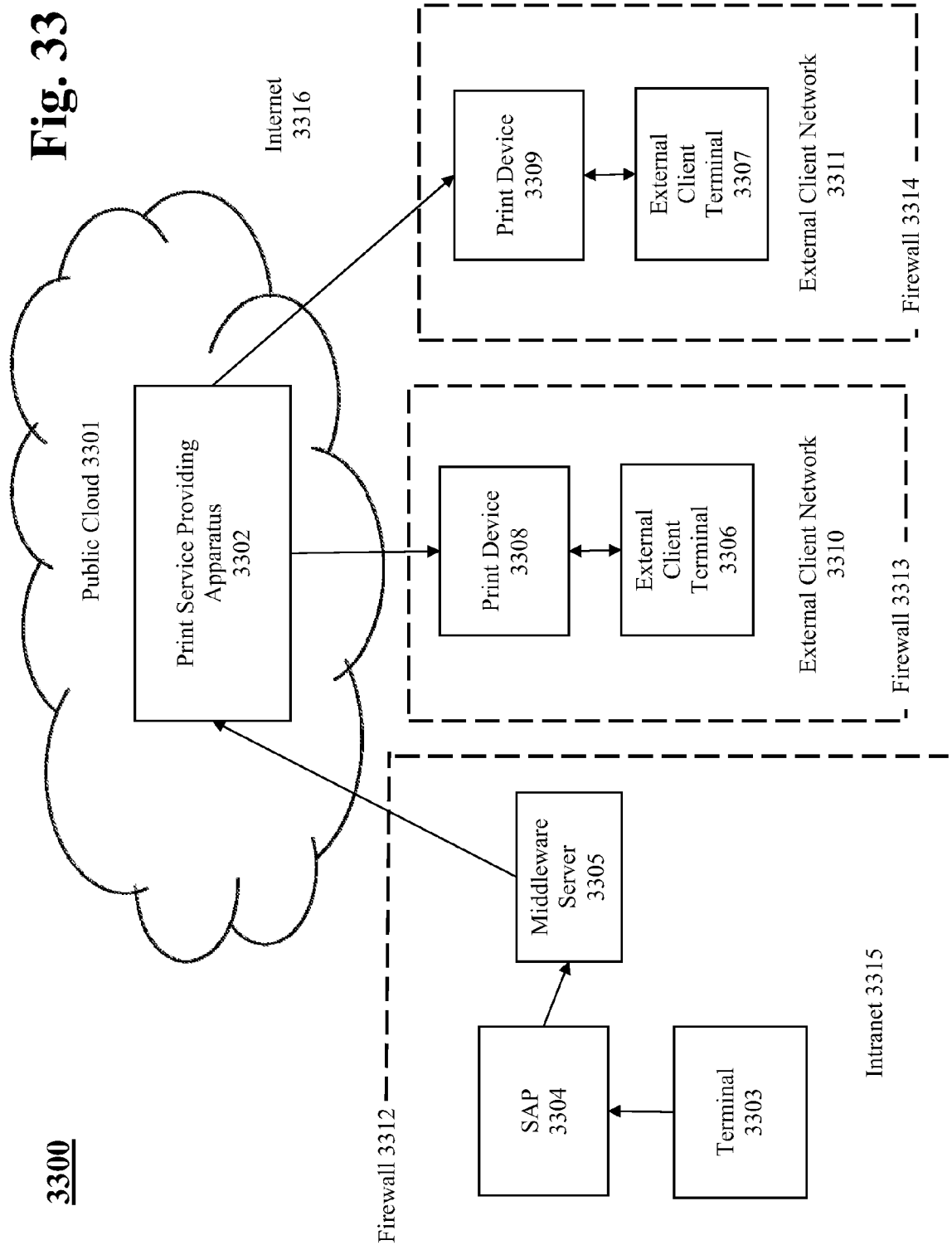

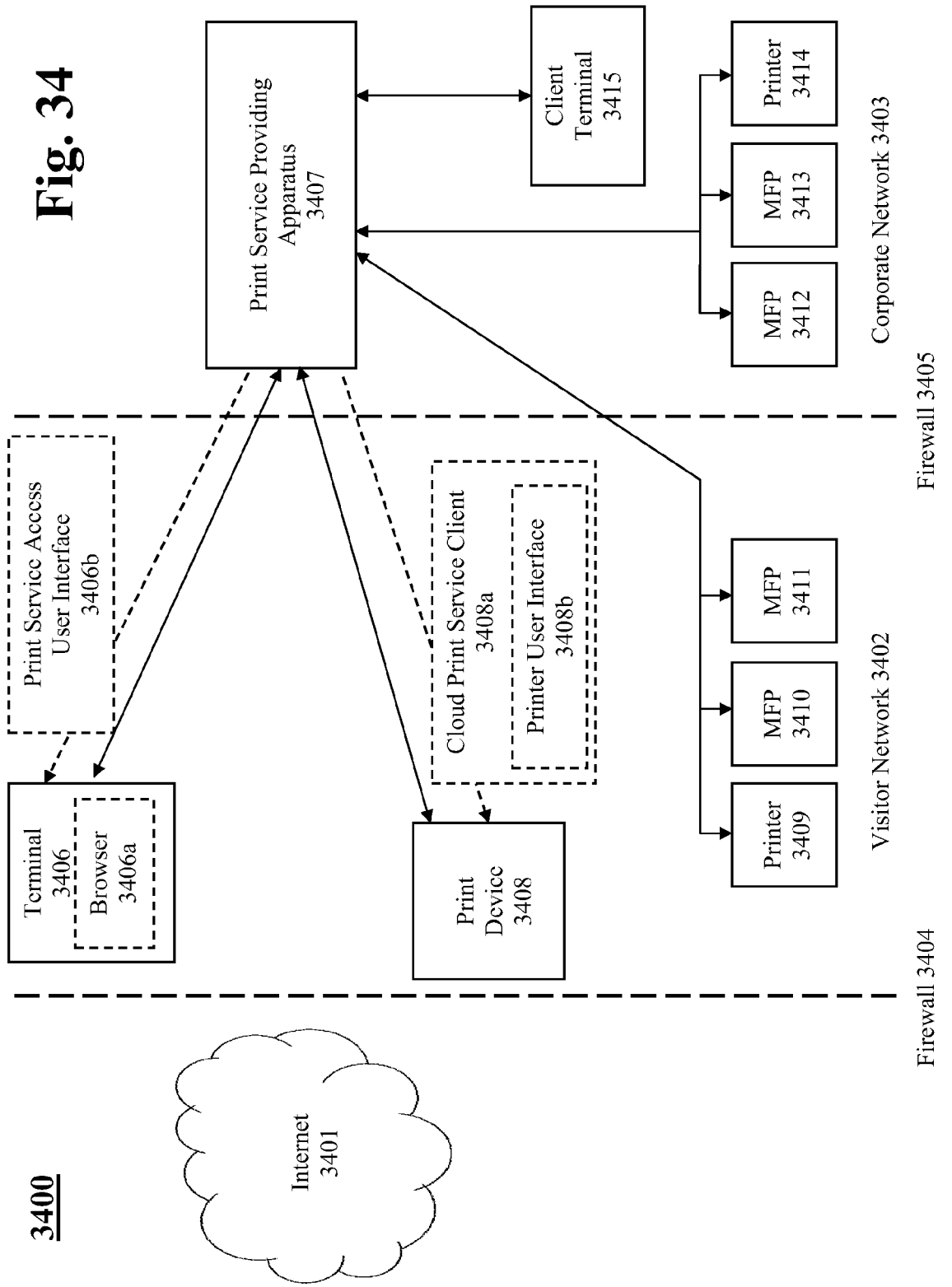

ENHANCED CLOUD PRINT SYSTEM, APPARATUS AND METHOD

CROSS-REFERENCE TO RELATED APPLICATION

This application is a continuation-in-part of U.S. patent application Ser. No. 13/405,704, filed Feb. 27, 2012 now U.S. Pat. No. 8,760,679 and entitled "CLOUD PRINT SERVICE".

TECHNICAL FIELD

This disclosure relates to tools, such as systems, apparatuses, methodologies, computer program products, etc., for enhancing a cloud printing.

BACKGROUND

In the current digital age, the trend is that more and more tasks involve use of information technology (IT) and digital media. As an example, digital books and e-book readers are becoming very popular and are supplanting printed books and other printed publications.

In addition, enterprises (particularly, large organizations) are starting to integrate provisions in its IT environment for printing from a mainframe or application server (e.g., Oracle, SAP, etc.) on a corporate network to a printer for visitors (such as a supplier, a contractor, etc.). On the other hand, facsimile, extranet or VPN (virtual private network) connection is frequently used for communicating between a corporate office and a supplier.

However, printing remains a part of many daily tasks, such as, for example, generating, finalizing and archiving legal documents, distributing pamphlets, brochures and other marketing literature, issuing receipts at brick-and-mortar establishments, etc.

The proliferation of mobile devices (e.g., smartphones, PDAs, other handsets, tablet computers, notebook computers, etc.) has created a need for users of such devices to be able to conveniently print documents from their mobile devices to a nearby printing device, rather than having to transfer the documents onto a computer that is configured specifically to print from such printing device. Indeed, many mobile devices today lack print capabilities. Thus, for example, if a traveling businessperson wanted to print out some of the notes that he or she took on a mobile device (or an e-mail, including optionally an attachment thereof) before a meeting, he or she would have to e-mail the notes to a web-accessible e-mail address and retrieve and print the e-mail at a public print center (e.g., FedEx Kinko's, FedEx, Mail Boxes, Etc., other public print facility, etc.). On the other hand, the information may be confidential, proprietary, or other otherwise highly sensitive, in a manner that deters one from obtaining a hardcopy at a public facility (and potentially exposing such sensitive information to the public).

There remains a need for an improved method of printing that allows visitors and employees at a corporate office, or traveling businessperson, to more conveniently print from a mobile device.

SUMMARY

Systems apparatuses, methodologies and computer program products can be provided for users to print using a cloud print service.

In an aspect of this disclosure, a print service providing apparatus is configured to receive a guest-submitted print job file from a guest terminal device via a network, register the received guest-submitted print job file in association with a release code, and send the release code through the network to the guest terminal device, wherein the release code is entered through a guest user interface provided by a print apparatus, and the print apparatus retrieves the guest-submitted print job file associated with the release code from the print service providing apparatus to generate a printout based on the guest-submitted print job file.

In another aspect of this disclosure, a print service providing apparatus is configured to receive a guest-submitted print job file from a guest terminal device via a network, register the received guest-submitted print job file in association with a release code, and send the release code through the network to the guest terminal device, wherein the guest-submitted print job file is submitted through one of a browser application, a mobile application and an e-mail address.

In another aspect of this disclosure, a print service providing apparatus is configured to receive and authenticate user credentials from a client terminal device, receive a credentialed print job from the client terminal device via a network and store the credentialed print job in association with the received user credentials, wherein the user credentials are entered through a credentialed user interface of a print apparatus, and the print apparatus retrieves print jobs associated with the user credentials.

In another aspect of the present disclosure, a print service providing apparatus is configured to receive and store a print job via a print request e-mail sent by a user, process the print request e-mail including the print job, and push the print job to a print apparatus.

In another aspect of the present disclosure, a client terminal device, connected to a print service providing apparatus for providing cloud print service, includes a print driver to access the cloud print service, wherein the print driver provides a user interface for user selection, for pick-up of a printout, of (a) entry of user credentials or (b) entry of release code, at a print apparatus.

In another aspect of the present disclosure, a client terminal device, connected to a print service providing apparatus for providing cloud print service, causes a mobile application or a browser application to display a user interface for user selection, for pick-up of a printout, of (a) entry of user credentials or (b) entry of release code, at a print apparatus.

In another aspect of the present disclosure, a print service providing apparatus is configured to provide a cloud print service outside of a firewall of an enterprise environment by receiving and uploading a particular print job from a user terminal and communicating the uploaded print job to a print apparatus connected to a network external to the enterprise environment to generate a printout.

In another aspect of the present disclosure, a print service providing apparatus is configured to provide a cloud print service, maintain, for each printed job of plural print jobs, job information of the printed job including a number of pages printed, and track a total number of pages printed in the plural print jobs.

The aforementioned aspects and features enable printing service to be easily added, even if there is a network boundary (e.g., by a corporate network, extra network for visitors, etc.) between a mainframe or application server and a printer.

BRIEF DESCRIPTION OF THE DRAWINGS

The aforementioned and other aspects, features and advantages can be better understood from the following detailed description with reference to the accompanying drawings wherein:

FIG. 2 shows a block diagram of a system, according to another exemplary embodiment;

FIG. 3A shows a block diagram of a system, according to another exemplary embodiment;

FIG. 3B shows a user interface and two flowcharts corresponding to two print modes, according to an exemplary embodiment;

FIG. 11 shows a block diagram of a system, according to another exemplary embodiment;

FIG. 24B shows a block diagram of a system, according to another exemplary embodiment;

FIG. 33 shows a block diagram of a system, according to another exemplary embodiment; and FIG. 34 shows a block diagram of a system, according to another exemplary embodiment.

DETAILED DESCRIPTION

Figure 1:
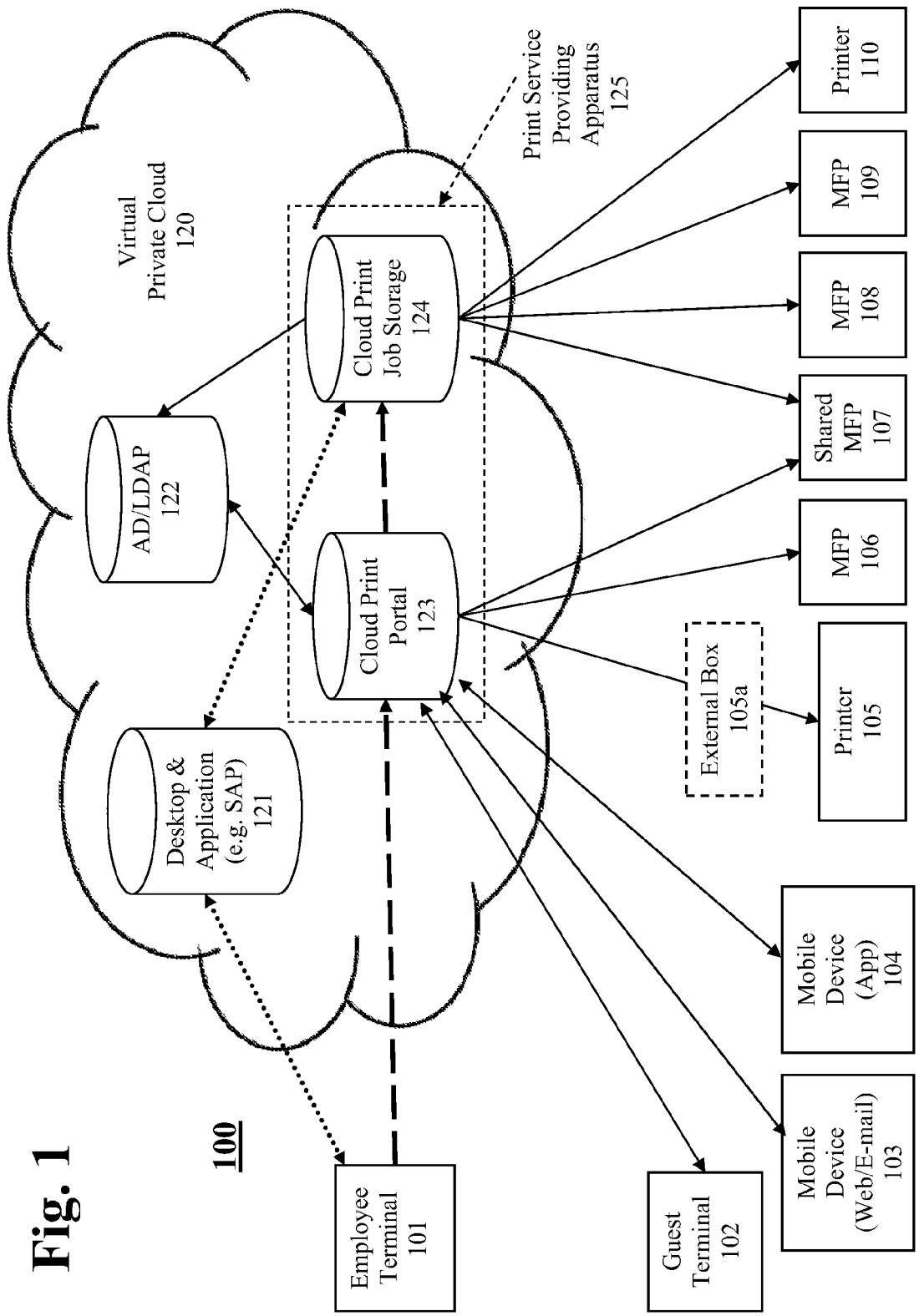
FIG. 1 shows a block diagram of a system, according to an exemplary embodiment.

This disclosure provides tools (in the form of apparatuses, methodologies and systems) for allowing users to print to a printing device from their computers or portable devices in an unconventional manner through a cloud print service. Such service can be provided through a public cloud (e.g., applications delivered in a Software-as-a-Service model over the Internet, and optionally one or more types of networks, computing resources such as storage or compute cycles delivered in an infrastructure-as-a-service model, etc.) or a virtual private cloud (similar to public cloud, except that the connection is via a virtual private network through the Internet and optionally one or more types of networks), in order to take advantage of the connectivity options that are already available through the Internet.

In describing examples and exemplary embodiments illustrated in the drawings, specific terminology is employed for the sake of clarity. However, this disclosure is not intended to be limited to the specific terminology so selected and it is to be understood that each specific element includes all technical equivalents that operate in a similar manner.

In the present disclosure, the terms "corporate network" and "enterprise network" are used interchangeably. However, it should be appreciated that a corporate entity may (but is not required to) have multiple offices, and therefore the corporate network may span across multiple cities, states, countries, continents, etc. Likewise, an enterprise may (but is not required to) include multiple corporate (or other) entities, and may span across various geo-political boundaries.

Referring now to the drawings, wherein like reference numerals designate identical or corresponding parts throughout the several views, FIG. 1 shows a block diagram of a system 100, according to an exemplary embodiment of the present disclosure. The system 100 includes an employee terminal 101, a guest terminal 102, a mobile device (web/e-mail) 103, a mobile device (app) 104, a printer 105 (coupled to an external box 105a), a multi-function peripheral (MFP) 106, a shared MFP 107, MFPs 108 and 109, a printer 110 and a virtual private cloud 120.

The virtual private cloud 120 is a private cloud existing within a shared or public cloud. The resources allocated to the virtual private cloud 120 are not accessible by the public. As shown in FIG. 1, desktop & application 121, active directory (AD)/lightweight directory access protocol (LDAP) 122, a cloud print portal 123 and cloud print job storage 124 are accessible through the virtual private cloud 120. The cloud portal 123 and the cloud print job storage 124 constitute a print service providing apparatus 125 as described in the present disclosure.

The desktop & application 121 allows users to print using a virtual desktop or print from applications on the virtual private cloud 120. For example, the virtual desktop allows a user to perform tasks such as printing on the virtual private cloud 120 through a terminal acting as a thin client (i.e. the data storing and processing are performed on the servers in the cloud). The user can also access applications on the virtual private cloud 120 such as SAP or Google Docs.

The AD/LDAP 122 includes a directory service responsible for authenticating and authorizing users and computers within the network, and an application protocol used by the directory service for accessing and maintaining distributed directory information services. For example, the AD/LDAP 122 verifies the corporate domain or authenticates user login credentials (e.g., a username and a password) by communicating with the cloud print portal 123 and the cloud print job storage 124 when a print job is submitted from an office employee via the employee terminal 101.

In addition, a combination or a subset of a plurality of web servers, e-mail servers, rendering servers and file servers may be accessible through the virtual private cloud 120 and utilized to facilitate the operation of the system 100.

The cloud print portal 123 allows a user to log in and upload print jobs (e.g., documents) for printing, for example, via a web portal. The cloud print portal 123 connects to the AD/LDAP 122 to authenticate the login credentials submitted by the user. If the user is an employee, for example, connecting from the employee terminal 101, the cloud print portal 123, upon proper authentication of the user, uploads the print jobs submitted by the user to the cloud print job storage 124. For example, the print jobs are communicated to the cloud print job storage 124 utilizing a page description language (PDL) including one or more Printer Job Language (PJL) commands, in a format which can be processed by the printing device. In addition, the cloud print job storage 124 receives SAP print jobs sent from the desktop & application 121. Such print jobs are preferably registered in association with the login credentials of the authenticated user.

The employee could be using the employee terminal 101 from various locations such as his or her home, a public network, a corporate network in the corporate office, or a visitor network in the corporate office. Typically, the visitor network is accessible by the visitors of the company as well as the company employees, and in FIG. 1, the printing devices such as the printer 105, the MFP 106 and the shared MFP 107 are connected to the visitor network. In contrast, the corporate network is accessible only by the company employees, and in FIG. 1, the shared MFP 107, the MFPs 108 and 109, and the printer 110 are connected to the corporate network. Thus, the shared MFP 107, for example, can be utilized to execute print requests from both visitors and employees.

In addition to printing from applications or via a virtual desktop on the cloud or through a web portal via a browser, the user can also submit the print jobs by e-mail. When a print job is received by the cloud print portal 123, the cloud print portal 123 sends a reply e-mail including a release code to be used for retrieving a printout at one of the printers. Such a method is further discussed infra with reference to FIG. 10A.

The print jobs stored in the cloud print job storage 124 can later be retrieved and printed from any of the corporate printers (i.e. the MFPs 108 and 109 and the printer 110) or the shared printers (i.e. the shared MFP 107). Such a method of printing (i.e. pull-printing) is further discussed infra with reference to FIG. 17.

The cloud print portal 123 also allows visitors, for example, connecting from the guest terminal 102, the mobile device (web/e-mail) 103 or the mobile device (app) 104, to utilize the virtual private cloud 120 to print from any of the guest printers (i.e. the printer 105 and the MFP 106) or the shared printers (i.e. the shared MFP 107). Visitors can also upload print jobs (e.g., documents) using a web portal or submit them using an e-mail client (e.g., Microsoft Outlook, Mozilla's Thunderbird or Apple's Mail) or webmail (e.g., Gmail, Yahoo! Mail or Hotmail), in a manner similar to those discussed above in connection with the case of employees.

When a print job is uploaded to the cloud print portal 123, the print job can be spooled to be rendered at a later time or immediately rendered into a printable image. Rendering servers and printer drivers accessible through the virtual private cloud facilitate such rendering operations.

Upon receiving a print job from the visiting user, the cloud print portal 123 sends a release code back to the visiting user, either through the web portal or by a reply e-mail, preferably along with an instruction for using the release code. The visiting user can then enter this release code at any of the guest printers or shared printers (e.g., the printer 105), and receive a printout of the print job submitted by the visiting user.

The printer 105, for example, is coupled to the external box 105a which facilitates the entry of the release code or login credentials by the user. Further, the external box 105a facilitates the communication between the printer 105 and the cloud print portal 123 (or the print service providing apparatus 125). The printer 105 could be manufactured by one of a variety of manufacturers, including ones unknown or unrecognized by the print service providing apparatus 125, and in such a case, the external box 105a can allow the cloud print portal 123 and the printer 105 to communicate with each other.

For each print job printed by the printer 105, for example, printed job information is registered with the print service providing apparatus 125. The printed job information may, for example, include a number of pages printed in connection with a particular print job. The print service providing apparatus 125 may maintain a total number of pages printed in a particular set of print jobs, or maintain a separate total count for each visitor or employee and the particular printer (e.g., the printer 105 or any of the other print devices shown in FIG. 1). The total number of pages printed by a particular employee may be tracked using the login credentials of the employee.

The system 100 illustrated in FIG. 1 represents a system that can be implemented by, for example, a typical large company which prefers to set up its own cloud.

As discussed above, the virtual private cloud 120 and the various applications and devices accessible through the virtual private cloud 120 allow employees and visitors of a corporate office, for example, to utilize the virtual private cloud 120 for printing from their terminals and mobile devices.

FIG. 2 shows a block diagram of a system 200, according to another exemplary embodiment of the present disclosure. The system 200 includes an employee terminal 201, a guest terminal 202, a mobile device (web/e-mail) 203, a mobile device (app) 204, a printer 205 (coupled to an external box 205a), a MFP 206, a shared MFP 207, MFPs 208 and 209, a printer 210 and a public cloud 220. The public cloud 220 includes desktop & application 221, a cloud print portal 222 and cloud print job storage 223. The cloud portal 222 and the cloud print job storage 223 constitute a print service providing apparatus 224 as described in the present disclosure.

The system 200 differs from the system 100 of FIG. 1 in that the system 200 is missing the AD/LDAP for authenticating users and that the system 200 has the public cloud 220 instead of the virtual private cloud 120. The public cloud 220 represents a network in which a service provider makes resources, such as applications and storage, available to the general public over the Internet. Otherwise, the operation of the system 200 is similar to that of the system 100.

The system 200 illustrated in FIG. 2 represents a system that can be implemented by, for example, a mid-sized company which would prefer to use a public cloud offered by various public cloud providers such as Amazon, Google or Microsoft.

FIG. 3A shows a block diagram of a system 300, according to another exemplary embodiment of the present disclosure. The system 300 includes an employee terminal 301, a guest terminal 302, a mobile device (web/e-mail) 303, a mobile device (app) 304, a printer 305 (coupled to an external box 305a), a MFP 306, a shared MFP 307, MFPs 308 and 309, a printer 310, a public cloud 320 and a virtual private cloud 330. The public cloud 320 includes a cloud print portal (for guests) 321. The virtual private cloud 330 includes desktop & application 331, AD/LDAP 332 and a cloud print portal & job storage 333. The cloud portal 321 constitutes a print service providing apparatus 334a, and the cloud print portal & job storage 333 constitutes a print service providing apparatus 334b, as described in the present disclosure.

The system 300 combines the system 101 of FIG. 1 and the system 200 of FIG. 2 such that guest printing is done through the public cloud 320 and employee printing is done through the virtual private cloud 330. The printing devices configured to communicate with the cloud print portal 321 (i.e. the printer 305, the MFP 306 and the shared MFP 307) are connected to the visitor network, and the printing devices configured to communicate with the cloud print portal & job storage 333 (i.e. the shared MFP 307, the MFPs 308 and the printer 310) are connected to the corporate network, as discussed with reference to FIG. 1.

Again, the shared printer 307 can be utilized to execute print requests from both visitors and corporate employees.

The system 300 illustrated in FIG. 3A represents a system that can be implemented by an organization which seeks to manage some resources in-house and provide other resources externally. This type of system allows a company to take advantage of the scalability and cost-effectiveness of a public cloud computing environment without exposing the company's critical applications and data to third-party vulnerabilities.

With reference to FIG. 3B, an exemplary user interface for shared MFPs (e.g., the shared MFP 107 of FIG. 1, the shared MFP 207 of FIG. 2 and the shared MFP 307 of FIG. 3A) is described.

FIG. 3B shows a shared MFP 351 which includes a user interface 352. The user interface 352 includes a release code button 353 and a login button 354. The user interface 352 is displayed to a user at the shared MFP 351, and based on which of the two buttons is selected by the user, different steps are performed by the shared MFP 351.

If the user selects the release code button 353, the shared MFP 351 displays a user interface for receiving user input of a release code associated with a print job (step S301), as previously discussed in connection with the system 100 of FIG. 1. The release code may be entered by either an employee who has selected a pick-up method of using a release code at the time of submitting the print job (FIG. 3B) or a guest. Upon receiving the release code, the shared MFP 351 displays a print job (or multiple print jobs) associated with the release code, through the user interface 352 of the shared MFP 351 for user selection (step S302). The selected print job (or print jobs) is then printed by the shared MFP 351.

Alternatively, if the user selects the login button 354, the shared MFP 351 displays a user interface for receiving user login credentials to authenticate the user (step S311). Once the user has been authenticated, the print job is stored in association with the login credentials, and the user interface 352 displays applications (e.g. software available to corporate employees) available to the authenticated user, including a cloud print application (step S312). For example, if the user selects the cloud print application, the user interface 352 displays print jobs associated with the login credentials of the authenticated user and receives user selection of the print job (or print jobs) (step S313). Upon user selection, the selected print job (or print jobs) is printed by the shared MFP 351.

The user interface 352 shown in FIG. 3B can be adopted in any of the printing embodiments or with any of the enterprise features (e.g., submitting print jobs via e-mail, web portal or mobile application).

Figure 3C:
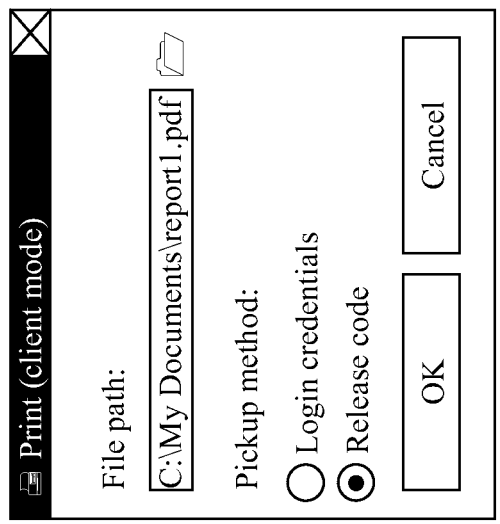
FIG. 3C shows a sample user interface for selecting a pick-up method, according to an exemplary embodiment.

As discussed above, the steps S301 and S302 are not limited to guest printing. In an exemplary embodiment, corporate employees are allowed to choose a pick-up method of retrieving a print job at a print device. For example, as shown in FIG. 3C, a corporate employee [as indicated by "(client mode)"] is allowed to choose between two pick-up methods of "login credentials" and "release code". "Login credentials" would mean that the employee would have to use his or her login credentials to retrieve a printout of the submitted print job. "Release code" would mean that, upon submitting a print job, the employee would be given a release code associated with the print job, and the employee would enter the release code at the printing device to retrieve a printout of the print job, just as a guest would. The "release code" pick-up method may be useful when the employee wishes to ask his or her colleague or assistant to retrieve the printout for the employee. Instead of having to give the person (e.g., colleague or assistant) the login credentials, the employee can just give the person the release code received upon submitting the print job.

Some examples of how the systems of FIGS. 1, 2 and 3A can be implemented for providing a cloud print service are described below with reference to FIGS. 4 through 32.

Figure 4:
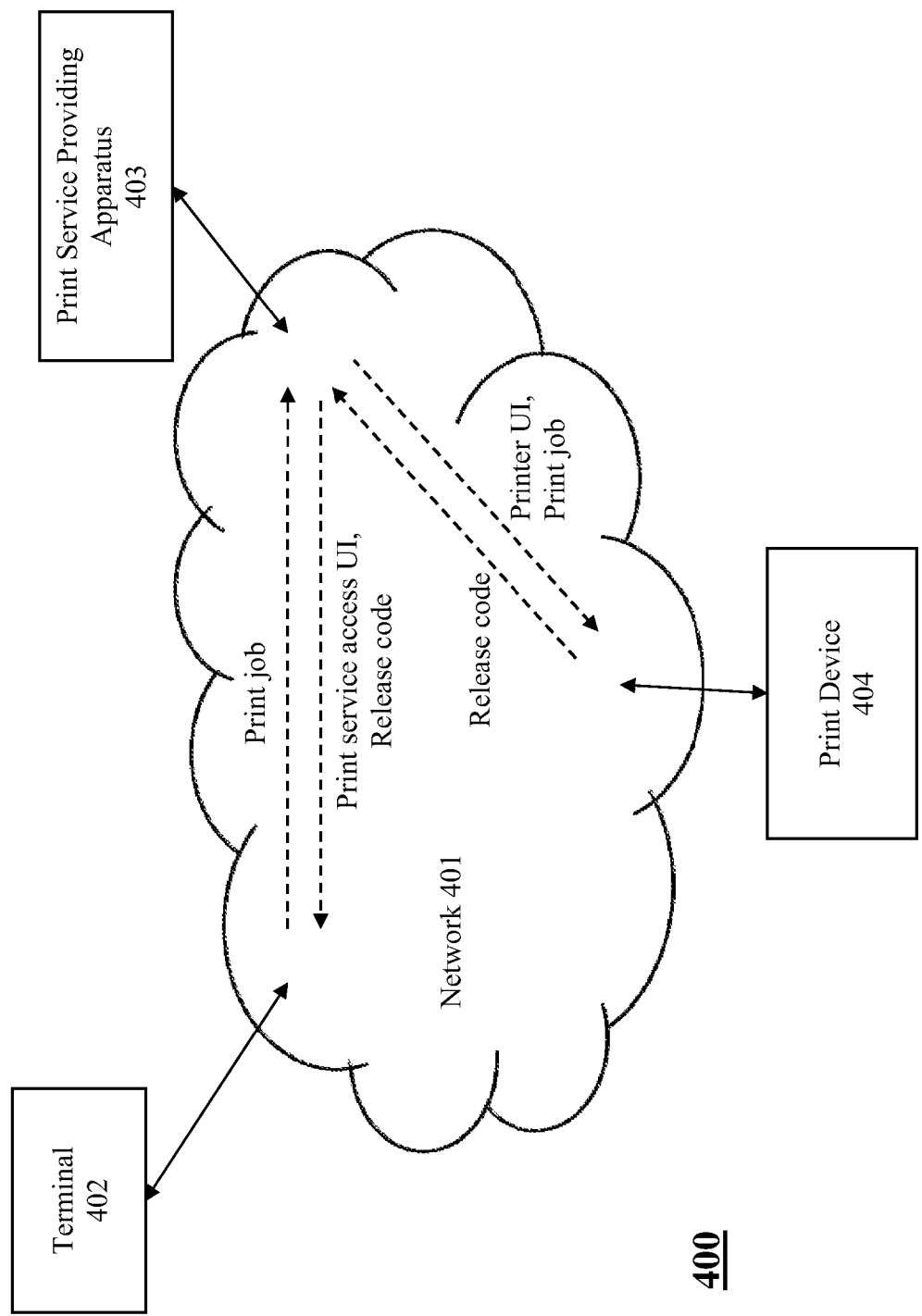
FIG. 4 shows a block diagram of a system, according to another exemplary embodiment.

FIG. 4 shows a block diagram of a system 400 for providing a cloud print service, in an example of this disclosure. The system 400 includes a terminal 402, a print service providing apparatus 403 and a print device 404, all of which are interconnected by a network 401.

The terminal 402 can be any computing device, including but not limited to a personal, notebook or workstation computer, a kiosk, a PDA (personal digital assistant), a mobile phone or handset, another information terminal, etc., that can communicate with other devices through the network 401. Although only one user terminal is shown in FIG. 4, it should be understood that the system 400 can include a plurality of user terminal devices (which can have similar or different configurations). The terminal 402 is further described infra with reference to FIG. 5.

The network 401 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 401. In addition, the network 401 preferably uses TCP/IP (Transmission Control Protocol/Internet Protocol), but other protocols can also be used. How devices can connect to and communicate over the network 401 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

As indicated by the arrows between the points where the terminal 402 and the print service providing apparatus 403 are shown to connect to the network 401, the terminal 402 submits a print job to the print service providing apparatus 403 through the print service access user interface provided by the print service providing apparatus 403, and in response, the print service providing apparatus 403 sends a release code to the terminal 402. As indicated by the arrows between the points where the print device 404 and the print service providing apparatus 403 are shown to connect to the network 401, the print device 404 provides the release code to the print service providing apparatus 403 through a printer user interface provided by the print service providing apparatus 403, and in response, the print service providing apparatus 403 sends the print job to the print device 404. The operation of the system 400 is further described infra with reference to FIG. 7.

Figure 5:
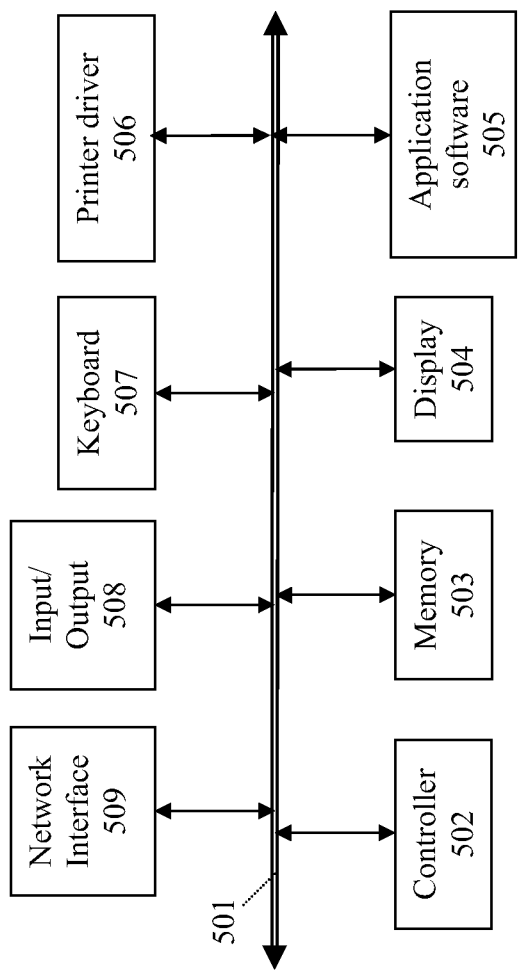
FIG. 5 shows a block diagram of an exemplary configuration of a terminal, such as in the system shown in FIG. 4.

An example of a configuration of the user terminal 402 of FIG. 4 (for example, as a computer) is shown schematically in FIG. 5. In FIG. 5, computer 500 includes a controller (or central processing unit) 502 that communicates with a number of other components, including memory 503, display 504, keyboard (and/or keypad) 507, other input/output (such as mouse, touchpad, stylus, microphone and/or speaker with voice/speech interface and/or recognition software, etc.) 508, network interface 509, print driver 506 and application software 505, by way of an internal bus 501.

The memory 503 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 509 provides a connection (for example, by way of an Ethernet connection or other network connection which supports any desired network protocol such as, but not limited to TCP/IP, IPX, IPX/SPX, or Net-BEUI) to network 401.

Print driver 506 and application software 505 are shown as components connected to the internal bus 501, but in practice are typically stored in storage media such as a hard disk or portable media, and/or received through the network 401, and loaded into memory 503 as the need arises.

Depending on the type of the particular terminal device, one or more of the components shown in FIG. 5 may be missing. For example, a particular mobile phone may be missing the print driver 506 and the keyboard 507.

Additional aspects or components of the computer 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

The print device 404 of FIG. 4 will now be discussed in connection with an exemplary configuration of a multi-function device (MFD) which includes a printing function (and additionally can serve as a user terminal for entering, saving and accessing electronic data) with reference to FIG. 6.

Figure 6:
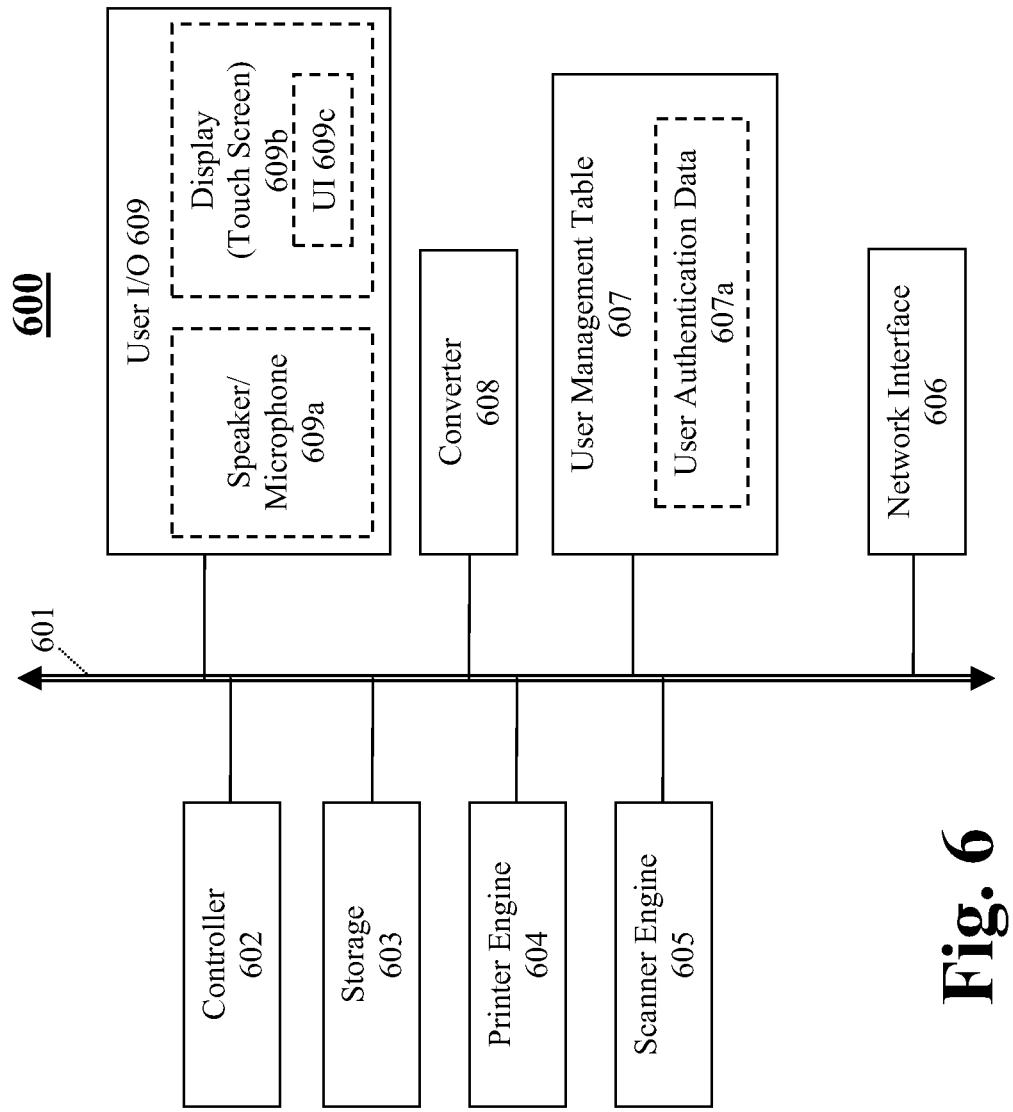
FIG. 6 shows a block diagram of an exemplary configuration of a print device, such as in the system shown in FIG. 4.

FIG. 6 shows an example of the print device 404 of FIG. 4 (or, for example, the MFDs shown in FIGS. 1, 2 and 3A), which can be an MFD with scanning and printing functions, and additionally can serve as a user terminal for entering, saving and accessing electronic data or documents. In addition, an MFD can include a resident database.

The MFD 600 shown in FIG. 6 includes a controller 602, and various elements connected to the controller 602 by an internal bus 601. The controller 602 controls and monitors operations of the MFD 600. The elements connected to the controller 602 include storage 603 (for example, random access memory, read-only memory, hard disk drive, portable storage media drive such as for optical discs, magnetic discs, magneto-optical discs, etc., semiconductor memory cards, combinations of storage media, etc.), printer engine 604, scanner engine 605, network interface (I/F) 606, converter 608 for converting data from one format to another format (for example, a format suitable for printing, faxing, e-mailing, etc.), and user I/O (Input/Output) 609. The controller 602 also utilizes information stored in user management table 607 to authenticate the user and control user access to the functionalities of the MFD 600.

Storage 603 can include one or more storage parts or devices, and program code instructions can be stored in one or more parts or devices of storage 603 and executed by the controller 602 to carry out the instructions. Such instructions can include instructions for performing specified functions (such as printing, scanning, faxing, copying, e-mailing, etc.) of the MFD 600, to enable the MFD 600 to interact with a terminal, as well as perhaps other external devices, through the network interface 606, and to control the converter 608, access data in the user management table 607, and interactions with users through the user I/O 609.

The network interface 606 is utilized by the MFD 600 to communicate with the print service providing apparatus (e.g., print service providing apparatus 403 of FIG. 4) and receive print jobs and user interfaces.

The user I/O 609 includes one or more display screens that display, under control of controller 602, information allowing the user of the MFD 600 to interact with the MFD 600. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFD 600, so as to allow the operator to interact conveniently with services provided on the MFD 600, or with the MFD 600 serving as terminal for accessing electronic data or other content through the network. User interfaces or other contents received through the network via the network interface 606 can be displayed on the display screen.

The display screen does not need to be integral with, or embedded in, a housing of the MFD 600, but may simply be coupled to the MFD 600 by either a wire or a wireless connection. The user I/O 609 may include keys and/or buttons (such as graphical keys or buttons, or other graphical elements, of a GUI on a touchscreen display) for inputting information or requesting various operations. Alternatively, the user I/O 609 and the display screen may be operated by a keyboard, a mouse, a remote control, voice recognition (e.g., through a speaker/microphone 609a), or eye-movement tracking, or a combination thereof.

Since the MFD 600 is typically shared by a number of users, and is typically stationed in a common area, the MFD 600 preferably prompts the user to supply login credentials or authentication information, such as user name (or other user or group information), password, access code, etc. The login credentials or authentication information can be compared to data stored in the user management table 607 (e.g. user authentication data 607a) to confirm that the user is authorized to use the MFD 600. The login credentials or authentication information may also be stored for the session and automatically supplied if access to other devices through the network requires it. On the other hand, such other devices may prompt the user to supply other login credentials or authentication information through the user interface.

Other methods of authentication may also be used. For example, the MFD 600 may be equipped with a card reader or one or more biometrics means (such as comparing fingerprints, palm prints, voice or speech, retinas or irises, facial expressions or features, signature, etc.).

The MFD 600 may communicate the login credentials, provided in the manners discussed above, to other devices or applications connected to the MFD 600 via a network (e.g., the network 401 of FIG. 4) for print job retrieval purposes. Such a method will be discussed in greater detail in connection with FIG. 13.

Printer engine 604, scanner engine 605 and network interface 606 are otherwise conventional, and therefore, a detailed description of such conventional aspects is omitted in the interest of clarity and brevity.

The MFD 600 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

Figure 7:
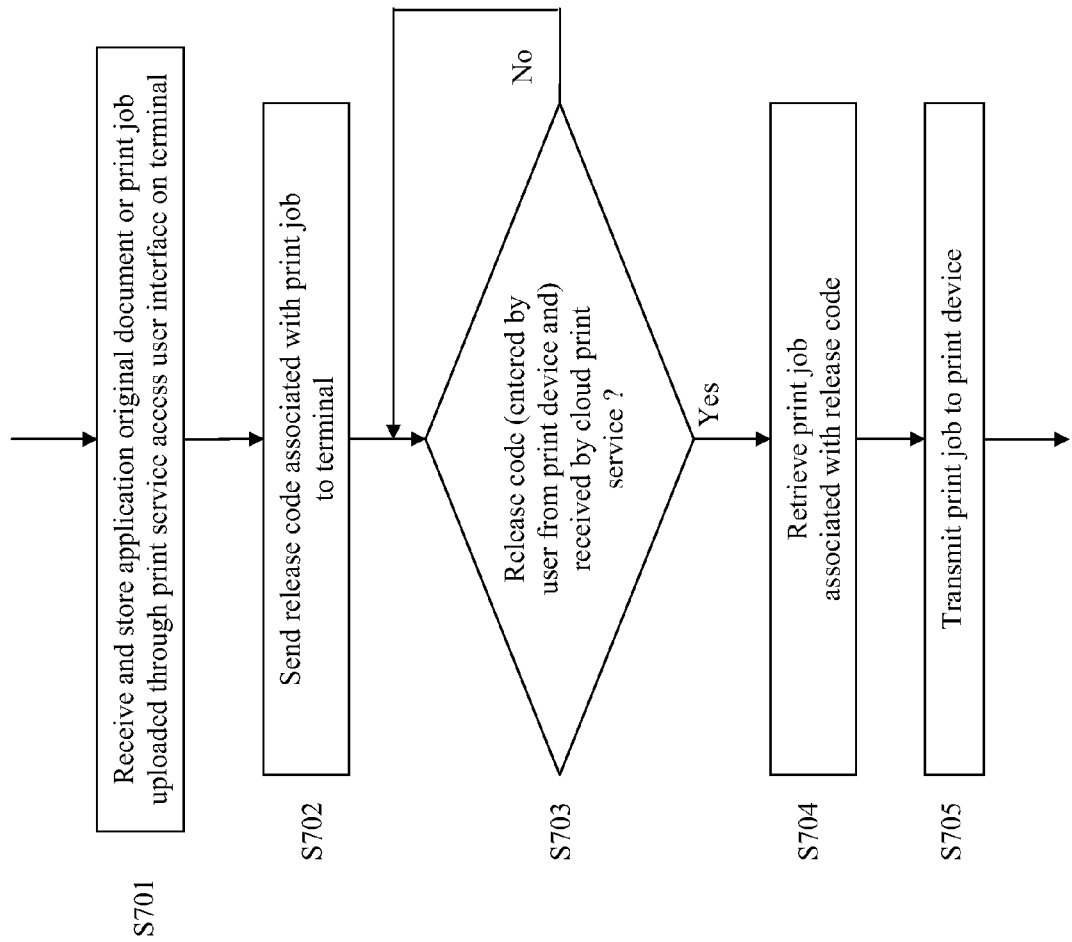
FIG. 7 shows a flow chart for a method of providing a cloud print service, in an exemplary embodiment.

With reference to FIG. 7, a method of providing a cloud print service (utilized by, for example, the print service providing apparatus 403 of FIG. 4) is described below.

In the example shown in FIG. 7, the print service providing apparatus 403 receives and stores a print job uploaded through the print service access user interface from the terminal 402 (step S701). In return, the print service providing apparatus 403 sends a release code associated with the print job to the print service access user interface on the terminal 403 (step S702). When the release code is received from the print device 404 (S703, YES), the print service providing apparatus 403 retrieves the particular print job associated with the release code (step S704). Then, the print service providing apparatus 403 transmits the particular print job to the print device 404 (step S705).

As explained above, the printout is not generated until the release code is entered by the user (i.e. until the user is actually at the printer printing the document), thus reducing paper waste and the risk of a third-party accidentally retrieving or misappropriating the printed document.

Figure 8:
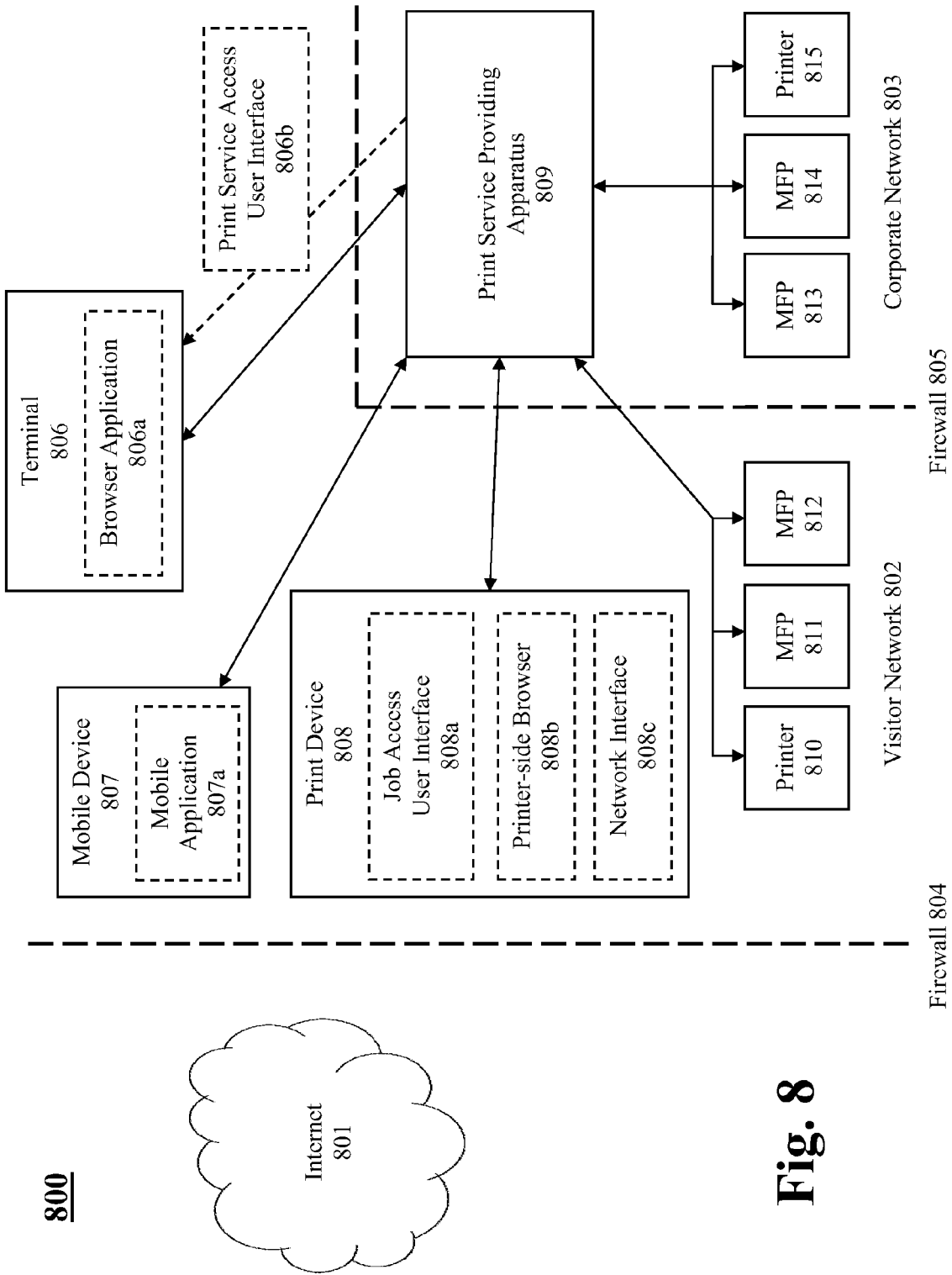
FIG. 8 shows a block diagram of a system, according to another exemplary embodiment.

With reference to FIG. 8, another system configuration for providing a cloud print service is described below.

System 800 of FIG. 8 includes the Internet 801, a visitor network 802, a corporate network 803, firewalls 804 and 805, a terminal 806 (including a browser application 806a), a mobile device 807 (including a mobile application 807a), a print device 808, a print service providing apparatus 809, printers 810 and 815, and MFPs 811-814.

A firewall is a device designed to permit or deny network transmissions based upon a set of rules, and is often used to protect networks from unauthorized access while permitting legitimate communications to pass.

The firewall 804 filters access requests from outside the enterprise environment (e.g., the company for which the system 800 is implemented), which includes both the visitor network 802 and the corporate network 803. The firewall 805 filters access requests from the visitor network 802 to resources on the corporate network 803.

As discussed above, the terminal 806 can be any computing device, including but not limited to a personal, notebook or workstation computer, a kiosk, a PDA (personal digital assistant), a mobile phone or handset, another information terminal, etc., that can communicate with other devices through the network.

The print service providing apparatus 809 provides a print service access user interface 806b through a network to the terminal 806, receive and store the print job uploaded through the print service access user interface 806b from the terminal 806 via the network, and send a release code associated with the print job through the network to the print service access user interface 806b on the terminal 806.

The print device 808 includes a job access user interface 808a configured for user entry of the release code. When the release code is entered by the user, the print device 808 communicates the release code to the print service providing apparatus 809. In response, the print service providing apparatus 809 sends the print job to the print device 808. Upon receiving the print job, the print device 808 processes the print job to generate a print output based on the processed print job. The generated print output is then output to the user.

The print device 808 can further include a printer-side browser 808b coupled to the job access user interface 808a for facilitating the user's request to retrieve print jobs through the visitor network 802 from the print service providing apparatus 809 and to obtain the print output of the print jobs from the print device 808.

Alternatively, the user can upload the print job to the print service providing apparatus 809 through the mobile application 807a on the mobile device 807 via the visitor network 802. In such a case, the operation of the print service providing apparatus 809 and the print device 808 is similar to that discussed above in connection with the terminal 806.

As shown in FIG. 8, the system 800 includes a plurality of printing devices. The printer 810 and the MFPs 811 and 812 are connected to the visitor network 802, and the MFPs 813 and 814 and the printer 815 are connected to the corporate network 803. Although these printing devices may all reside in the same enterprise environment (i.e. within a single company), the users of the system 800 may have varying access to these printing devices. For example, corporate employees might be permitted to print from all of the printing devices (i.e. the printers 810 and 816, and the MFPs 811-814), whereas visiting users are permitted to print from only the printing devices on the visitor network 802 (i.e. the printer 810 and the MFPs 811 and 812).

These printing devices operate in a similar manner as discussed in connection with the print device 808.

The system 800 might be used, for example, in a case that a company visitor wishes to print a document using one of the printers on the visitor network. For example, the company visitor connects his or her laptop PC or mobile device to the visitor network 802 and uploads the document he or she wishes to print using a web portal. Using the release code that is displayed in return, the company visitor can go to the nearest printer connected to the visitor network 802, enter the release code, and retrieve the printout of the document.

Figure 9:
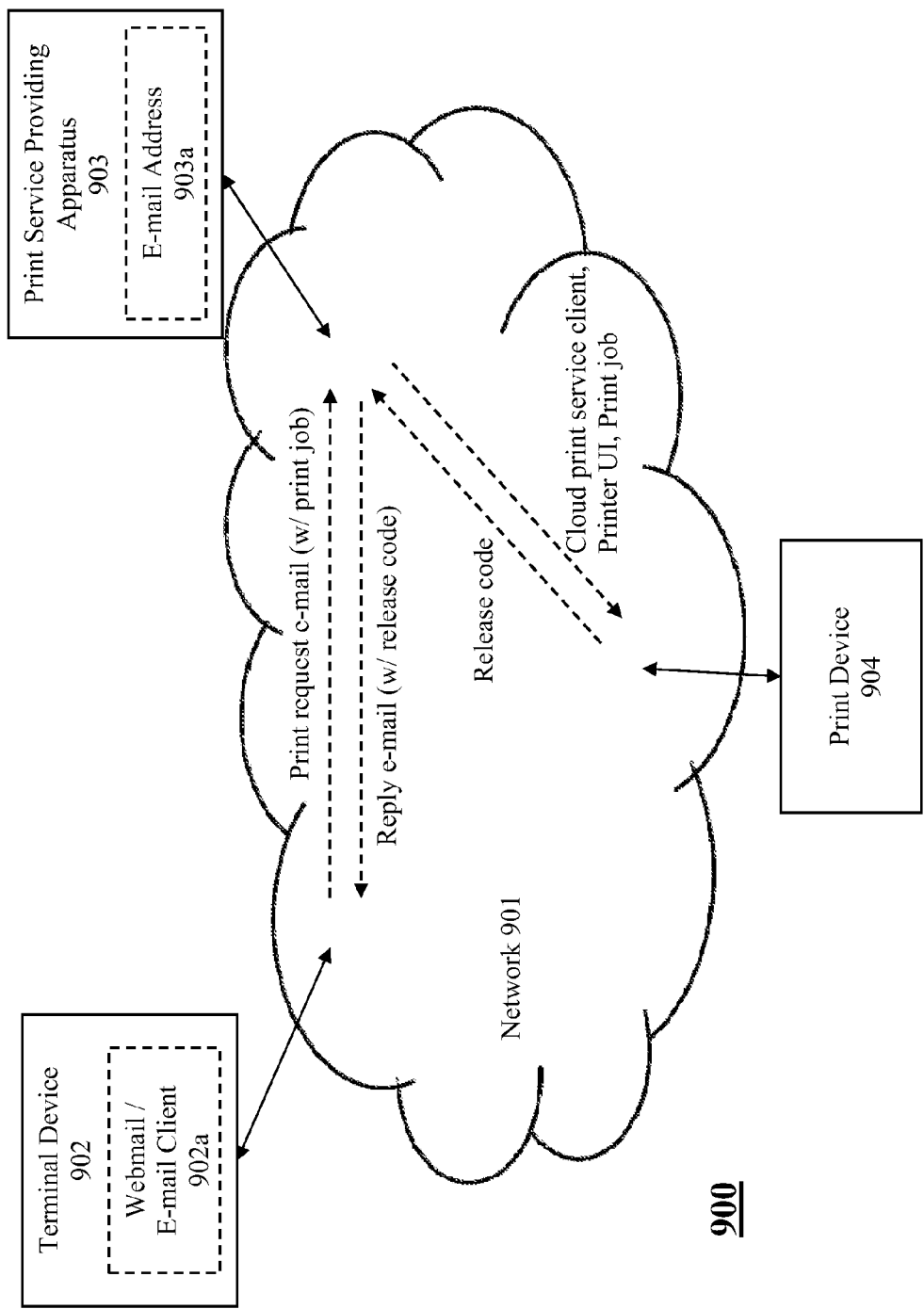
FIG. 9 shows a block diagram of a system, according to another exemplary embodiment.

With reference to FIG. 9, another system configuration for providing a cloud print service is described below.

FIG. 9 shows a block diagram of a system 900 for providing a cloud print service, in another example of this disclosure. The system 900 includes a terminal device 902 (including webmail/e-mail client 902a), a print service providing apparatus 903 (including an e-mail address 903a) and a print device 904, all of which are interconnected by a network 901.

The system 900 of FIG. 9 is different from the system 400 of FIG. 4 discussed above in that the system 900 provides a cloud print service via e-mail.

As indicated by the arrows between the points where the terminal 902 and the print service providing apparatus 903 are shown to connect to the network 901, the terminal device 902 sends a print request e-mail including a print job to the print service providing apparatus 903 using webmail/e-mail client 902*a*, and in response, the print service providing apparatus 903 sends a reply e-mail including a release code to the terminal device 902. As indicated by the arrows between the points where the print device 904 and the print service providing apparatus 903 are shown to connect to the network 901, the print device 404 provides the release code to the print service providing apparatus 903 through a printer user interface provided by a cloud print service client provided by the print service providing apparatus 903, and in response, the print service providing apparatus 903 sends the print job to the print device 904. The operation of the system 900 is further described infra with reference to FIG. 10A.

Otherwise, the operation of the terminal device 902, the print service providing apparatus 903 and the print device is similar to that discussed above in connection with the system 400 of FIG. 4.

An exemplary method of providing a cloud print service via e-mail (utilized by, for example, the print service providing apparatus 903 of FIG. 9) will be discussed below with reference to FIG. 10A.

Figure 10A:
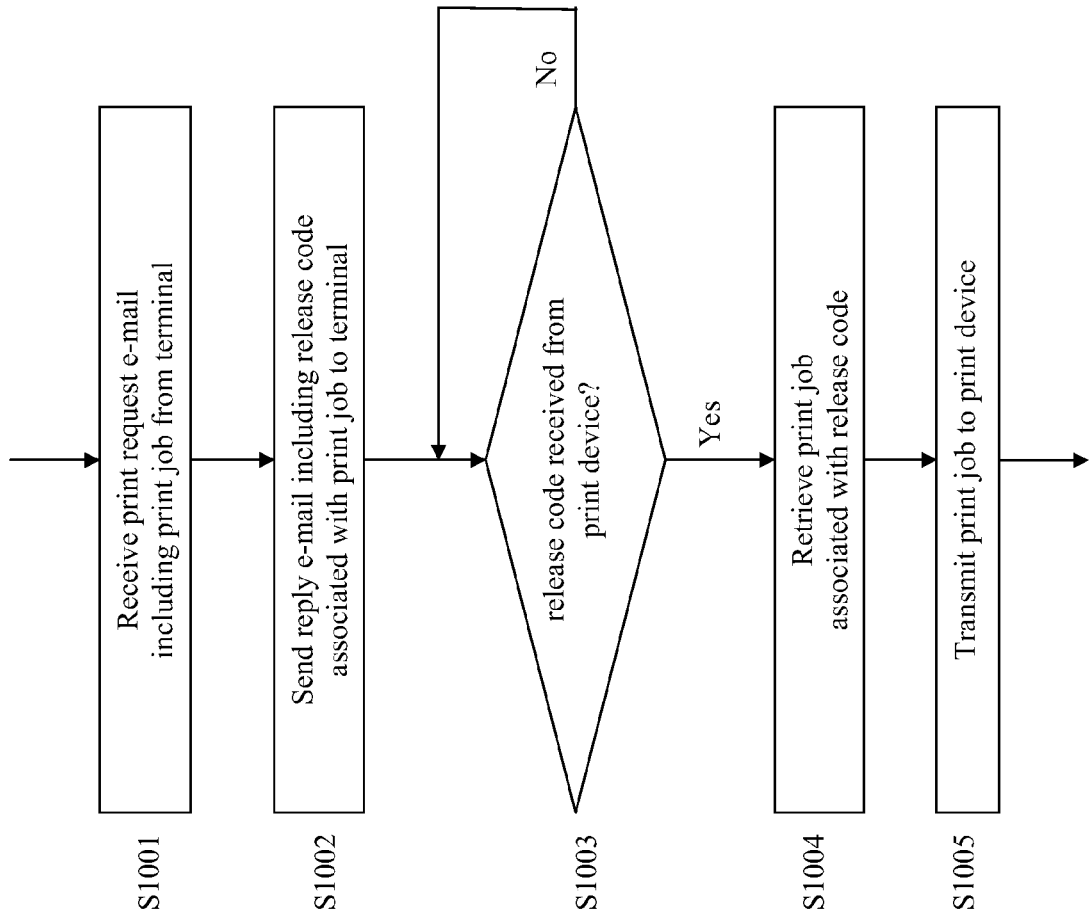
FIG. 10A shows a flow chart for a method of providing a cloud print service, in another exemplary embodiment.

In the example shown in FIG. 10A, the print service providing apparatus 903 receives a print request e-mail including a print job from the terminal 902 (step S1001). In return, the print service providing apparatus 903 sends a reply e-mail including a release code associated with the print job to the terminal 902 (step S1002).

The reply e-mail preferably includes instructions on how to use the release code. As discussed above, the user may enter the received release code at any of the plurality of printing devices that might be available as long as the user has access to the particular printing device he or she wishes to use.

When the release code is received from the print device 904 (S1003, YES), the print service providing apparatus 903 retrieves the particular print job associated with the release code (step S1004). Then, the print service providing apparatus 903 transmits the particular print job to the print device 904 to be processed and output to the user (step S1005). Another exemplary method of providing a cloud print service via e-mail (utilized by, for example, the print service providing apparatus 903 and the print device 904 of FIG. 9) will be discussed below with reference to FIG. 10B.

Figure 10B:
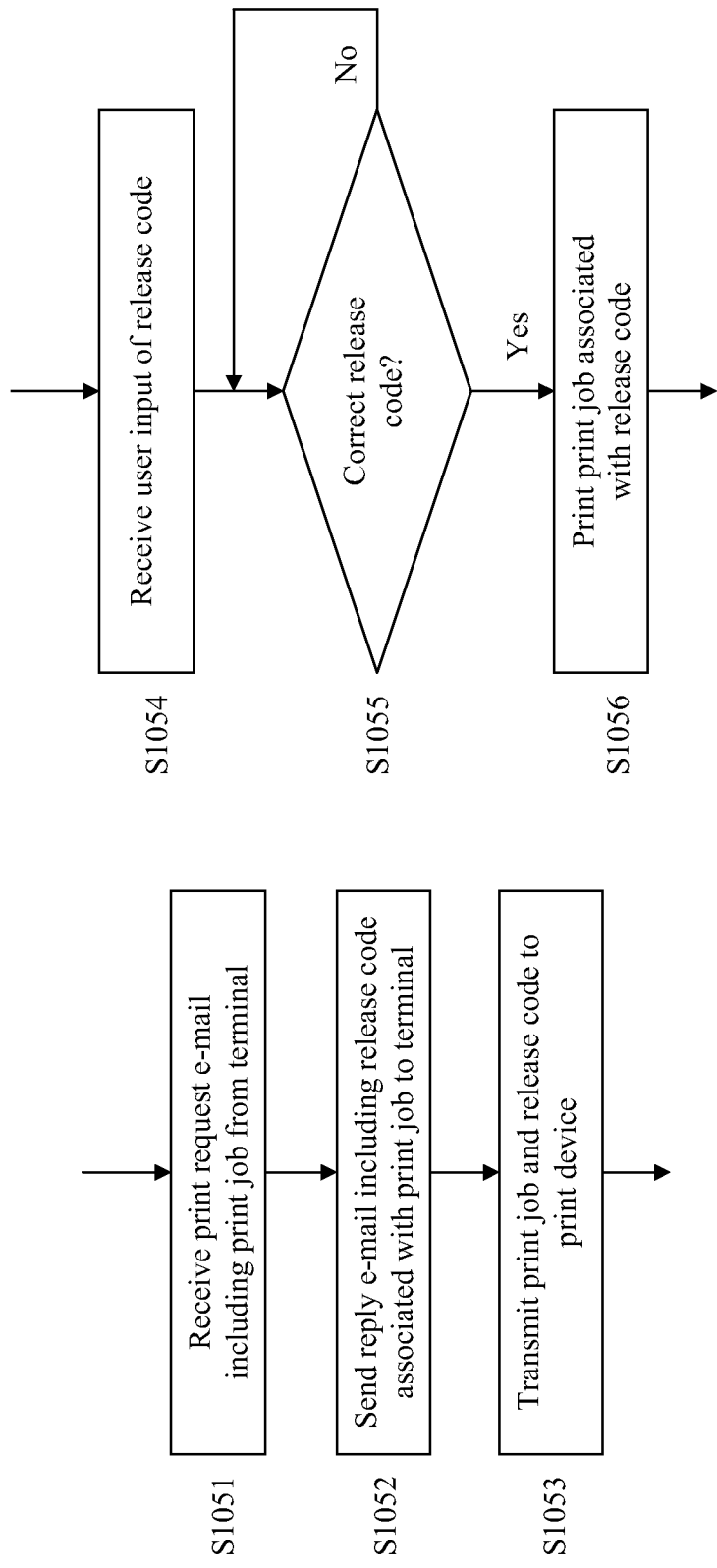
FIG. 10B shows flow charts for a method of providing a cloud print service, in another exemplary embodiment.

In the example shown in FIG. 10B, the print service providing apparatus 903 receives a print request e-mail including a print job from the terminal 902 (step S1051). In return, the print service providing apparatus 903 sends a reply e-mail including a release code associated with the print job to the terminal 902 (step S1052).

As discussed above, the reply e-mail preferably includes instructions on how to use the release code, and the user may enter the received release code at any of the plurality of printing devices that might be available as long as the user has access to the particular printing device he or she wishes to use.

After sending the reply e-mail including the release code, the print service providing apparatus 903 transmits the received print job, along with the corresponding release code, to the print device 904 (step S1053). In this embodiment, the print job submitted by the user is transmitted to the print device 904 as soon as the print job is received by the print service providing apparatus 903 without waiting for the release code from the print device 904.

Further, the steps performed by the print device 904 are described below.

The print device 904 receives user input of the release code (step S1054). If the received release code is valid (i.e. has a corresponding print job associated with the release code) (S1055, YES), the print device 904 proceeds to print the print job associated with the release code (step S1056). In this embodiment, the print device 904 immediately prints the print job upon receiving the release code, without having to retrieve the print job from the print service providing apparatus 903 after the release code is received.

In the exemplary method discussed above, the first three steps (steps S1051-S1053) are performed by the print service providing apparatus 903, and the last three steps (steps S1054-S1056) are performed by the print device 904. Such a method can be adopted in conjunction with any of the guest printing embodiments or with any of the enterprise features (e.g., e-mail, web portal, mobile application, etc.), and is not just limited to the method in which the print job is sent via e-mail.

With reference to FIG. 11, another system configuration for providing a cloud print service is described below.

System 1100 of FIG. 11 includes the Internet 1101, a visitor network 1102, a corporate network 1103, firewalls 1104 and 1105, a terminal 1106 (including an e-mail client/webmail 1106*a*), a mobile device 1107 (including a mobile application 1107*a*), a print device 1108, a print service providing apparatus 1109, printers 1110 and 1115, and MFPs 1111-1114.

The firewall 1104 filters access requests from outside the enterprise environment (e.g., the company for which the system 1100 is implemented), which includes both the visitor network 1102 and the corporate network 1103. The firewall 1105 filters access requests from the visitor network 1102 to resources on the corporate network 1103.

The terminal 1106 allows a user to send a print request e-mail with a print job attached thereto through the e-mail client/webmail 1106*a* to the print service providing apparatus 1109. The print request e-mail is transmitted through the visitor network 1102 and the firewall 1104 via the Internet 1101 to a specified e-mail address.

Upon receiving the print request e-mail from the terminal 1106, the print service providing apparatus 1109 stores the print job and sends a release code associated with the print job back to the terminal 1106 by a reply e-mail. The release code can be included in the body of the e-mail or included as an attachment to the e-mail. The reply e-mail preferably includes instructions on how to use the release code to retrieve a printout of the print job.

The print service providing apparatus 1109 provides to the print device 1108 a job access user interface 1108*a* configured for user entry of the release code. When the release code is entered by the user, the print device 1108 communicates the release code to the print service providing apparatus 1109. In response, the print service providing apparatus 1109 sends the print job to the print device 1108. Upon receiving the print job, the print device 1108 processes the print job to generate a print output based on the processed print job. The generated print output is then output to the user.

Figure 12:
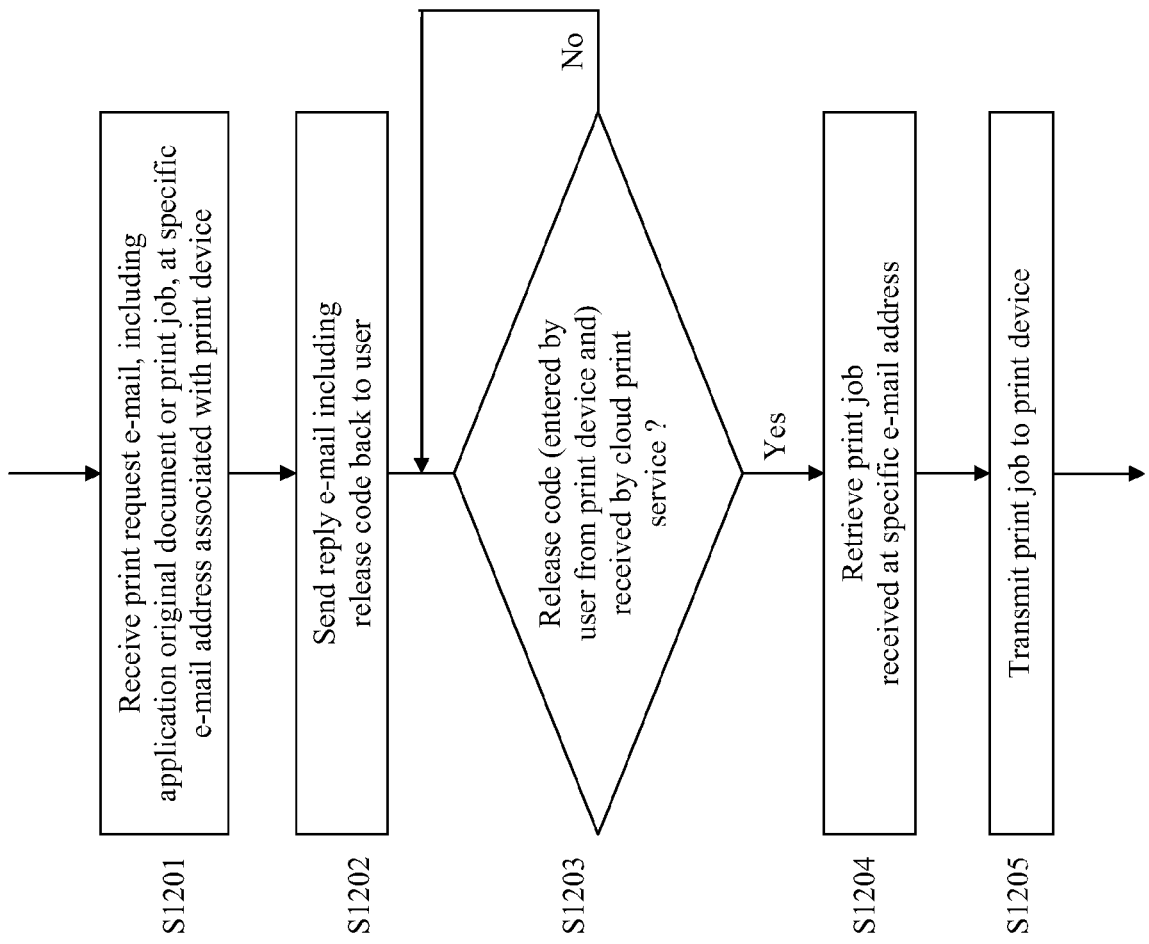
FIG. 12 shows a flow chart for a method of providing a cloud print service, in another exemplary embodiment.
Figure 13:
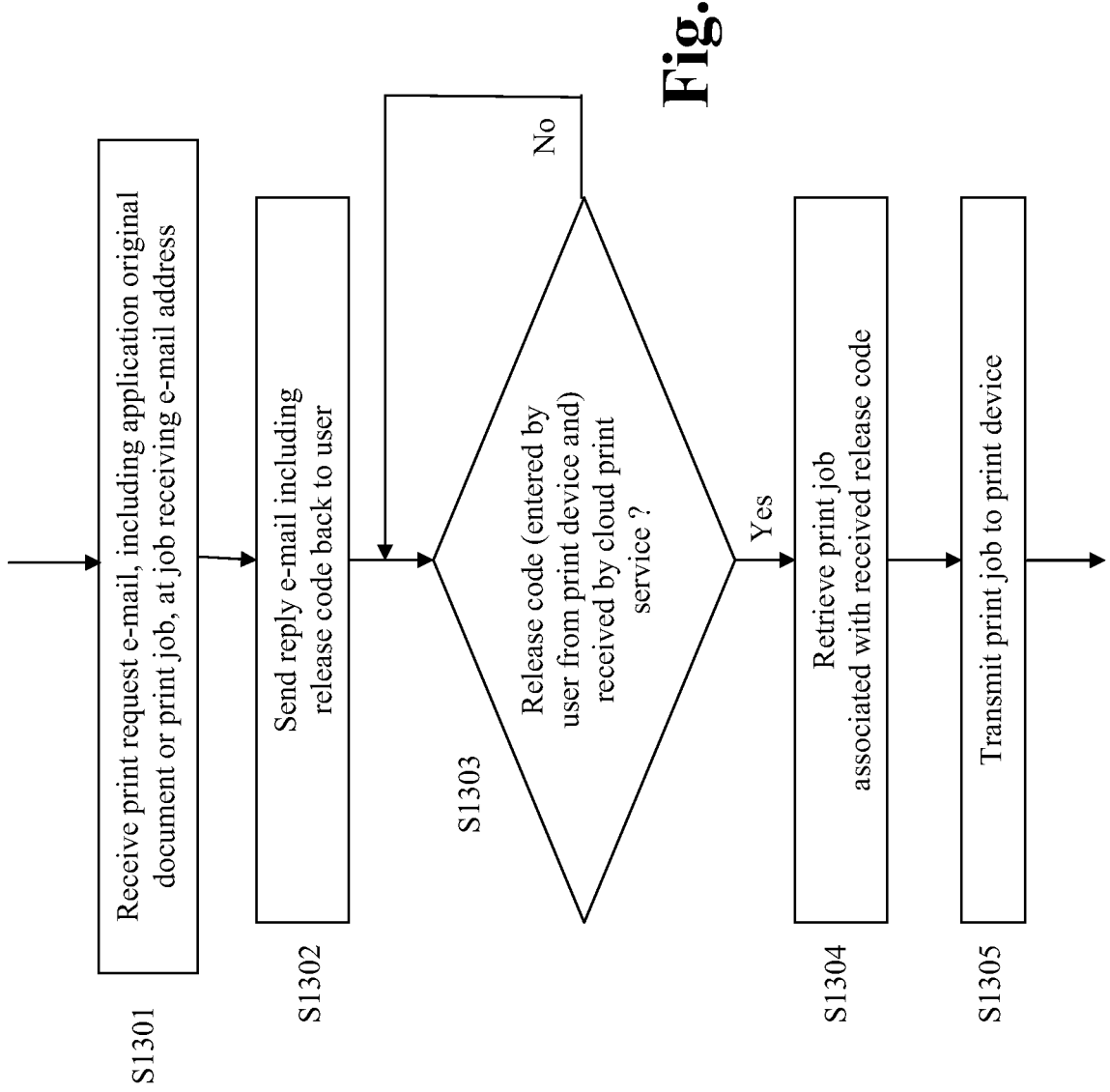
FIG. 13 shows a flow chart for a method of providing a cloud print service, in another exemplary embodiment.

Two exemplary methods of selecting which of the stored print jobs to transmit to the print device 1108 are further described infra with reference to FIGS. 12 and 13.

Alternatively, the user can send the print request e-mail along with the print job to the print service providing apparatus 1109 through the mobile application 1107*a* of the mobile device 1107 through the visitor network 1102 and the firewall 1104 via the Internet. In such a case, the operation of the print service providing apparatus 1109 and the print device 1108 is similar to that discussed above in connection with the terminal 1106.

As shown in FIG. 11, the system 1100 includes a plurality of printing devices. The printer 1110 and the MFPs 1111 and 1112 are connected to the visitor network 1102, and the MFPs 1113 and 1114 and the printer 1115 are connected to the corporate network 1103. As discussed above, users (visitors or employees) may print from any of these printing devices as long as they have access to the particular printing device they choose to use.

These printing devices operate in a similar manner as discussed in connection with the print device 1108.

The system 1100 might be used, for example, in a case that a company visitor would like to print a document using one of the printers on the visitor network. For example, the company visitor connects his or her laptop PC or mobile device to the visitor network 1102 and e-mails the document he or she wishes to print using an e-mail client, webmail, or a mobile application, to the print service providing apparatus 1109. Using the release code that is e-mailed in return, the company visitor can go to the nearest printer connected to the visitor network 1102, enter the release code, and retrieve the printout of the document.

With reference to FIG. 12, a method of selecting which of the stored print jobs to transmit to the print device (utilized by, for example, the print service providing apparatus 1109 of FIG. 11) will be discussed below.

According to the method illustrated in FIG. 12, the print service providing apparatus 1109 receives a print request e-mail including an attachment at a particular e-mail address associated with a particular print device of the plural print devices shown in FIG. 11 (step S1201). In response, the print service providing apparatus 1109 sends a reply e-mail including a release code back to the user (step S1202). If the release code is received from the particular print device (S1203, YES), the print service providing apparatus 1109 retrieves the particular print job received at the specific e-mail address associated with the particular print device (step S1204), and transmits the particular print job to the particular print device (step S1205).

With reference to FIG. 13, another method of selecting which of the stored print jobs to transmit to the print device (utilized by, for example, the print service providing apparatus 1109 of FIG. 11) will be discussed below.

According to the method illustrated in FIG. 13, the print service providing apparatus 1109 receives a print request e-mail including an attachment at a job receiving e-mail address (step S1301). In response, the print service providing apparatus 1109 sends a reply e-mail including a specific release code back to the user (step S1302). If the specific release code is received from any print device (S1303, YES), the print service providing apparatus 1109 retrieves the particular print job associated with the specific release code (step S1304), and transmits the particular print job to the print device from which the specific release code was sent (step S1305).

Figure 14:
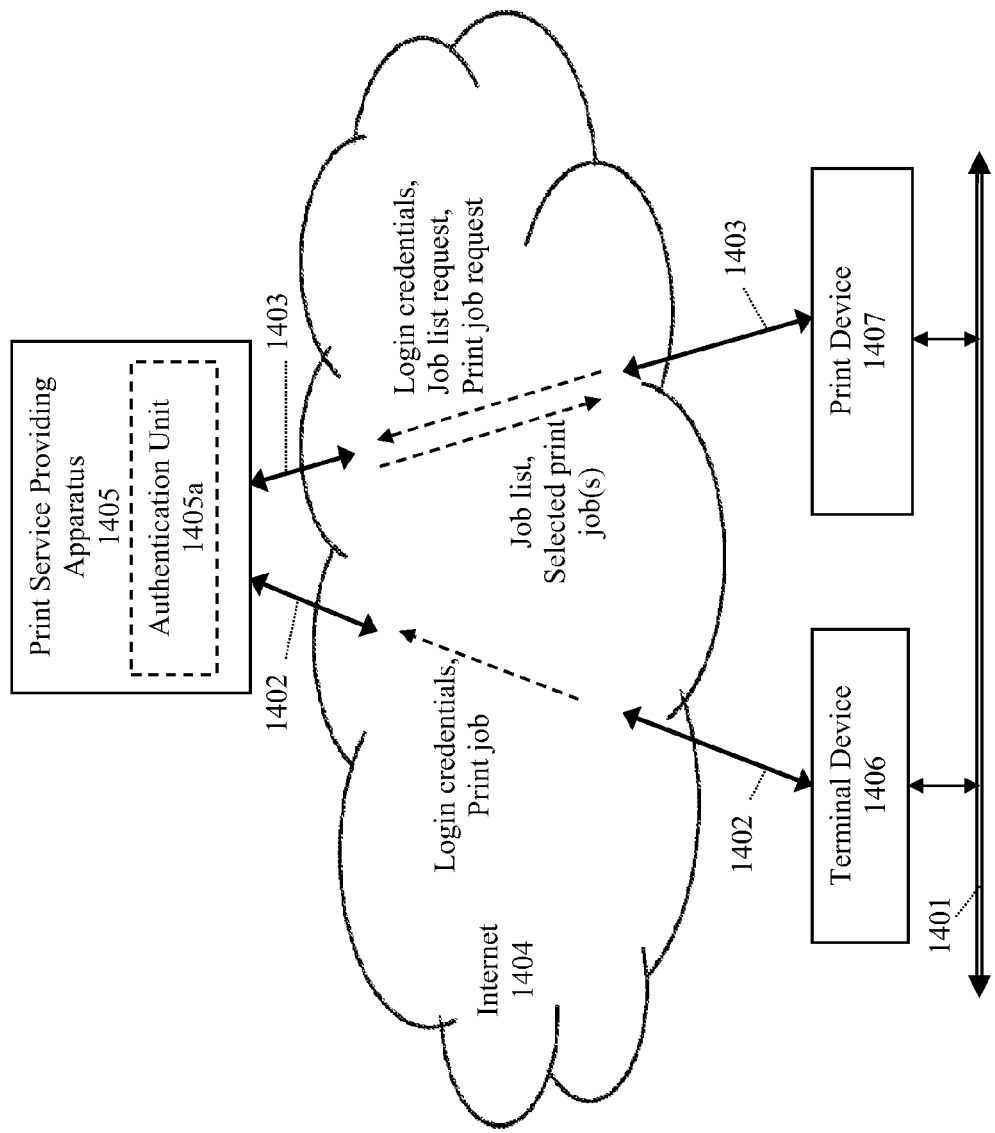
FIG. 14 shows a block diagram of a system, according to another exemplary embodiment.

With reference to FIG. 14, another system configuration for providing a cloud print service is described below.

FIG. 14 shows a block diagram of a system 1400 for providing a cloud print service, in another example of this disclosure. The system 1400 includes a user-specific virtual private network 1402, a printer-specific virtual private network 1403, the Internet 1404 and a print service providing apparatus 1405 (including an authentication unit 1405*a*). Further, the system 1400 includes a terminal device 1406 and a print device 1407, interconnected by a network 1401.

The system 1400 of FIG. 14 is different from the system 400 of FIG. 4 discussed above in that the print service providing apparatus 1405 is connected to the terminal device 106 and the print device 1407 through the virtual private networks 1402 and 1403, respectively, rather than being connected to the terminal device 1406 and the print device 1407 via a single network. Thus, in order to communicate with the print service providing apparatus 1405, the terminal device 1406 and the print device 1407 must go through a virtual private network including the Internet. Further, the print service providing apparatus 1405 is configured to receive from the user, in addition to the print job, login credentials and authenticate the login credentials of the user using the authentication unit 1405*a*.

As indicated by the arrows between the points where the terminal device 1406 and the print service providing apparatus 1405 are shown to connect to the Internet 1404 via the user-specific virtual private network 1402, the terminal device 1406 sends to the print service providing apparatus 1405 a print job along with login credentials. As indicated by the arrows between the points where the print device 1407 and the print service providing apparatus 1405 are shown to connect to the Internet 1404 via the printer-specific virtual private network 1403, when the user provides the login credentials to the print device 1407, the print device 1407 sends the print service providing apparatus 1405 the login credentials for authentication. Upon proper authentication of the user, a job list associated with the particular user is sent to the print device 1407. Upon the user's selection of the print jobs he or she wishes to print, the selected print jobs are requested and retrieved by the print device 1407 from the print service providing apparatus 1405. The authentication process is described further with reference to FIG. 15 and the operation of the print service providing apparatus 1405 is further described with reference to FIG. 17.

Otherwise, the operation of the terminal device 1406, the print service providing apparatus 1405 and the print device 1407 is similar to that discussed above in connection with the system 400 of FIG. 4.

Figure 15:
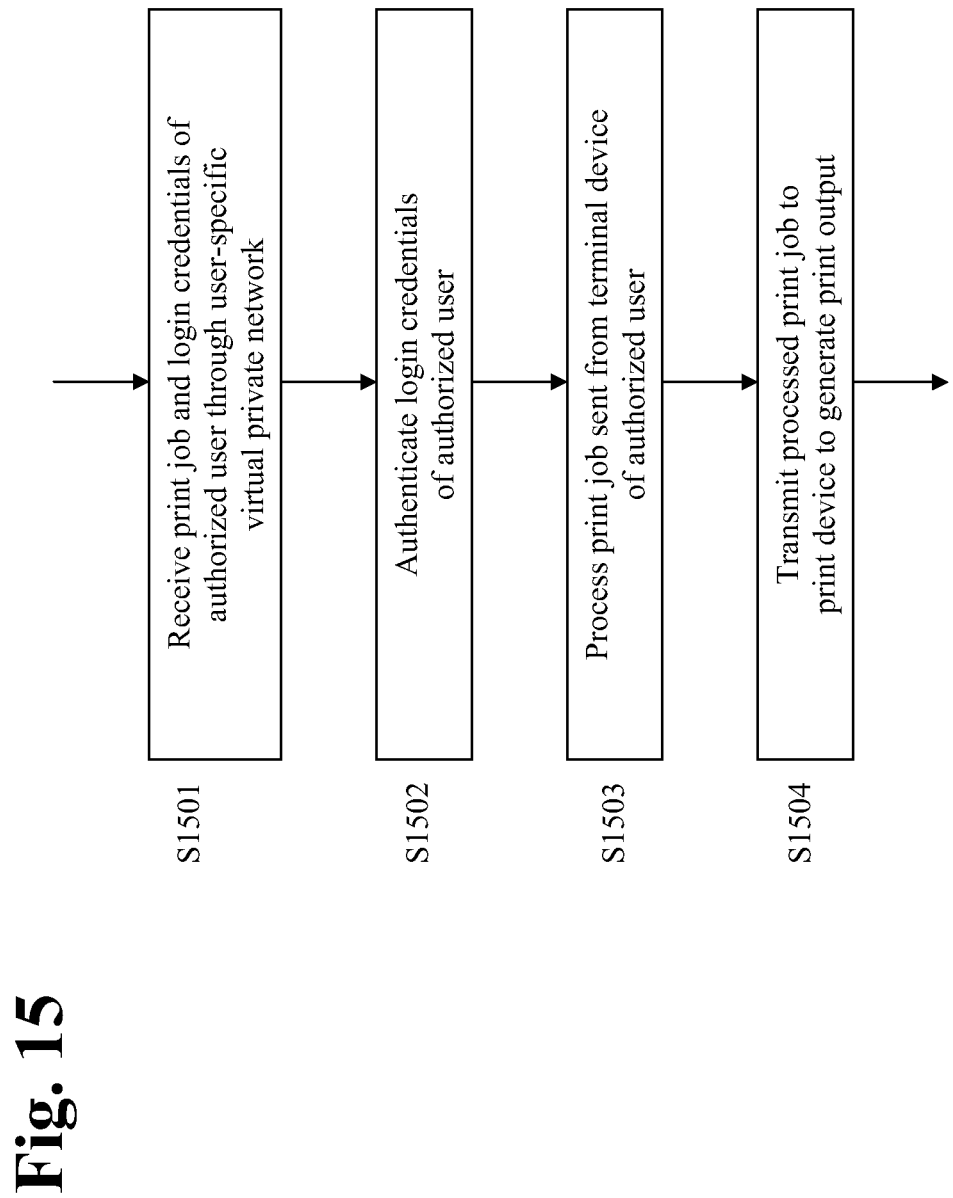
FIG. 15 shows a flow chart for a method of authenticating user credentials, in an exemplary embodiment.

With reference to FIG. 15, a method of authenticating login credentials provide by a user (utilized by, for example, the print service providing apparatus 1405 of FIG. 14) is described below.

According to the method illustrated in FIG. 15, the print service providing apparatus 1405 receives a print job and login credentials of an authorized user through a user-specific virtual private network 1402 (step S1501). Then, the print service providing apparatus 1405 authenticates the login credentials of the authorized user using the authentication unit 1405*a* (step S1502). The authentication process can take any of the forms discussed above in connection with the MFD 600 of FIG. 6. For example, the system 1400 may maintain a database containing user authorization information which can be utilized to verify login credentials submitted by the user.

After the user is authenticated using the login credentials, the print service providing apparatus 1405 processes the print job sent from the terminal device 1406 by the authorized user (step S1503). The processed print job is then transmitted to the print device 1407 to generate a print out (step S1504).

Figure 16:
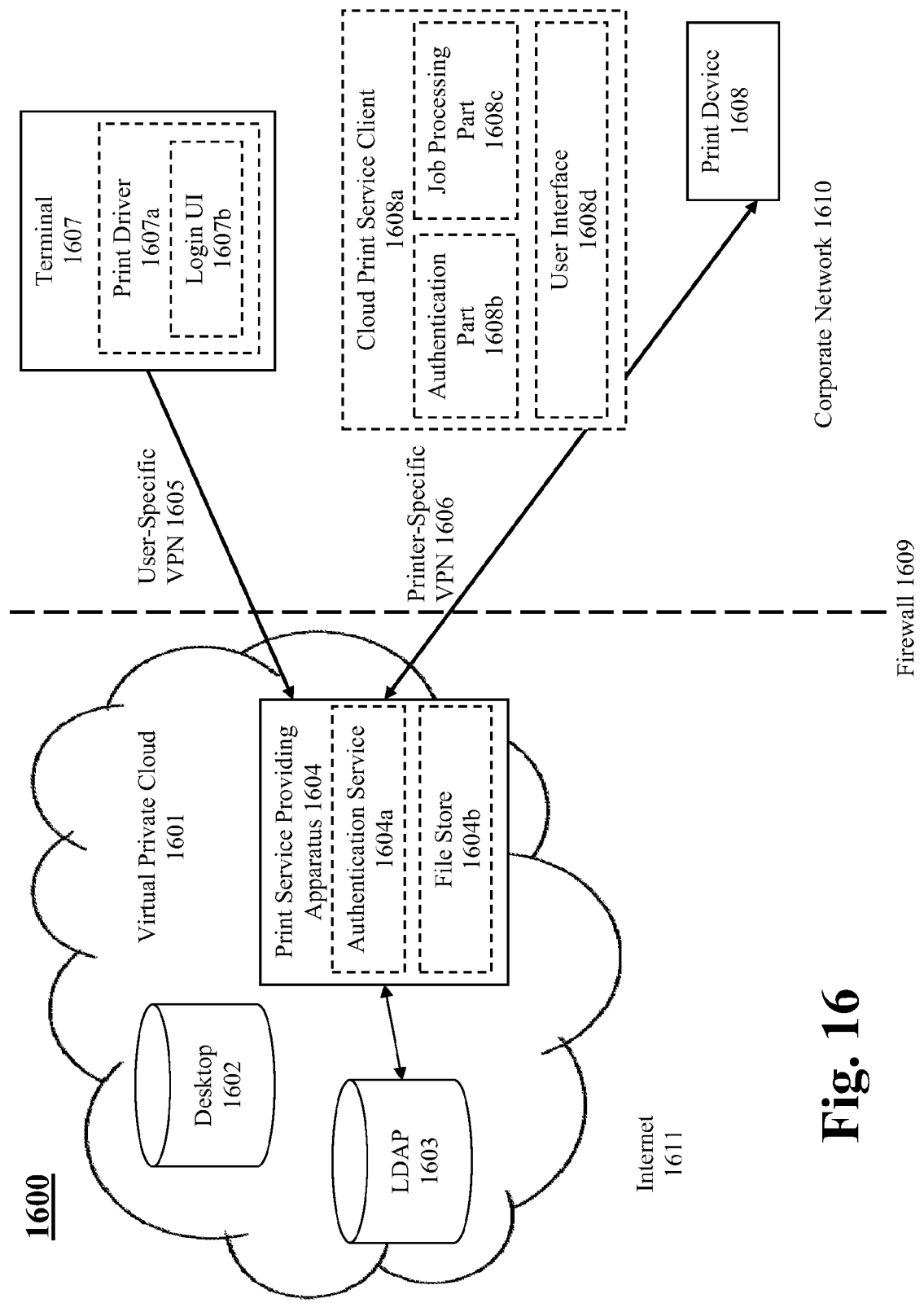
FIG. 16 shows a block diagram of a system, according to another exemplary embodiment.

With reference to FIG. 16, another system configuration for providing a cloud print service is described below.

As shown in FIG. 16, system 1600 includes a virtual private cloud 1601, desktop 1602, LDAP 1603, a print service providing apparatus 1604, a user-specific virtual private network 1605, a printer-specific virtual private network 1606, a terminal 1607, a print device 1608, a firewall 1609, a corporate network 1610 and the Internet 1611.

The print service providing apparatus 1604 includes authentication service 1604a and a file store 1604b.

The terminal 1607 includes a print driver 1607a including a login user interface 1607b. The print service providing apparatus 1604 provides to the print device 1608 a cloud print service client 1608a including an authentication part 1608b, a job processing part 1608c and a user interface 1608d.

The system 1600 might be used, for example, in a case that a company employee would like to print a document using one of the printers on the corporate network 1610. For example, when the company employee prints a document from his or her computer connected to the corporate network 1610 using the print driver 1607a, a print request is sent, along with the company employee's login credentials, to the print service providing apparatus 1604. The company employee then goes to a corporate printer and enters the login credentials. After the job list is retrieved from the print service providing apparatus 1604 and displayed on the user interface 1608d, the company employee selects a print job and retrieves a printout of the selected print job.

Figure 17:
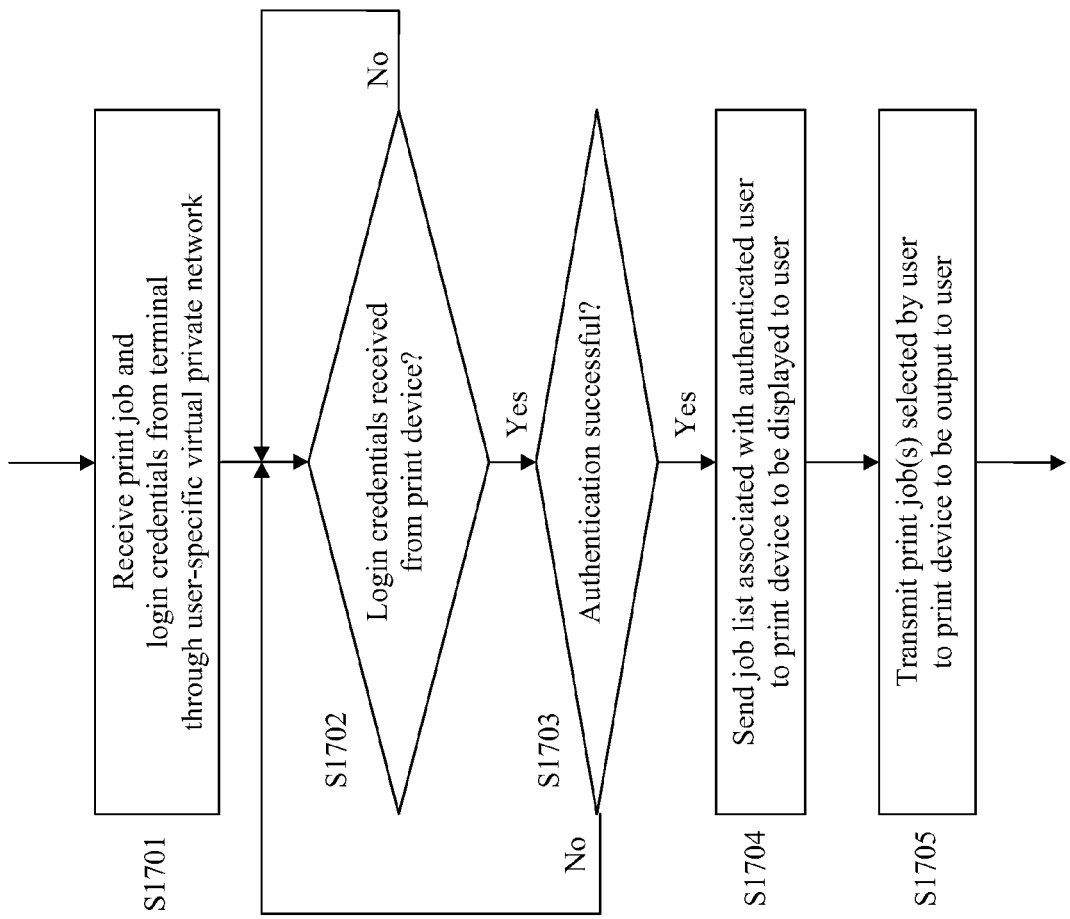
FIG. 17 shows a flow chart for a method of providing a cloud print service, in another exemplary embodiment.

With reference to FIG. 17, another method of providing a cloud print service (utilized by, for example, the print service providing apparatus 1604 of FIG. 16) is described below.

According to the method illustrated in FIG. 17, the print service providing apparatus 1604 receives a print job and login credentials through the login user interface 1607b provided by the print driver 1607a on the terminal device 1607 (step S1701). The login credentials received along with the print job through the user-specific virtual private network 1605 from the terminal device 1607 are authenticated by the authentication service 1604a (by communicating with the LDAP 1603) provided on the print service providing apparatus 1604, and the received print job is uploaded. The user then provides the login credentials to the print device 1608 through the user interface 1608d of the cloud print service client 1608a. The authentication part 1608b communicates with the authentication service 1604a of the print service providing apparatus 1604 to authenticate the login credentials entered by the user (step S1702). Upon successfully authenticating the login credentials (S1703, YES), the authentication part 1608b requests and receives from the print service providing apparatus 1604 a job list associated with the user (step S1704). The print device 1608 then displays the received job list to the user via the user interface 1608d. The user then selects the print job he or she wishes to print from the displayed job list using the user interface 1608d. The job processing part 1608c requests and receives from the print service providing apparatus 1604 the print job selected by the user (step S1705). The job processing part 1608c processes the received print job, and a print output based on the processed print job is output to the user.

Figure 18:
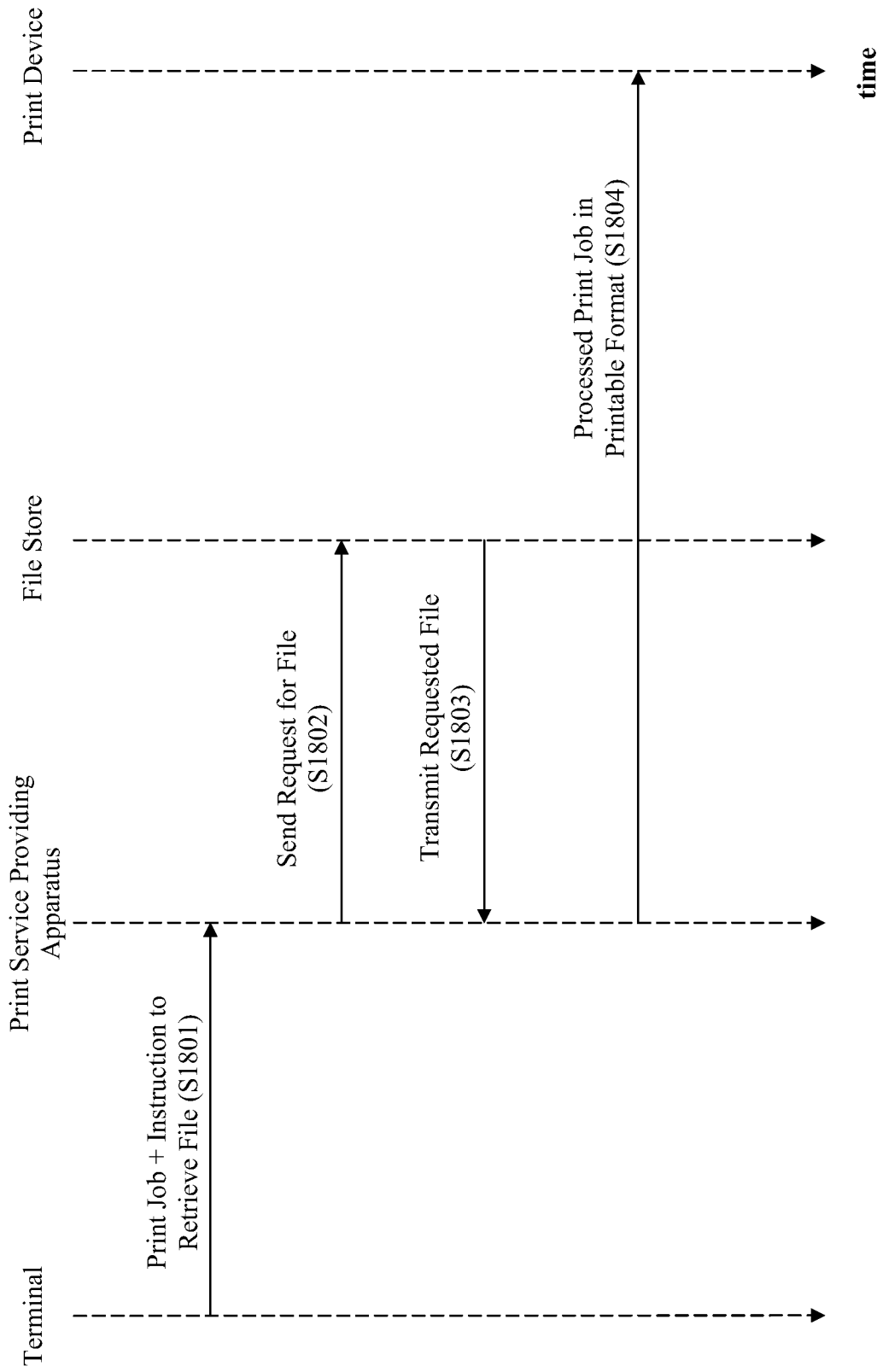
FIG. 18 shows a schematic representation of a workflow in the system shown in FIG. 16, in an exemplary embodiment.

With reference to FIG. 18, another method of providing a cloud print service (utilized by, for example, the system 1600 of FIG. 16) is described below.

According to the method illustrated in FIG. 18, the terminal 1607, at the request of the user, sends the print service providing apparatus 1604 a print job along with an instruction to retrieve a specified file from the file store 1604b (step S1801). Upon receiving the print request, the print service providing apparatus 1604 sends a request for the file specified by the user to the file store 1604b (step S1802), and receives the specified file from the file store 1604b (step S1803). The print service providing apparatus 1604 then renders the retrieved file as a processed print job in a format printable by the print device 1608, and sends the processed print job to the print device 1608 to be output to the user (step S1804).

Figure 19:
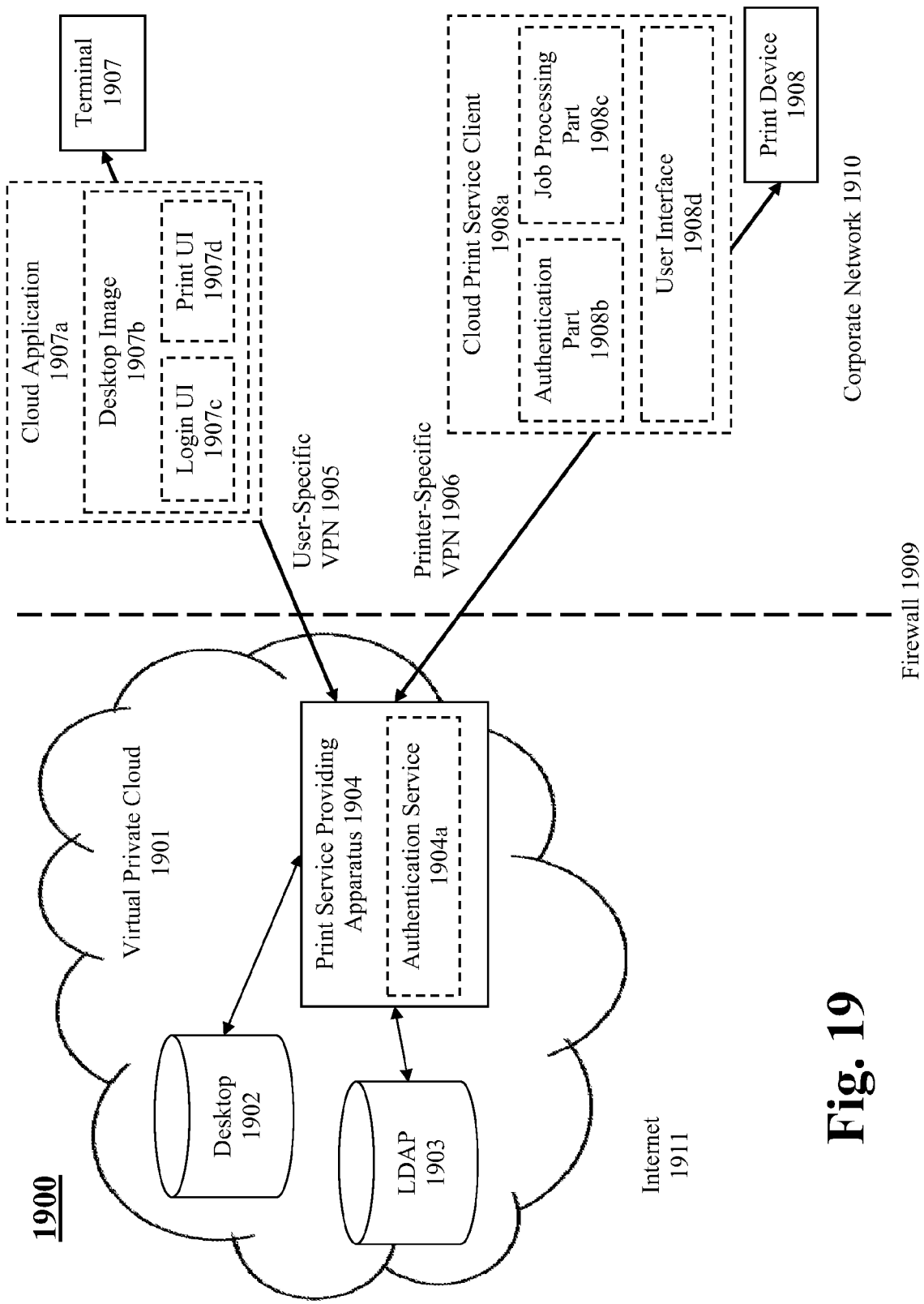
FIG. 19 shows a block diagram of a system, according to another exemplary embodiment.

With reference to FIG. 19, another system configuration for providing a cloud print service is described below.

As shown in FIG. 19, system 1900 includes a virtual private cloud 1901, desktop 1902, LDAP 1903, a print service providing apparatus 1904, a user-specific virtual private network 1905, a printer-specific virtual private network 1906, a terminal 1907, a print device 1908, a firewall 1909, a corporate network 1910 and the Internet 1911.

The print service providing apparatus 1904 includes authentication service 1904a and provides to the terminal 1907 a cloud application 1907a which includes a desktop image 1907b including a login user interface 1907c and a print user interface 1907d. The cloud application 1907a is provided to the terminal 1907 through the user-specific virtual private network 1905.

The print service providing apparatus 1904 also provides to the print device 1908 a cloud print service client 1908a including an authentication part 1908b, a job processing part 1908c and a user interface 1908d.

In the system 1900 of FIG. 19, the login credentials provided by the user are entered using the login user interface 1907c, and after the user-entered login credentials have been authenticated by the authentication service 1904a of the print service providing apparatus 1904, the print user interface 1907d allows the user to specify a specific print job to be printed.

Otherwise, the operation of the system 1900 is similar to that of the system 1600 of FIG. 16.

Figure 20:
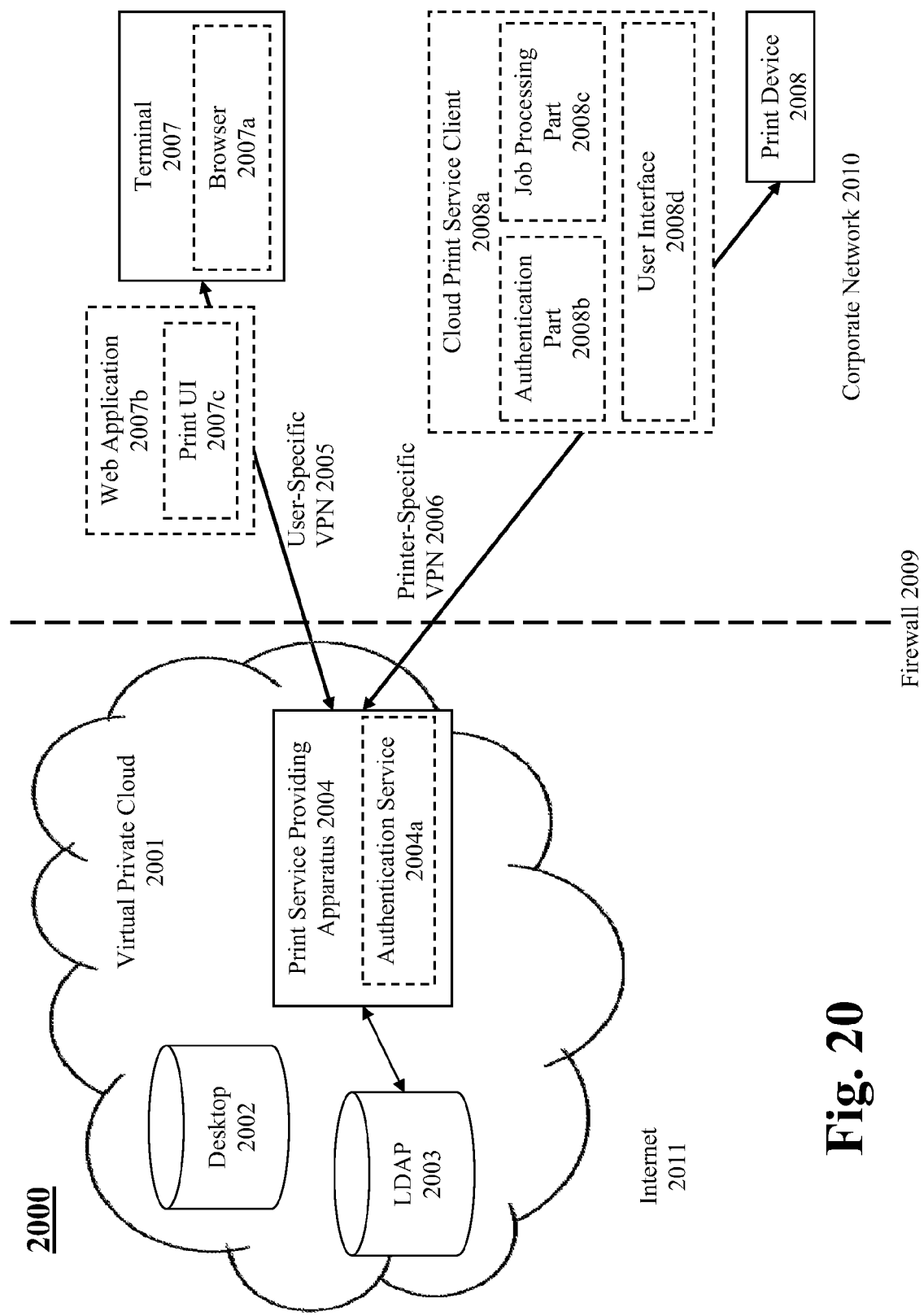
FIG. 20 shows a block diagram of a system, according to another exemplary embodiment.

With reference to FIG. 20, another system configuration for providing a cloud print service is described below.

As shown in FIG. 20, system 2000 includes a virtual private cloud 2001, desktop 2002, LDAP 2003, a print service providing apparatus 2004, a user-specific virtual private network 2005, a printer-specific virtual private network 2006, a terminal 2007 (including a browser 2007a), a print device 2008, a firewall 2009, a corporate network 2010 and the Internet 2011.

The print service providing apparatus 2004 includes authentication service 2004a and provides to the terminal 2007 a web application 2007b including a print user interface 2007c. The web application 2007b is provided to the terminal 2007 through the user-specific virtual private network 2005 and displayed in the browser 2007a.

The print service providing apparatus 2004 also provides to the print device 2008 a cloud print service client 2008a including an authentication part 2008b, a job processing part 2008c and a user interface 2008d.

In the system 2000 of FIG. 20, the print job and the login credentials provided by the user are entered using the print user interface 2007c provided via the web application 2007b in the browser 2007a of the terminal 2007. After the user-entered login credentials have been authenticated by the authentication service 2004a of the print service providing apparatus 2004, the print service providing apparatus 2004 uploads the received print job.

Otherwise, the operation of the system 2000 is similar to that of the system 1600 of FIG. 16.

Figure 21A:
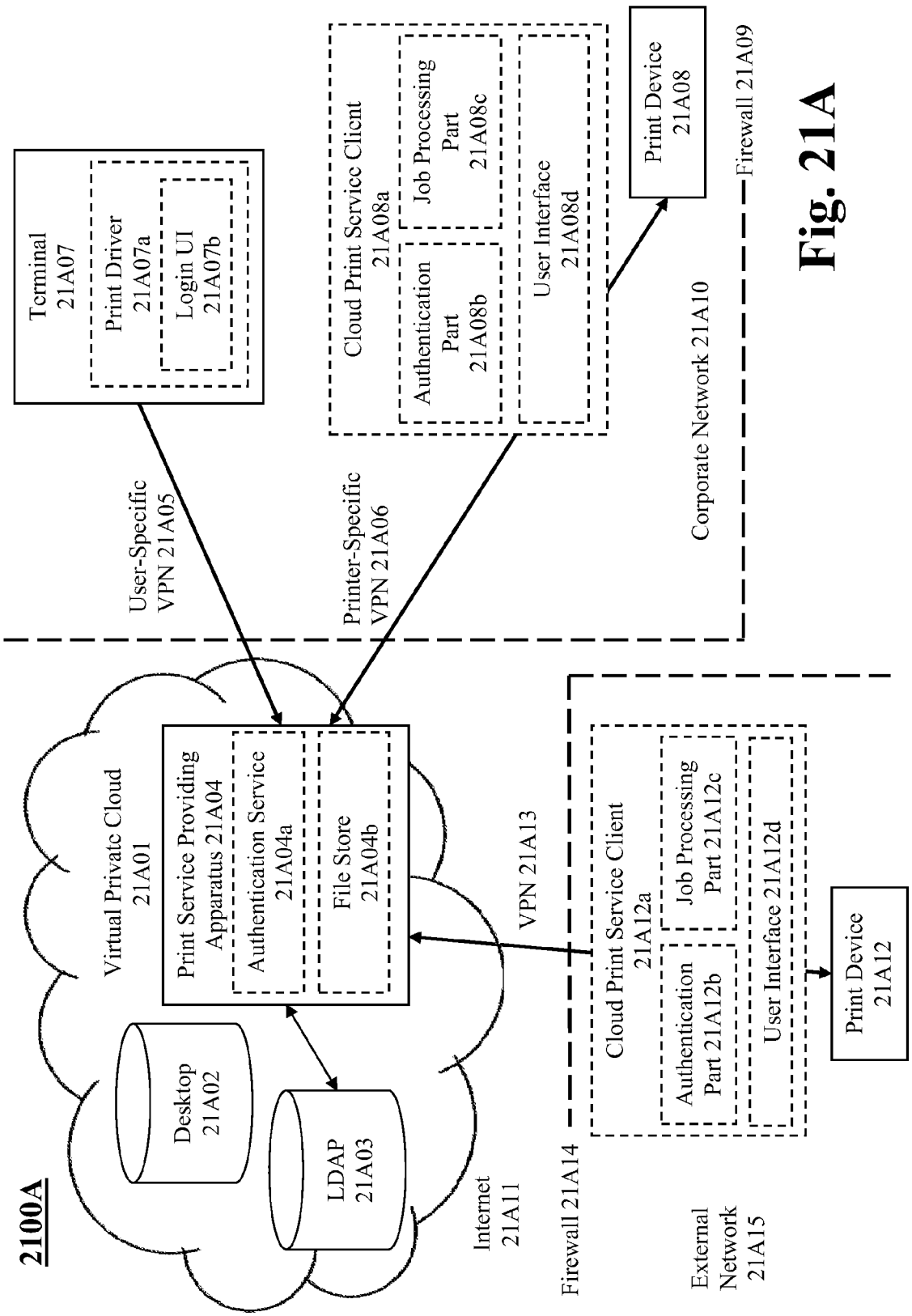
FIG. 21A shows a block diagram of a system, according to another exemplary embodiment.

With reference to FIG. 21A, another system configuration for providing a cloud print service is described below.

As shown in FIG. 21A, system 2100A includes a virtual private cloud 21A01, desktop 21A02, LDAP 21A03, a print service providing apparatus 21A04, a user-specific virtual private network 21A05, a printer-specific virtual private network 21A06, a terminal 21A07, a print device 21A08, a firewall 21A09, a corporate network 21A10, the Internet 21A11, a print device 21A12, a virtual private network 21A13, a firewall 21A14 and an external network 21A15.

The print service providing apparatus 21A04 includes authentication service 21A04a and a file store 21A04b.

The terminal 21A07 includes a print driver 21A07a including a login user interface 21A07b.

The print service providing apparatus 21A04 provides to the print device 21A08 a cloud print service client 21A08a including an authentication part 21A08b, a job processing part 21A08c and a user interface 21A08d. Similarly, the print service providing apparatus 21A04 provides to the print device 21A12 a cloud print service client 21A12a including an authentication part 21A12b, a job processing part 21A12c and a user interface 21A12d.

In the system 2100A of FIG. 21A, the print job and the login credentials provided by the user are entered using the login user interface 21A07b provided by the print driver 2107a on the terminal 21A07. After the user-entered login credentials have been authenticated by the authentication service 2104a of the print service providing apparatus 2104, the print service providing apparatus 2104 uploads the received print job.

Otherwise, the operation of the system 2100 is similar to that of the system 1600 of FIG. 16.

The system 2100A might be used, for example, in the case of a global company wherein a particular company has multiple corporate networks in different countries. For example, in the system 2100B illustrated in FIG. 21B, an office employee can print a document from a terminal device connected to "Corporate Network A" using his or her login credentials, and then travel to the company's other office, enter the login credentials into a print device connected to "Corporate Network B" and upon successful authentication of the login credentials via the LDAP 21B03, select and retrieve the printout of the print job(s) he or she submitted and selected. Similarly, as illustrated in FIG. 21C, the office employee can travel to the company's other office located in a different country (i.e. "Corporate Network B in Country B") and retrieve the document in the same manner.

Figure 21B:
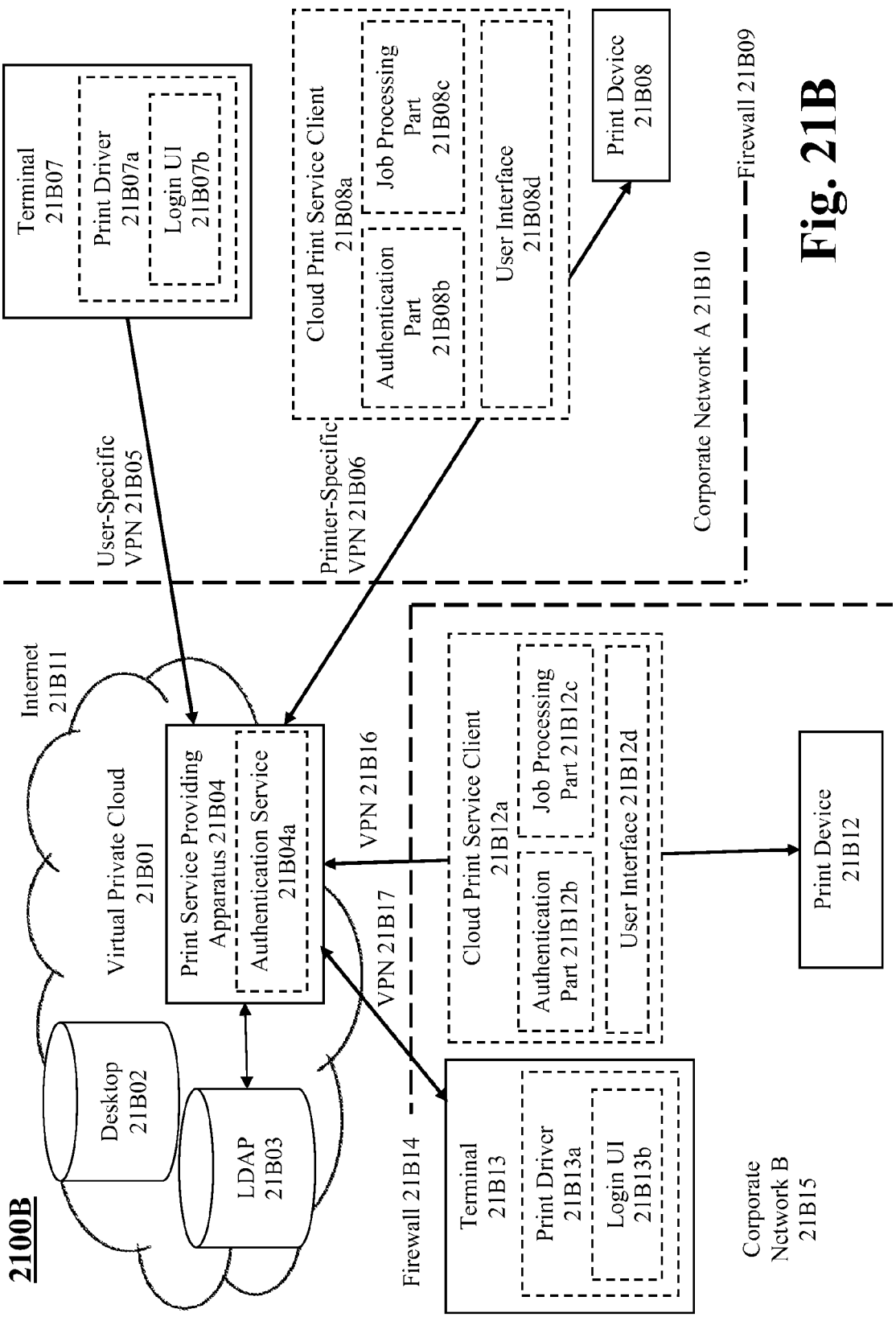
FIG. 21B shows a block diagram of a system, according to another exemplary embodiment.
Figure 21C:
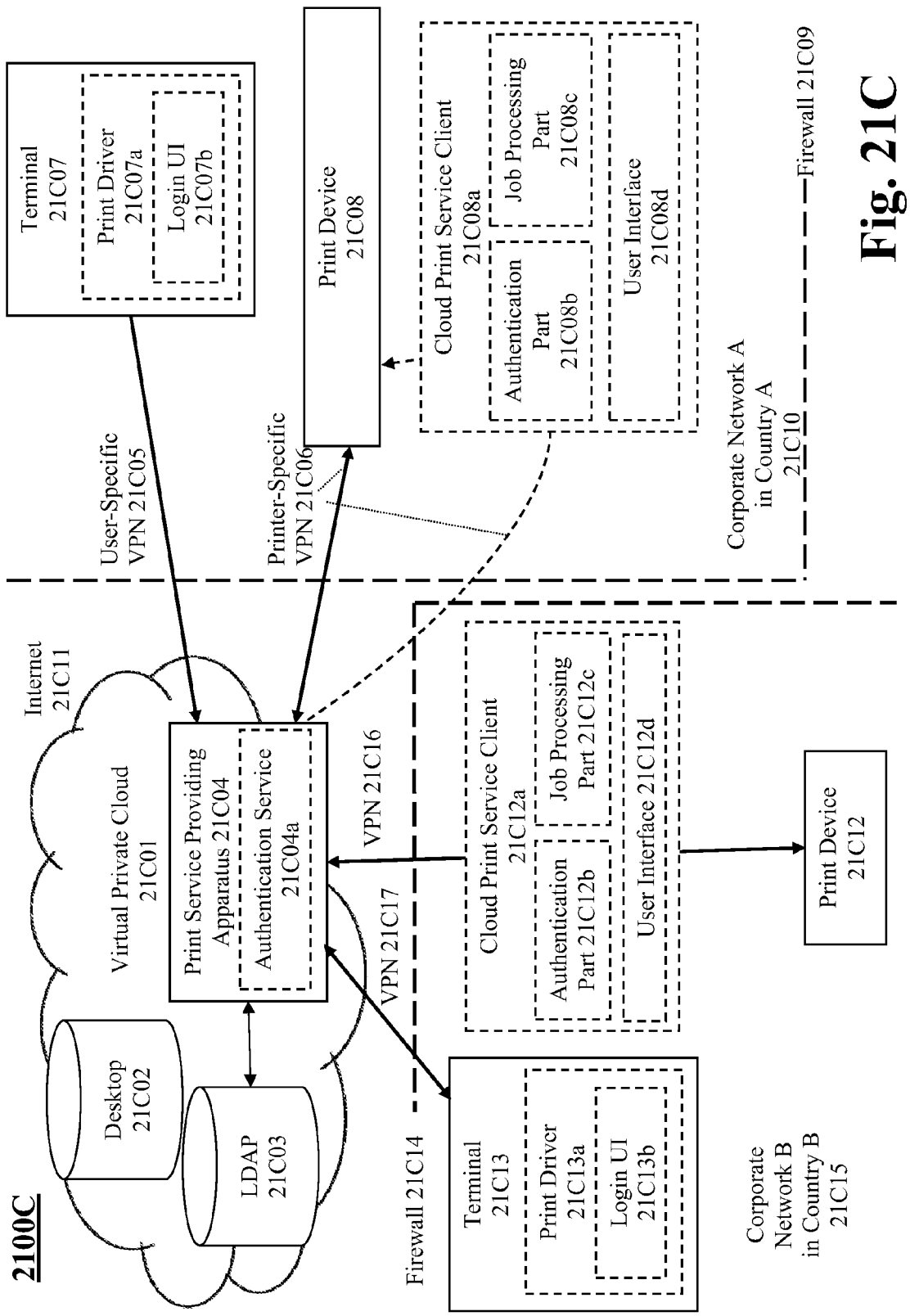
FIG. 21C shows a block diagram of a system, according to another exemplary embodiment.

However, even in the system configurations shown in FIGS. 21A-21C, the office employee can still print to a printer connected to the same corporate network from which he or she is printing.

Figure 22:
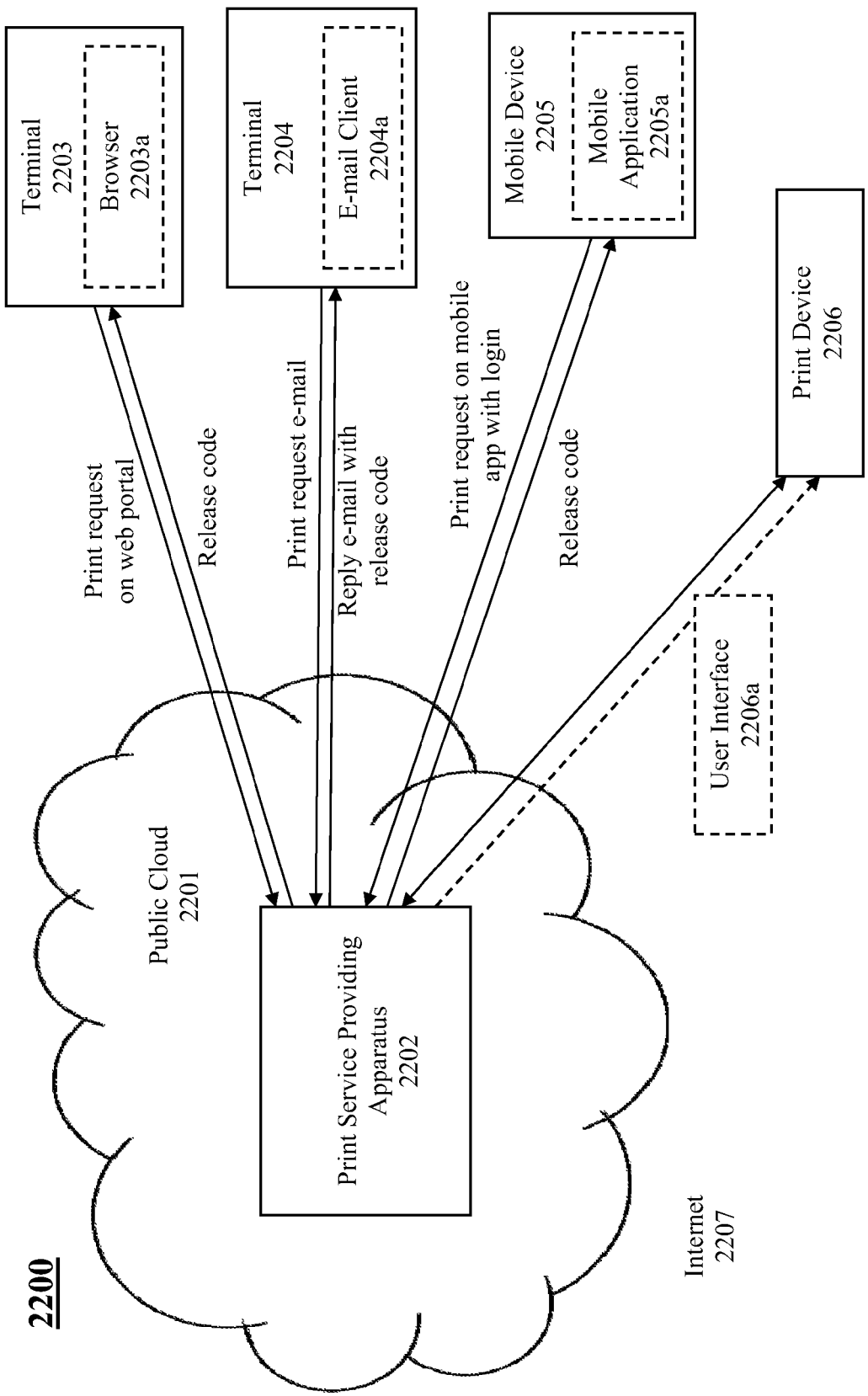
FIG. 22 shows a block diagram of a system, according to another exemplary embodiment.

With reference to FIG. 22, another system configuration for providing a cloud print service is described below.

As shown in FIG. 22, system 2200 includes a public cloud 2201, a print service providing apparatus 2202, a terminal 2203 (including a browser 2203a), a terminal 2204 (including an e-mail client 2204a), a mobile device 2205 (including a mobile application 2205a), a print device 2206 and the Internet 2207. A plurality of web servers, e-mail servers, rendering servers, and file servers accessible through the public cloud 2201 may be utilized to facilitate the operation of the system 2200.

The system 2200 might be used, for example, in the case of a traveling executive of a company wherein the traveling executive wishes to print a document at a public location such as an airport or a hotel. For example, the traveling executive can connect his or her laptop PC to the Internet 2207 at the airport and submit a document either through the web portal via the web browser 2203a or by e-mail using the e-mail client 2204a. Or, the traveling executive can use a mobile device to submit the document through the web portal, via e-mail or using a mobile application (on any of various mobile platforms, such as, e.g., iOS, Blackberry OS, Android, Windows Mobile, Windows Phone, etc.) for submitting print requests. The mobile application may require that the traveling executive log in before using the mobile application to submit a print request. Using the release code received in return, the traveling executive can go to a public printer, enter the code using the user interface 2206a provided by the print service providing apparatus 2202 and receive a printout of the document.

Figure 23:
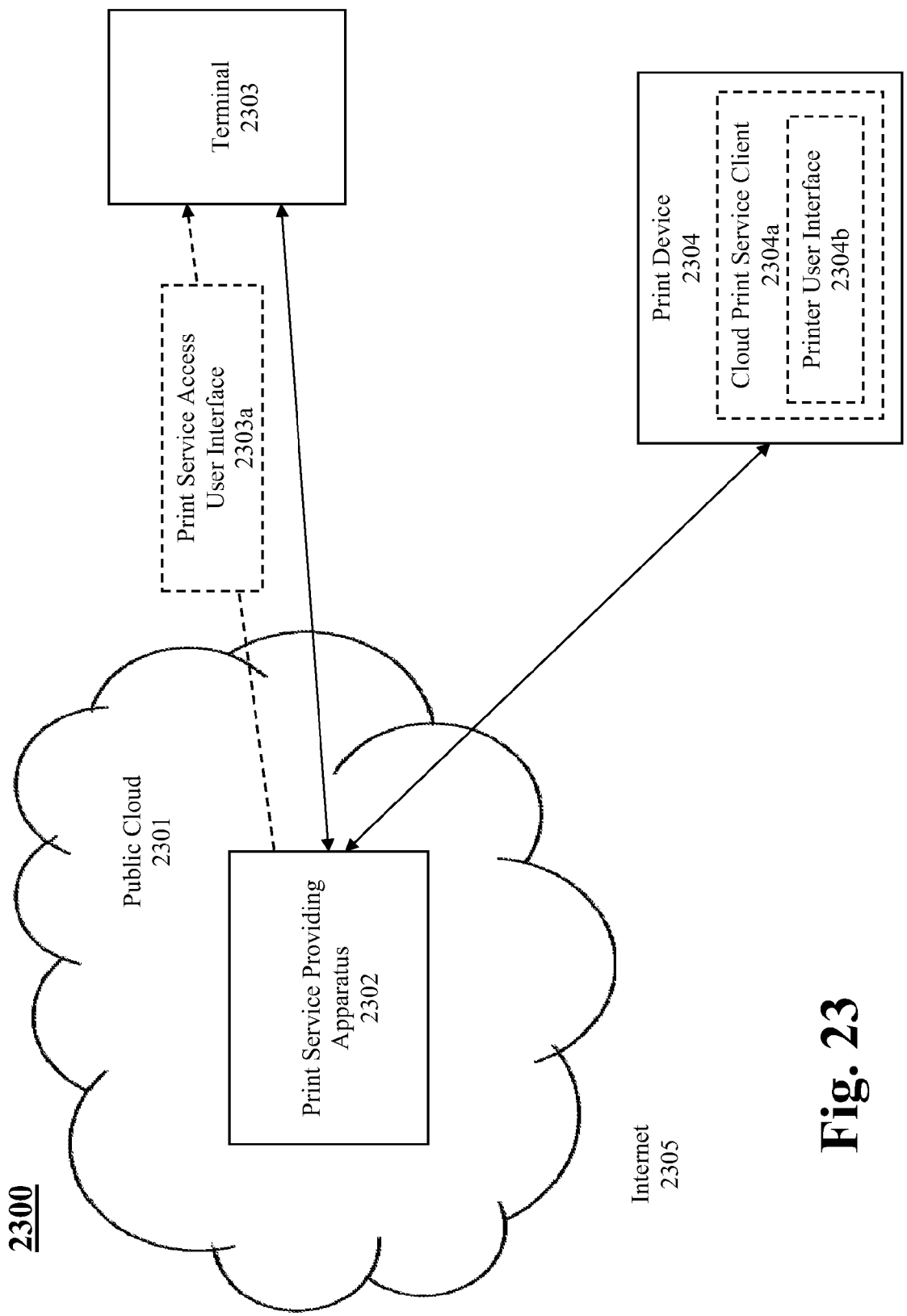
FIG. 23 shows a block diagram of a system, according to another exemplary embodiment.

With reference to FIG. 23, another system configuration for providing a cloud print service is described below.

As shown in FIG. 23, system 2300 includes a public cloud 2301, a print service providing apparatus 2302, a terminal 2303 (including a print service access user interface 2303a provided by the print service providing apparatus 2302), a print device 2304 (including a cloud print service client 2304a including a printer user interface 2304b) and the Internet 2305.

The print service providing apparatus 2302 provides the print service access user interface 2303a to the terminal 2303 through a public network and receives and stores the print job uploaded through the print service access user interface 2303a from the terminal 2303 via the public network. Upon receiving the print job, the print service providing apparatus 2302 sends a release code associated with the print job through the public network to the print service access user interface 2303a on the terminal 2303.

In the present embodiment, the cloud print service client 2304a is included in the print device 2304. However, as illustrated above, the cloud print service client 2304a can also be provided by the print service providing apparatus 2302.

The cloud print service client 2304a includes a printer user interface 2304b configured for user entry of the release code. When the release code is entered, the cloud print service client 2304a communicates the release code to the print service providing apparatus 2302 and receives the print job from the print service providing apparatus 2302 in response. The print device 2304 processes the received print job and generates a print output based on the processed print job.

Figure 24A:
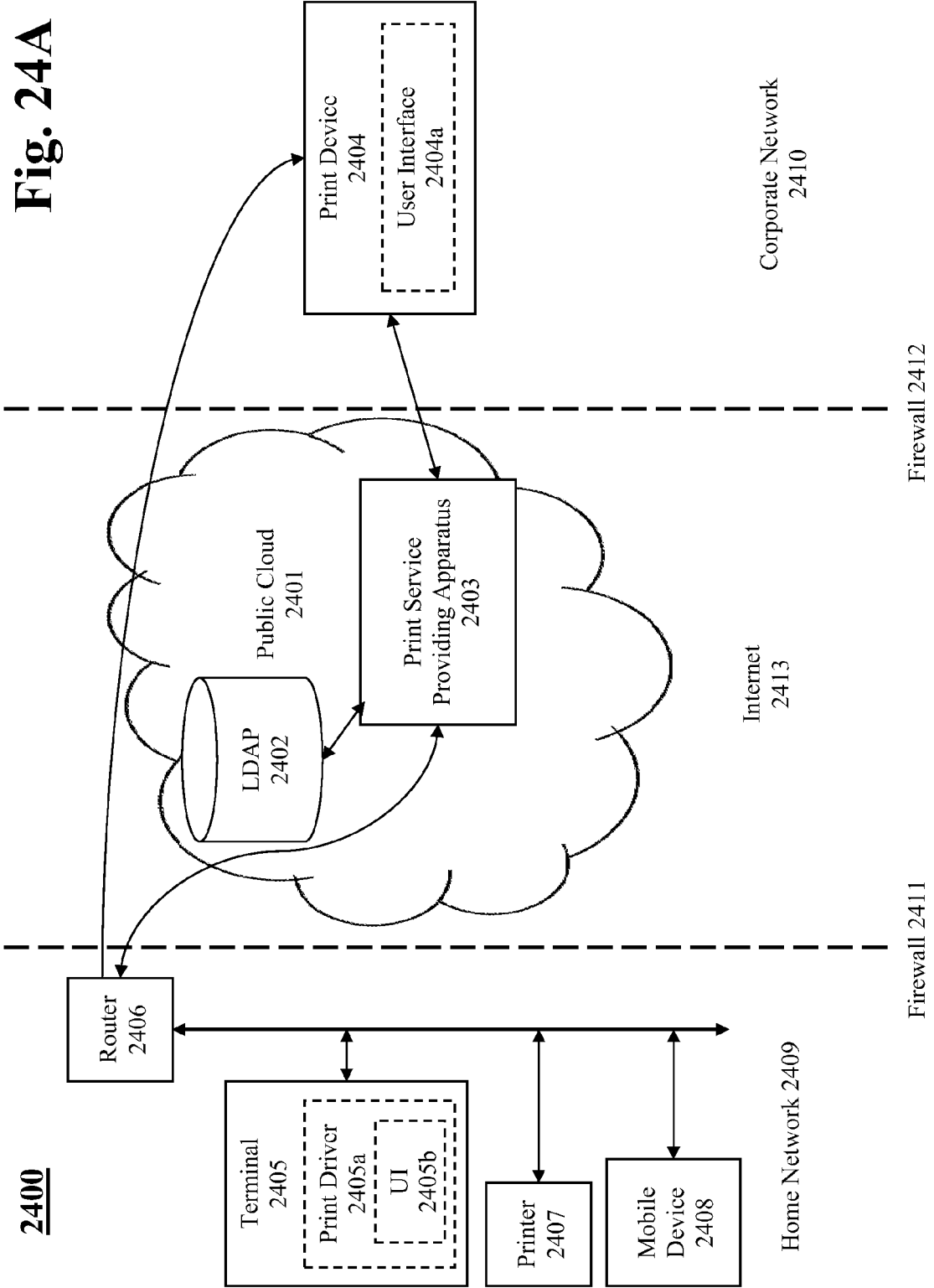
FIG. 24A shows a block diagram of a system, according to another exemplary embodiment.

With reference to FIG. 24A, another system configuration for providing a cloud print service is described below.

As shown in FIG. 24A, system 2400 includes a public cloud 2401, LDAP 2402, a print service providing apparatus 2403, a print device 2404 (including a user interface 2404a), a terminal 2405 (including a print driver 2405a with a user interface 2405b), a router 2406, a printer 2407, a mobile device 2408, a home network 2409, a corporate network 2410, firewalls 2411 and 2412, and the Internet 2413.

The system 2400 might be used, for example, in a case that a company employee wishes to submit a print job (to be printed either from a home printer 2407 or a corporate printer 2404 at the office) from home. For example, when the company employee prints a document from a PC (i.e. terminal 2405), a print job is generated, and the print job is submitted along with the company employee's login credentials through the user interface 2405b provided by the print driver 2405a. The print job is uploaded to the print service providing apparatus 2403. If the company employee wishes to retrieve the printout of the print job at the office, he or she can enter the login credentials at a corporate printer, and upon successful authentication by the LDAP 2402, the printout is output to the company employee.

In a case that the company employee wishes to retrieve the printout at the home printer 2407, the generated print job is first uploaded to the print service providing apparatus 2403 either via the corporate virtual private network or directly via the Internet. Then, the print job is simply sent to the home printer 2407 (but not via the corporate virtual private network), and the company employee receives the printout.

Further, the company employee can print documents from a mobile device such as a tablet. In such a case, the generate print job is uploaded to the print service providing apparatus 2403 and sent back to the home printer 2407, where the company employee can retrieve the printout.

With reference to FIG. 24B, another system configuration for providing a cloud print service is described below.

As shown in FIG. 24B, system 2450 includes a public cloud 2451, a print service providing apparatus 2453, a print device 2454, a terminal 2455 (including a print driver 2455*a* with a user interface 2455*b*), a router 2456, a printer 2457, a mobile device 2458, a home network 2459, a corporate network 2460, firewalls 2461 and 2462, and the Internet 2463.

FIG. 24B illustrates the case, discussed above in connection with the system 2400 of FIG. 24A, in which a remote employee wishes to print a document from a PC at home and retrieve the printout at a local printer (i.e. the printer 2457). In such a case, the remote employee prints a document from a PC (i.e. the terminal 2455), and a print job is generated and sent to the print service providing apparatus 2453 via the router 2456 through the corporate network 2460.

Upon receiving the print job, the print service providing apparatus 2453 sends the print job to the home printer 2457 through the router 2456. If the address of the home printer 2457 is already known by the print service providing apparatus 2453 (for example, the home printer 2457 has a static IP address, and the IP address is registered with the print service providing apparatus 2453), the print job is simply sent to the known address of the home printer 2457. If the address of the home printer 2457 is not known at the time the print service providing apparatus 2453 receives the print job, the print service providing apparatus 2453 can, for example, query the home printer 2457 for its network address. Or, the home printer 2457 may periodically broadcast its network address to the print service providing apparatus 2453. In such cases, the home printer 2457 may be preconfigured to be able to communicate with the print service providing apparatus 2453. Once the network address of the home printer 2457 is determined, the print job is simply sent to the home printer 2457, and the company employee retrieves the printout at the home printer 2457.

The system 2450 may be used, for example, in a case that a corporate enterprise wishes to keep track of the working hours of its corporate employees. The corporate enterprise can track the activity of a corporate employee by monitoring the employee's network activity. The employee's virtual private network connection to the cloud print service is established through the corporate network 2460. Thus, the network activity of the employee can easily be logged for tracking purposes.

The system 2450 of FIG. 24B may also be used for accounting purposes. The printing activities done at home by a corporate employee can be monitored to determine the amount of reimbursement due to the corporate employee for printer consumables (i.e. paper, toner, printer replacement parts, etc.) used while performing job-related tasks at the home office. The print service providing apparatus 2453, for example, can maintain, for each print job, printed job information. The printed job information may include the printing device used (e.g., the printer 2457), information about the employee and the number of pages printed. The print service providing apparatus 2453 may also maintain a total number of pages printed by the particular employee or by the particular printing device.

Another possible configuration of home office printing for printing to the home printer 2457 from a home PC (e.g. the terminal 2455) is a system in which a print job is uploaded to the print service providing apparatus 2453 directly via the Internet without going through the corporate network 2460. Then, the print job is simply sent to the home printer 2457 via the Internet and the network through the router 2456 (using the network address of the home printer 2457 determined in a manner similar to that discussed in connection with the system 2450 of FIG. 24B), and the company employee retrieves the printout at the home printer 2457.

This configuration can also be used for tracking and accounting purposes discussed above, for example, with the print service providing apparatus 2453 logging the activities of the employee.

Yet another possible configuration may be a system in which the employee uses a mobile device, such as a tablet (e.g., the iPad), to submit the print job. The employee may wish to print an e-mail, an article or a chart while using his or her mobile device at home (e.g., the mobile device 2458). In such a case, a print job is uploaded from the mobile device 2458 to the print service providing apparatus 2453 via the router 2456, and sent to the home printer 2457 (in a manner similar to those discussed above), where the company employee can retrieve the printout.

Likewise, this configuration can also be used for tracking and accounting purposes discussed above, for example, with the print service providing apparatus 2453 logging the activities of the employee.

Figure 25:
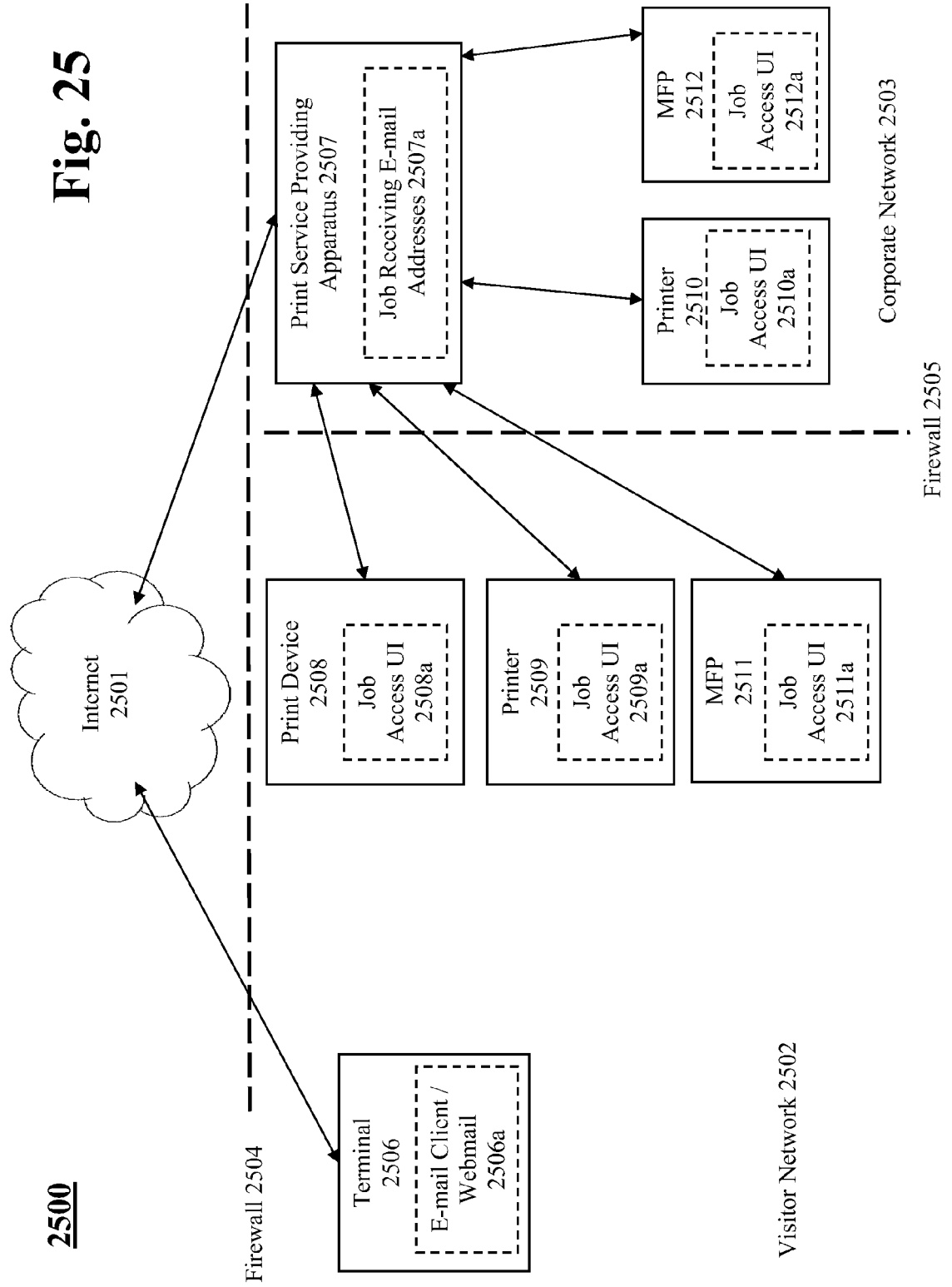
FIG. 25 shows a block diagram of a system, according to another exemplary embodiment.

With reference to FIG. 25, another system configuration for providing a cloud print service is described below.

System 2500 of FIG. 25 includes the Internet 2501, a visitor network 2502, a corporate network 2503, firewalls 2504 and 2505, a terminal 2506 (including an e-mail client/webmail 2506*a*), a print service providing apparatus 2507 (including job receiving e-mail addresses 2507*a*), a print device 2508, printers 2509 and 2510, and MFPs 2511 and 2512.

The firewall 2504 filters access requests from outside the enterprise environment (e.g., the company for which the system 2500 is implemented), which includes both the visitor network 2502 and the corporate network 2503. The firewall 2505 filters access requests from the visitor network 2502 to resources on the corporate network 2503.

The terminal 2506 is configured to receive e-mail addressed to a corresponding address and transmit an e-mail through the visitor network 2502 and the firewall 2504 via the Internet to one of the job receiving e-mail addresses 2507*a* maintained by the print service providing apparatus 2507.

The print service providing apparatus 2507 is connected to the corporate network 2503, receives print request e-mails from the terminal 2506 through the corporate network 2503, the firewall 2504 and the Internet, and sends a release code associated with the print job through the Internet 2501 back to the terminal 2506.

As shown in FIG. 25, the system 2500 includes a plurality of printing devices (the print device 2508, the printers 2509 and 2510, and the MFPs 2511 and 2512). The print device 2508, the printer 2509 and the MFP 2511 are connected to the visitor network 2502, and the printer 2510 and the MFP 2512 are connected to the corporate network 2503. Each of the printing devices includes a job access user interface configured for user entry of the release code, and each of the printing devices is associated with one of the job receiving e-mail addresses 2507*a* maintained by the print service providing apparatus 2507 through which the respective printing device receives print request e-mails. When the release code is entered into the job access user interface by the user, the particular printing device communicates the release code to the print service providing apparatus 2507. In response, the print service providing apparatus 2507 sends the print job received at the corresponding job receiving e-mail address to the particular printing device. Upon receiving the print job, the particular printing device processes the print job to generate a print output based on the processed print job. The generated print output is then output to the user.

Although these printing devices may all reside in the same enterprise environment (i.e. within a single company), the users of the system 2500 may have varying access to these printing devices. For example, corporate employees might be permitted to print from all of the printing devices (i.e. the printers 2509 and 2510, and the MFPs 2511 and 2512), whereas visiting users are permitted to print from only the printing devices on the visitor network 2502 (i.e. the printer 2509 and the MFP 2511).

Figure 26:
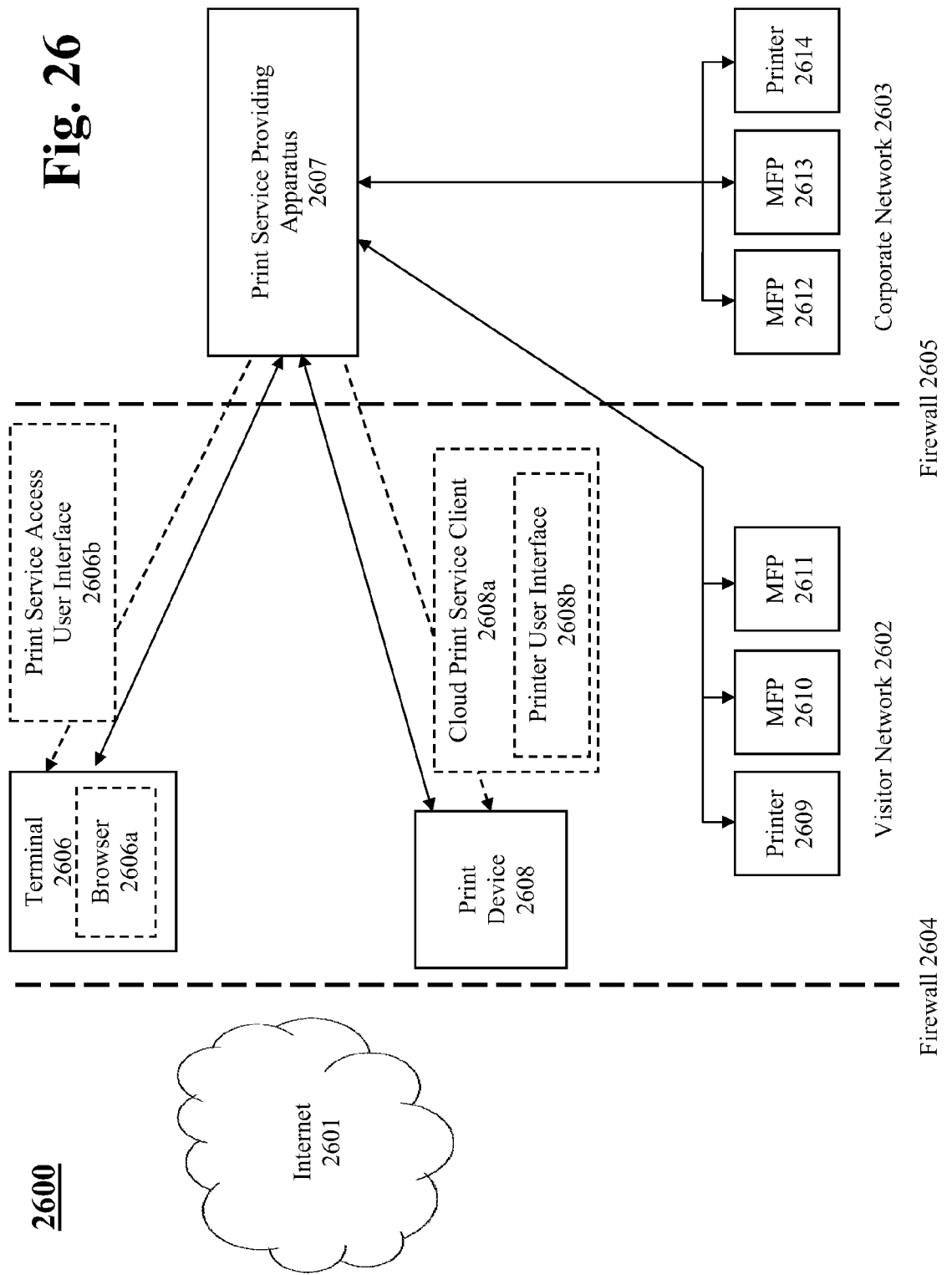
FIG. 26 shows a block diagram of a system, according to another exemplary embodiment.

With reference to FIG. 26, another system configuration for providing a cloud print service is described below.

System 2600 of FIG. 26 includes the Internet 2601, a visitor network 2602, a corporate network 2603, firewalls 2604 and 2605, a terminal 2606 (including a browser 2606a), a print service providing apparatus 2607, a print device 2608, printers 2609 and 2614, and MFPs 2610-2613.

The firewall 2604 filters access requests from outside the enterprise environment (e.g., the company for which the system 2600 is implemented), which includes both the visitor network 2602 and the corporate network 2603. The firewall 2605 filters access requests from the visitor network 2602 to resources on the corporate network 2603. In FIG. 26, the terminal 2606 and the print device 2608 are connected to the visitor network 2602, and the print service providing apparatus 2607 is connected to the corporate network 2603. Alternatively, the print service providing apparatus 2607 can be connected to the visitor network 2602. Such a configuration is illustrated in FIG. 27.

The print service providing apparatus 2607 is configured to provide the print service access user interface 2606b through a network to the terminal 2606, receive and store the print job uploaded through the print service access user interface 2606b from the terminal 2606 via the network, and send a release code associated with the print job through the network to the print service access user interface 2606b on the terminal 2606.

The print service providing apparatus provides to the print device 2608a cloud print service client 2608a including a printer user interface 2608b configured for user entry of the release code. When the release code is entered, the cloud print service client 2608a communicates the release code to the print service providing apparatus 2607, receives the print job from the print service providing apparatus 2607 in response to the release code transmitted to the print service providing apparatus 2607, and causes the print device 2608 to process the print job to generate a print output based on the processed print job.

Figure 27:
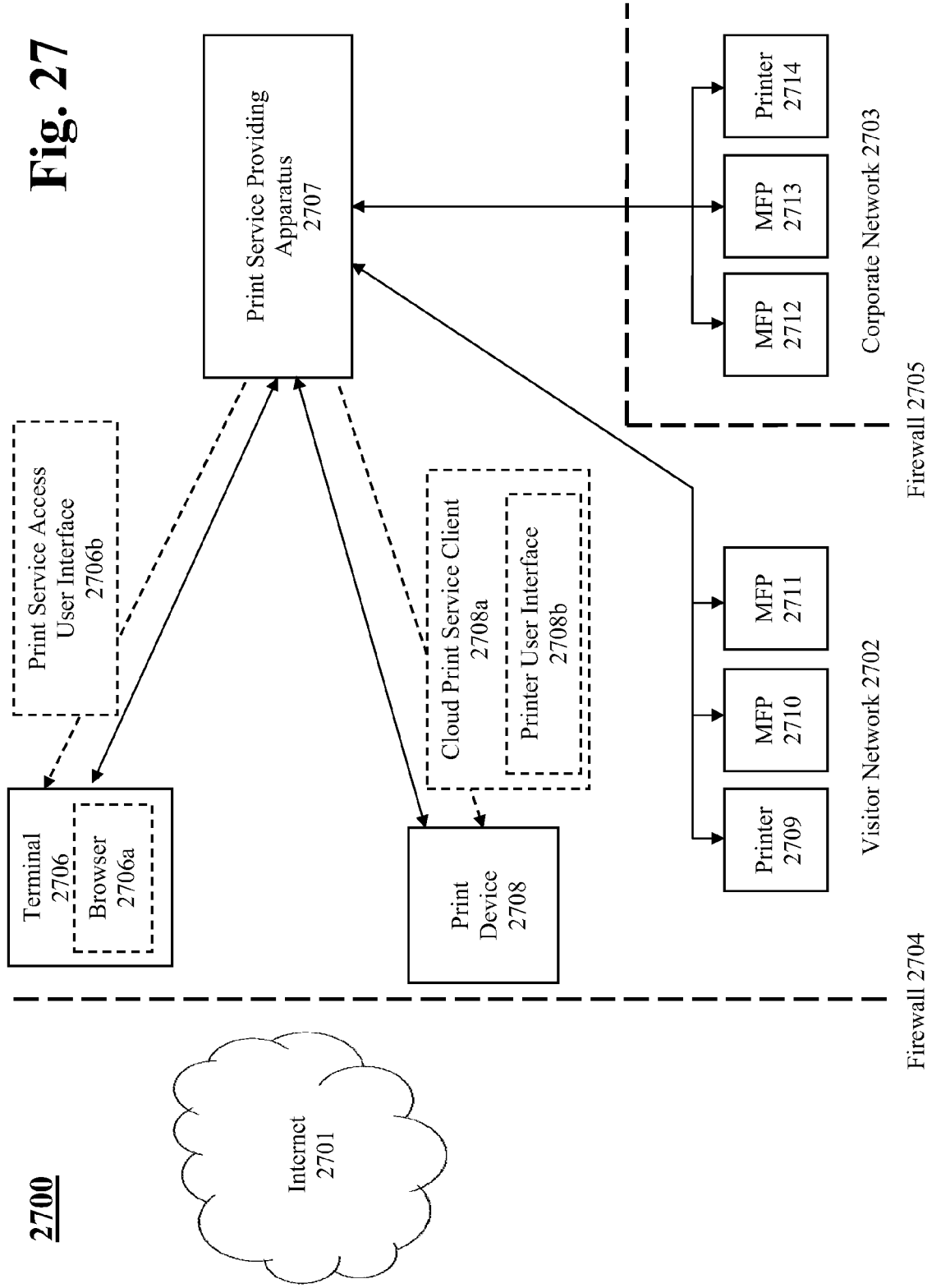
FIG. 27 shows a block diagram of a system, according to another exemplary embodiment.

With reference to FIG. 27, another system configuration for providing a cloud print service is described below.

System 2700 of FIG. 27 includes the Internet 2701, a visitor network 2702, a corporate network 2703, firewalls 2704 and 2705, a terminal 2706 (including a browser 2706a), a print service providing apparatus 2707, a print device 2708, printers 2709 and 2714, and MFPs 2710-2713. In contrast to the print service providing apparatus 2607 of the system 2600, the print service providing apparatus 2707 is connected to the visitor network 2702 instead of the corporate network 2703.

The system 2700 might be used, for example, in a case that a company visitor wishes to print from a laptop PC. For example, the company visitor connects his or her laptop PC to the visitor network 2702 and opens a web portal to upload a document to the print service providing apparatus 2702 via the browser 2706a. Once the print service providing apparatus 2707 receives the document, the print service providing apparatus 2707 sends back a release code via the web portal on the browser 2706a. The company visitor can then go to the nearest corporate public space printer (i.e. one of the printer 2709 and the MFPs 2710 and 2711) and enter the release code to retrieve a printout of the document.

Figure 28:
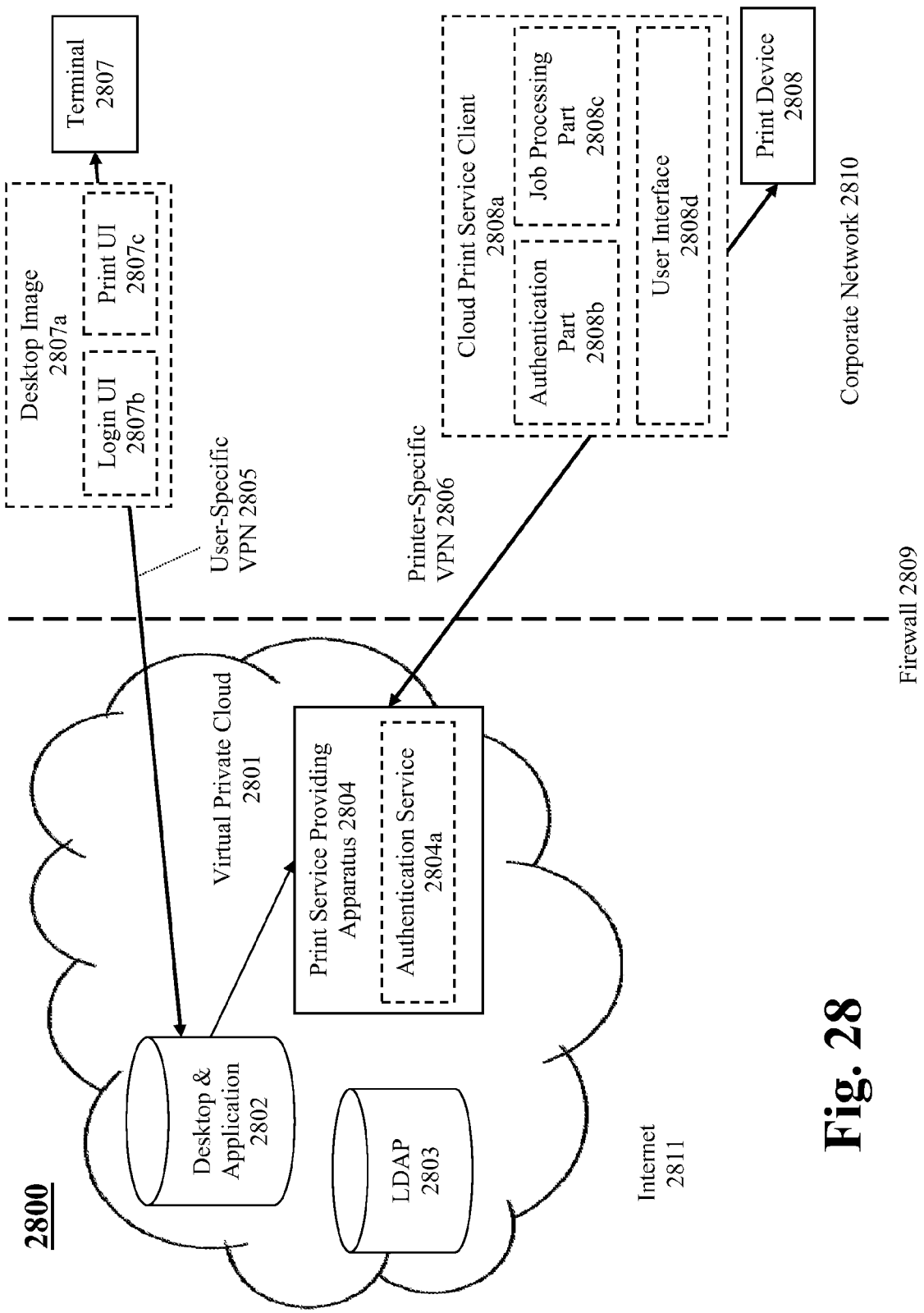
FIG. 28 shows a block diagram of a system, according to another exemplary embodiment.

With reference to FIG. 28, another system configuration for providing a cloud print service is described below.

As shown in FIG. 28, system 2800 includes a virtual private cloud 2801, desktop & application 2802, LDAP 2803, a print service providing apparatus 2804, a user-specific virtual private network 2805, a printer-specific virtual private network 2806, a terminal 2807, a print device 2808, a firewall 2809, a corporate network 2810 and the Internet 2811.

The print service providing apparatus 2804 includes authentication service 2804a and provides to the print device 2808 a cloud print service client 2808a including an authentication part 2808b, a job processing part 2808c and a user interface 2808d.

The desktop & application 2802 provides to the terminal 2807 a desktop image 2807a including a login user interface 2807b and a print user interface 2807c. The desktop image 2807a is provided to the terminal 2807 through the user-specific virtual private network 2805.

In the system 2800 of FIG. 28, the login credentials provided by the user are entered using the login user interface 2807b, and upon successful authentication of the login credentials, the print user interface 2807d provided in the desktop image 2807a allows the user to specify a specific print job to be printed.

Otherwise, the operation of the system 2800 is similar to that of the system 1600 of FIG. 16.

The system 2800 might be used, for example, in a case that an office employee wishes to print from a terminal via a virtual desktop image. For example, the office employee retrieves the desktop image from desktop & application 2802 through the virtual private cloud 2801. The office employee then opens an application (e.g. SAP) and prints a document using the printer driver on the desktop & application 2802. The document is sent from the application to the print service providing apparatus 2804. The office employee then goes to a corporate printer (i.e. print device 2808) and enters his or her login credentials. Upon successful authentication of the login credentials via the LDAP 2803, a job list including the print jobs submitted by the office employee is displayed, and the office employee selects and retrieves the printout of the print jobs he or she wishes to print.

Figure 29:
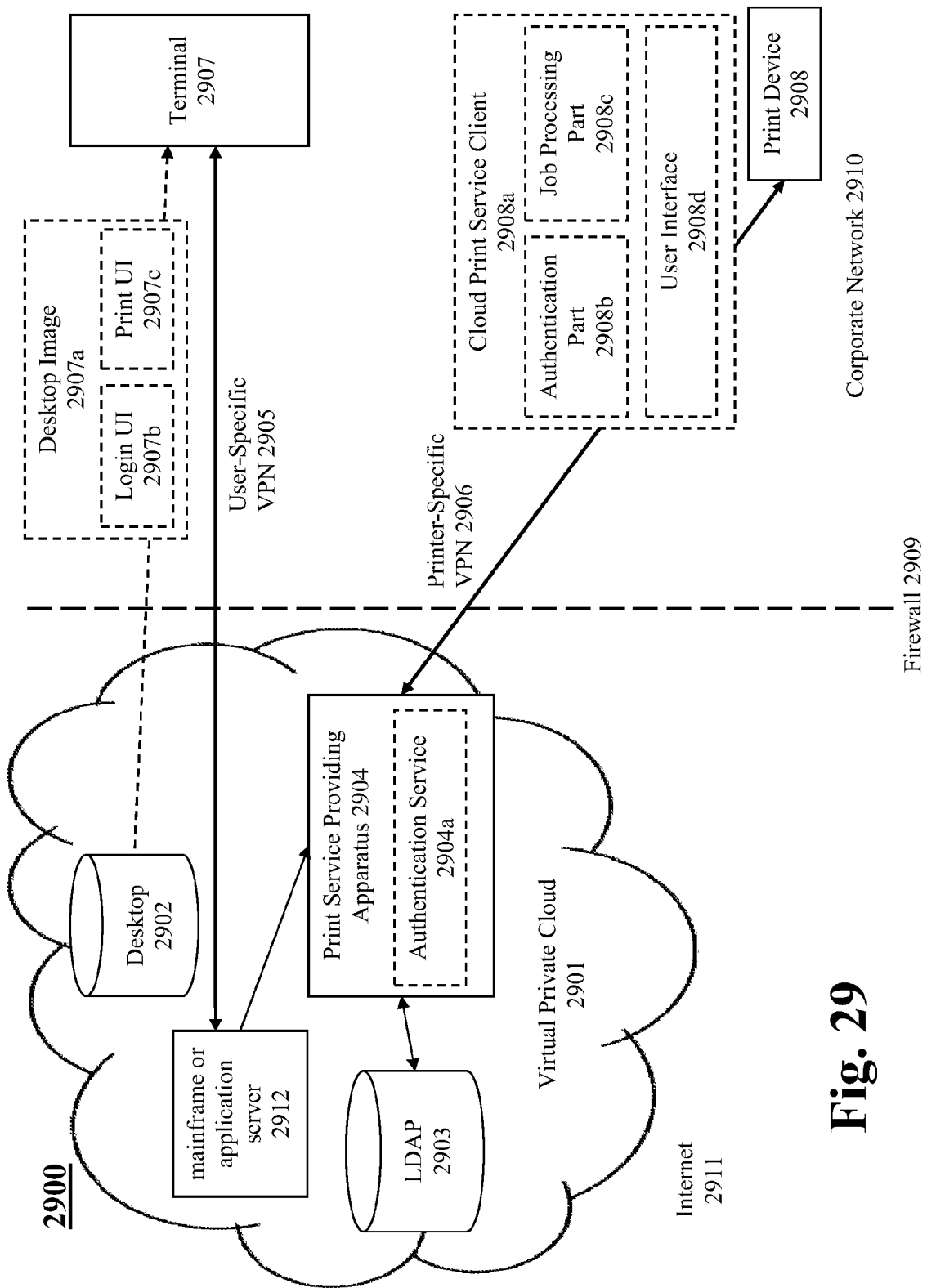
FIG. 29 shows a block diagram of a system, according to another exemplary embodiment.

With reference to FIG. 29, another system configuration for providing a cloud print service is described below.

As shown in FIG. 29, system 2900 includes a virtual private cloud 2901, desktop & application 2902, mainframe or application server 2912, LDAP 2903, a print service providing apparatus 2904, a user-specific virtual private network 2905, a printer-specific virtual private network 2906, a terminal 2907, a print device 2908, a firewall 2909, a corporate network 2910 and the Internet 2911.

The print service providing apparatus 2904 includes authentication service 2904a and provides to the print device 2908 a cloud print service client 2908a including an authentication part 2908b, a job processing part 2908c and a user interface 2908d.

The desktop & application 2902 provides to the terminal 2907 a desktop image 2907a including a login user interface 2907b and a print user interface 2907c. The desktop image 2907a is provided to the terminal 2907 through the user-specific virtual private network 2905.

In the system 2900 of FIG. 29, the login credentials provided by the user are entered using the login user interface 2907b, and upon successful authentication of the login credentials, the print user interface 2907d provided in the desktop image 2907a allows the user to specify a specific print job to be printed.

Otherwise, the operation of the system 2900 is similar to that of the system 1600 of FIG. 16.

The system 2900 might be used, for example, in a case that an office employee wishes to perform SAP printing. For example, the office employee connects and logs into the mainframe or application server 2912 via the desktop image 2907a provided by the desktop 2902. The document is sent from the mainframe or application server 2912 to the print service providing apparatus 2904 on the virtual cloud 2901. Then, the office employee goes to any corporate printer (i.e. print device 2908) and enters his or her login credentials. Upon successful authentication of the login credentials via the LDAP 2903 (or the mainframe or application server 2912), a job list including the print jobs submitted by the office employee is displayed, and the office employee selects and retrieves the printout of the print jobs he or she wishes to print.

Figure 30:
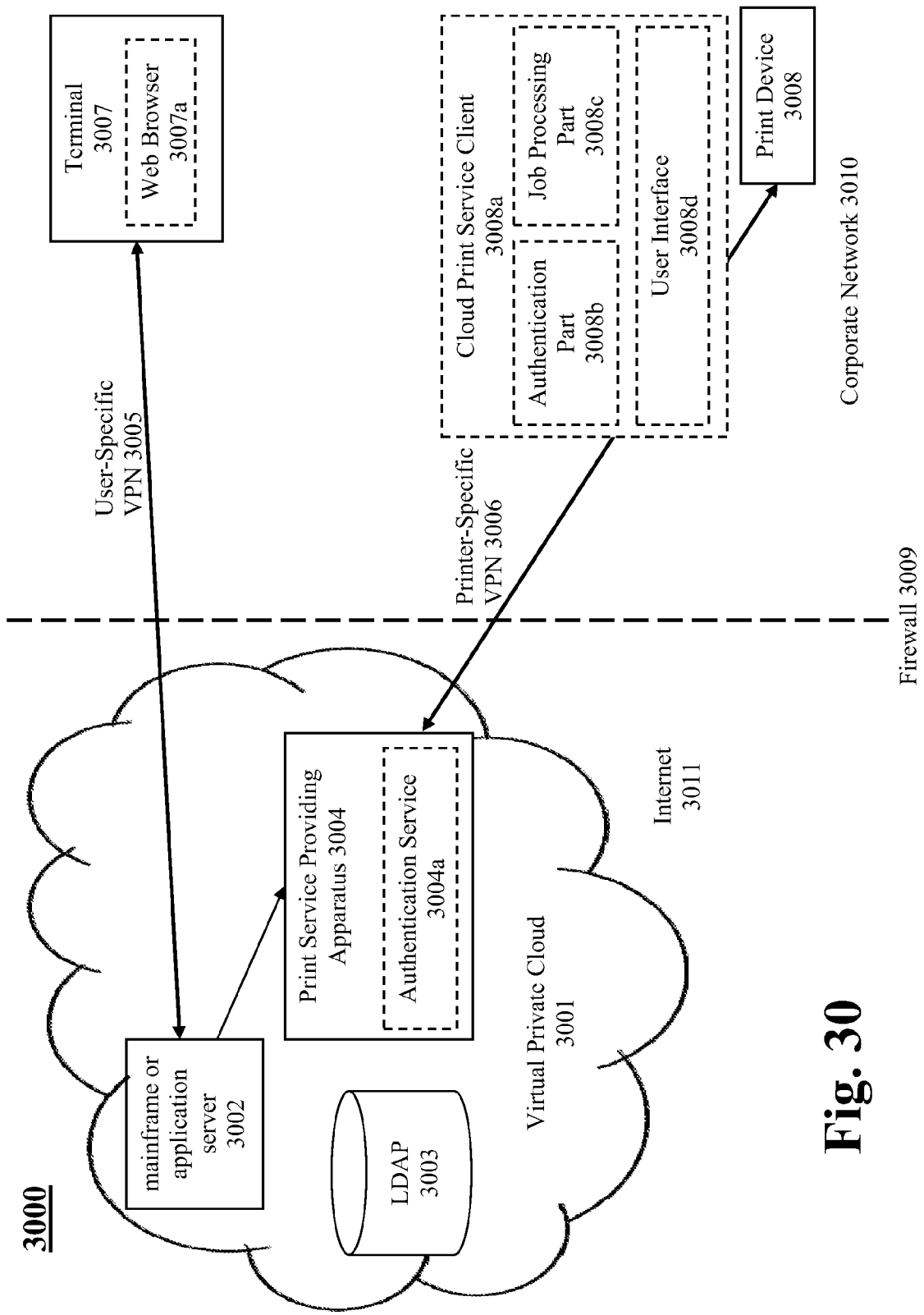
FIG. 30 shows a block diagram of a system, according to another exemplary embodiment.

With reference to FIG. 30, another system configuration for providing a cloud print service is described below.

As shown in FIG. 30, system 3000 includes a virtual private cloud 3001, mainframe or application server 3002, LDAP 3003, a print service providing apparatus 3004, a user-specific virtual private network 3005, a printer-specific virtual private network 3006, a terminal 3007 (including a web browser 3007a), a print device 3008, a firewall 3009, a corporate network 3010 and the Internet 3011.

The print service providing apparatus 3004 includes authentication service 3004a and provides to the print device 3008 a cloud print service client 3008a including an authentication part 3008b, a job processing part 3008c and a user interface 3008d.

In the system 3000 of FIG. 30, the mainframe or application server 3002 is accessed via the web browser 3007a rather than through a desktop image. Otherwise, the operation of the system 3000 is similar to that of the system 2900 of FIG. 29. Thus, the system 3000 can also be used for SAP printing, wherein an office employee would connect and log into the mainframe or application server 3002 via the web browser 3007. The rest of the printing operation is similar to that discussed in connection with the system 2900.

Figure 31:
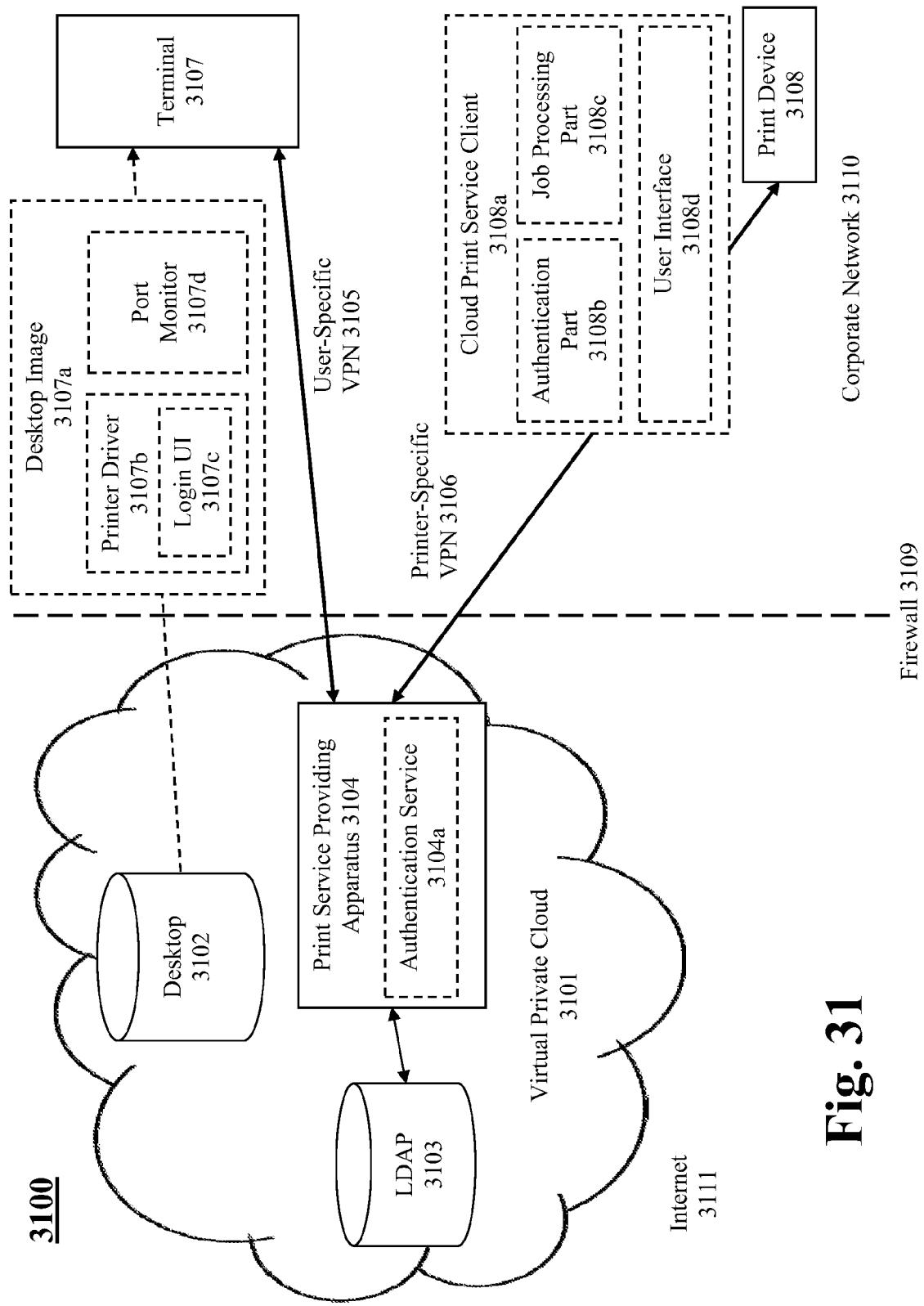
FIG. 31 shows a block diagram of a system, according to another exemplary embodiment.

With reference to FIG. 31, another system configuration for providing a cloud print service is described below.

As shown in FIG. 31, system 3100 includes a virtual private cloud 3101, desktop 3102, LDAP 3103, a print service providing apparatus 3104, a user-specific virtual private network 3105, a printer-specific virtual private network 3106, a terminal 3107, a print device 3108, a firewall 3109, a corporate network 3110 and the Internet 3111.

The print service providing apparatus 3104 includes authentication service 3104a and provides to the print device 3108 a cloud print service client 3108a including an authentication part 3108b, a job processing part 3108c and a user interface 3108d.

The desktop 3102 provides to the terminal 3107 a desktop image 3107a including a printer driver 3107b (including a login user interface 3107c) and a port monitor 3107d.

In the system 3100 of FIG. 31, the user-specific virtual private network 3105 is established with the print service providing apparatus 3104, rather than the desktop 3102 (which is the case in the system 2800). Otherwise, the operation of the system 3100 is similar to that of the system 2800 of FIG. 28.

The system 3100 might be used, for example, in a case that an office employee wishes to print a document using the printer driver available on the virtual desktop. For example, the office employee prints a document from a PC using the printer driver 3107b provided by the desktop 3102. The document is then uploaded to the print service providing apparatus 3104. The office employee goes to any corporate printer (e.g., print device 3108) and enters his or her login credentials. Upon successful authentication of the login credentials via the LDAP 3103, a job list including the print jobs submitted by the office employee is displayed, and the office employee selects and retrieves the printout of the print jobs he or she wishes to print.

Figure 32:
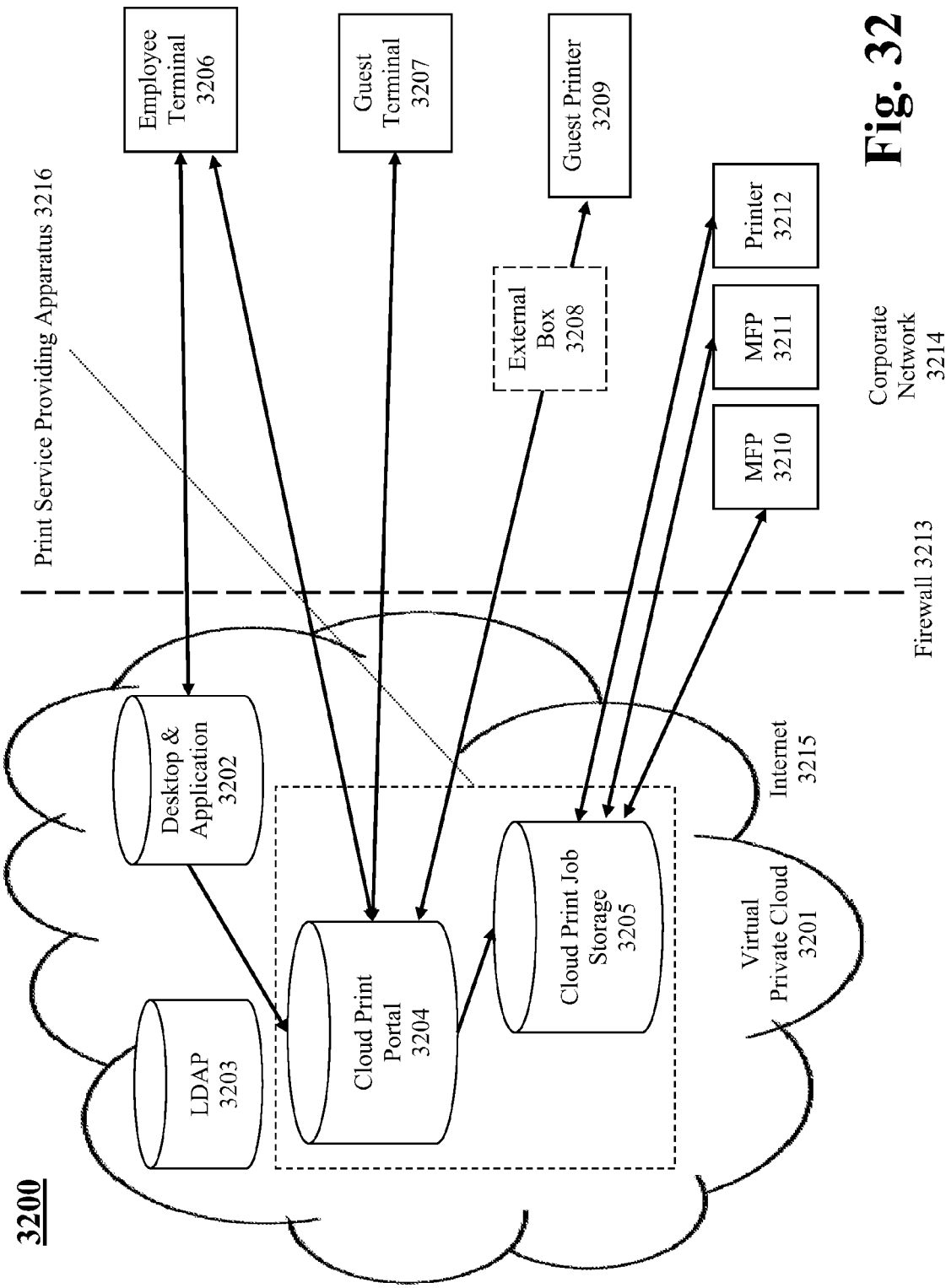
FIG. 32 shows a block diagram of a system, according to another exemplary embodiment.

With reference to FIG. 32, another system configuration for providing a cloud print service is described below.

As shown in FIG. 32, system 3200 includes a virtual private cloud 3201, desktop & application 3202, LDAP 3203, a cloud print portal 3204, cloud print job storage 3205, an employee terminal 3206, a guest terminal 3207, an external box 3208 coupled to a guest printer 3209, corporate printers 3210-3212, a firewall 3213, a corporate network 3214 and the Internet 3215. Further, the cloud print portal 3204 and cloud print job storage 3205 constitute a print service providing apparatus 3216.

FIG. 32 once again illustrates the various printing services available through the system 3200. Users of the system 3200, including company visitors and corporate employees, can print from their terminals via a web portal, e-mail, or mobile applications. In addition, corporate employees can print from a virtual desktop or on applications on the virtual private cloud 3201 via the desktop & application 3202.

The operation of the system 3200 is similar to that discussed in connection with the system 100 of FIG. 1.

With reference to FIG. 33, another system configuration for providing a cloud print service is described below.

As shown in FIG. 33, system 3300 includes a public cloud 3301, a print service providing apparatus 3302, terminal 3303, SAP application 3304, a middleware server 3305, external client terminals 3306 and 3307, print devices 3308 and 3309, external client networks 3310 and 3311, firewalls 3312-3314, intranet 3315 and the Internet 3316.

In this configuration, a user at the terminal 3303 utilizes the SAP application 3304 and submits a print job to the print service providing apparatus 3302 through the middleware server 3305 via the intranet 3315 and the Internet 3316.

The middleware server 3305 includes computer software that provides services to software applications (i.e. the SAP application 3304) beyond those available from the operating system of the terminal 3303.

Upon receiving the print job, the print service providing apparatus 3302 sends the print job to a destination printing device (e.g., the print device 3308 or 3309) via the Internet 3316 and an external client network (e.g., the external client network 3310 or 3311). The network addresses of such destination printing devices are preferably registered with the print service providing apparatus 3302. Also, the print service providing apparatus 3302 may register job information of the print job (for example, including the number of pages printed), and track the total number of pages printed in plural print jobs, when there are more than one (for example, a running print count for a particular customer). In a case that user login credentials are entered before a print job is received by the print service providing apparatus 3302, the print service providing apparatus 3302 registers, for the print job, the user login credentials associated with the print job and print job information (for example, including the number of pages printed in connection with the print job). The print service providing apparatus may also track a total number of pages printed by the user using the login credentials of the user.

The SAP application 3304 may also automatically generate batch jobs triggered by business workflow. For example, every time a business transaction is completed, a receipt may be sent to the printer (e.g., the print device 3308 or 3309) of the customer or vendor for printing.

The system 3300 might be used, for example, in a case that a user wishes to send a confirmation of the latest transaction directly to his or her customer or vendor's printer. As discussed above, the system 3300 can be configured such that after each business transaction, a confirmation letter automatically sent to the customer or vendor's printer for printing.

Another configuration that can be used instead of the system 3300 is a system in which a print job (e.g., a confirmation receipt) can be sent from the SAP application on an intranet to a printer on an extranet of an external client (e.g., customer or vendor). This structure is relies on router-to-router virtual private network communication between the intranet of the user and the extranet of the client (e.g., a vendor or a customer). However, in order for the communication to be successful, the printer on the extranet needs to maintain a static IP address to which print jobs can be sent. Also, having to allow a virtual private network access between the two networks may create security problems where too much access is granted by one or the other owner of the networks. In order to avoid such problems, both sides need to make sure permission granted to each other is configured correctly.

Another configuration that can be utilized to perform such a task (e.g., sending a confirmation letter to a customer or vendor) is a system in which a printout of a print job is obtained and manually faxed, via a facsimile line, to a facsimile machine of an external client. Such a system configuration requires maintaining a facsimile line and manually faxing the printout, and thus results in an increased communication cost.

The printing method of the system 3300 of FIG. 33 can be a push-type printing wherein the print jobs are sent to the print devices 3308 or 3309 as they become available (i.e. as they are received by the print service providing apparatus 3302) without any request by the external client networks 3310 or 3311. Alternatively, the printing method used can be a pull-type printing wherein the print job is stored with the print service providing apparatus 3302, and sent to the print devices 3308 or 3309 for printing only upon request.

With reference to FIG. 34, another system configuration for providing a cloud print service is described below.

System 3400 of FIG. 34 includes the Internet 3401, a visitor network 3402, a corporate network 3403, firewalls 3404 and 3405, a terminal 3406 (including a browser 3406*a*), a print service providing apparatus 3407, a print device 3408, printers 3409 and 3414, MFPs 3410-3413 and a client terminal 3415.

The configuration of the system 3400 is similar to that of the system 2600 of FIG. 26, with the addition of the client terminal 3415. Although not shown in FIG. 34, the configuration of the client terminal 3415 is similar to that of the terminal 3406 connected to the visitor network 3402. The client terminal 3415 preferably allows its user to access printing features that are available to corporate employees, such as, for example, the user interface for choosing a pick-up method when printing using user credentials (FIG. 3C).

Otherwise, the operations of the system 3400 are similar to those discussed in connection with the system 2600 of FIG. 26.

The aforementioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

Additional variations may be apparent to one of ordinary skill in the art from reading U.S. patent application Ser. No. 13/405,704, filed Feb. 27, 2012 and entitled "CLOUD PRINT SERVICE", the entire contents of which are incorporated herein by reference.

What is claimed is:

1. A system for providing cloud print service to guests and to users having user credentials, said system comprising:
a print service providing apparatus configured to receive a guest-submitted print job file from a guest terminal device via a network, register the received guest-submitted print job file in association with a release code, and send the release code through the network to the guest terminal device, and to receive and authenticate user credentials from a client terminal device and receive a credentialed print job from the client to final device via the network and store the credentialed print job in association with the received user credentials; and
a print apparatus including a user interface including a guest user interface part configured for user entry of the release code, and a credentialed user interface part configured for user entry of the user credentials, wherein
in a case that the release code is entered through the guest user interface part of the user interface of the print apparatus, the print apparatus requests the print service providing apparatus for the guest-submitted print job file associated with the release code, when the print apparatus receives the guest-submitted print job file from the print service providing apparatus, the print apparatus processes the guest-submitted print job file to generate a print output based on the processed guest-submitted print job file, and
in a case that the user credentials are entered through the credentialed user interface part of the user interface of the print apparatus, the print apparatus communicates the entered user credentials to the print service providing apparatus for authentication, and receives submitted job information indicating submitted jobs associated with the authenticated user credentials.

2. The system as claimed in claim 1, wherein
the print service providing apparatus provides a cloud print portal through which the guest terminal device accesses the cloud print service,
the guest-submitted print job file is uploaded to the print service providing apparatus through a browser application on the guest terminal device, and
the print service providing apparatus causes the browser application to display the release code associated with the guest-submitted print job file on the guest terminal device.

3. The system as claimed in claim 1, wherein
the guest-submitted print job file is uploaded to the print service providing apparatus through a mobile application on the guest terminal device, and the print service providing apparatus causes the mobile application to display the release code associated with the guest-submitted print job file on the guest terminal device.

4. The system as claimed in claim 1, wherein
the guest-submitted print job file is received in a print request e-mail from the guest terminal device to a predetermined e-mail address associated with the print apparatus, and
the print service providing apparatus sends the release code associated with the guest-submitted print job file by a reply e-mail to the guest terminal device.

5. The system as claimed in claim 1, further comprising:
an enterprise network within an enterprise environment;
a first firewall apparatus that filters access requests from external to the enterprise environment;
a visitor network within the enterprise environment; and
an internal firewall apparatus that filters access requests from h visitor network to resources on the enterprise network,
wherein the print apparatus is provided within the enterprise environment, the guest terminal device communicates with the cloud print service through the visitor network, and the client terminal device communicates with the cloud print service through the enterprise network.

6. The system as claimed in claim 5, wherein
the guest terminal device is configured to transmit a print request e-mail including the guest-submitted print job file through the visitor network and first firewall apparatus via the Internet to a specified address including domain, associated with the print apparatus, and
the print service providing apparatus is configured to process the print request e-mail including the guest-submitted print job file from the guest terminal device, and push the guest-submitted print job file to the print apparatus.

7. The system as claimed in claim 1, wherein
the print service providing apparatus is disposed external to the first firewall apparatus of the enterprise environment, and
the client terminal device includes a print driver thereon to access the cloud print service, and the print service providing apparatus receives the user credentials and the credentialed print job through the print driver on the guest terminal device.

8. The system as claimed in claim 1, wherein the client terminal device includes a print driver thereon to access the cloud print service, and the print driver provides a user interface for user selection, for pick-up of print job, of (a) entry of user credential or (b) entry of release code, at the print apparatus.

9. The system as claimed in claim, wherein the client terminal device includes a mobile application thereon to access the cloud print service, and
the print service providing apparatus causes the mobile application to display a user interface for user selection, for pick-up of print job, of (a) entry of user credential or (b) entry of release code, at the print apparatus.

10. The system as claimed in claim 1, wherein
the print service providing apparatus provides a cloud print portal for accessing the cloud print service through a browser application on the client terminal device, and
the print service providing apparatus causes the browser application to display a user interface for user selection, for pick-up of print job, of (a) entry of user credential or (b) entry of release code, at the print apparatus.

11. A system or providing a cloud print service outside of a firewall of an enterprise environment, comprising:
a print service providing apparatus disposed external to the firewall of the enterprise environment, and configured to receive and authenticate user credentials from a user terminal through a virtual private network and receive and upload a particular print job from the user terminal; and
a print apparatus connected to the user terminal through an external network that is external to the enterprise environment, the print apparatus being configured to communicate with the print service providing apparatus through a communication pathway that includes at least the external network and the Internet, wherein
the print service providing apparatus registers a network address in association with the print apparatus, and the print service providing apparatus communicates the uploaded print job to the print apparatus, to generate a print output by the print apparatus, and
the user terminal is disposed within the firewall of the enterprise environment.

12. The system as claimed in claim 11, wherein
the print service providing apparatus registers for each printed job of plural jobs printed by the print apparatus, job information of the printed job, including a number of pages printed, and
the print service providing apparatus tracks a total number of pages printed in the plural jobs.

13. The system as claimed in claim 11, wherein
the print service providing apparatus registers for the credentialed print job, after the credentialed print job is printed by the print apparatus, (i) the user credentials associated with the credentialed print job and (ii) printed job information including a number of pages printed in connection with the credentialed print job, and
the print service providing apparatus tracks a total number of pages printed in plural jobs associated with the user credentials.

14. A method performed by a print service providing apparatus for providing cloud print service to guests and to users having user credentials, said method comprising:
(a) providing a client user interface to a client terminal device for entry of user credentials and submission of a credentialed print job specified for a specific printer via a network, authenticating the user credentials, and storing the credentialed print job in association with h user credentials;
(b) receiving a guest-submitted print job file from a guest terminal device via the network, registering by a print service providing apparatus the received guest-submitted print job file in association with a release code for the specific printer, and sending the release code through the network to the guest terminal device;
(c) providing on the specific printer a user interface including a guest user interface part configured for user entry of the release code, and a credentialed user interface part configured for user entry of the user credentials; and
(d) processing the guest-submitted print job file to generate a print output by the specific printer based on the processed guest-submitted print job file, in a case that the release code is entered through the guest user interface part of the user interface of the specific printer; and
(e) displaying, through the user interface of the specific printer, job information indicating submitted jobs associated with the user credentials, in a case that the user credentials entered through the credentialed user interface part of the user interface of the specific printer are authenticated.

15. The method as claimed in claim 14, further comprising:
providing a cloud print portal through which the guest terminal device accesses the cloud print service,
wherein the guest-submitted print job file received in (b) was uploaded through a browser application on the guest terminal device; and
causing the browser application to display the release code that was sent in (b) to the guest terminal device and is associated with the guest-submitted print job file.

16. The method as claimed in claim 14, further comprising:
providing a mobile application on the guest terminal device;
wherein the guest-submitted print job file received in (b) was uploaded through the mobile application; and
causing the mobile application to display the release code that was sent in (b) to the guest terminal device and is associated with the guest-submitted print job file.

17. The method as claimed in claim 14, wherein
the guest-submitted print job file is received in (b) in a print request e-mail from the guest terminal device to a predetermined e-mail address associated with the specific printer, and
the release code associated with the guest-submitted print job file is sent in (b) by a reply e-mail to the guest terminal device.

18. The method as claimed in claim 14, wherein
the user interface provided on the specific printer in (c) comprises a cloud print service client was provided through a virtual private network to the specific printer, and
upon selection of the credentialed print job from the job information displayed through the user interface in (e), the print service providing apparatus causes the selected print job to be retrieved and processed by the specific printer, and causes the specific printer to generate a print output based on the processed print job.

19. The method as claimed in claim 14, further comprising:
registering for each printed job of plural jobs printed by the specific printer, printed job information of the printed job, including a number of pages printed; and
tracking a total number of pages printed in the plural jobs.

20. The method as claimed in claim 14, further comprising:
registering for the credentialed print job, after the credentialed print job is printed by the specific printer, (i) the user credentials associated with the credentialed print job and (ii) printed job information including a number of pages printed in connection with the credentialed print job, and
tracking a total number of pages printed in plural jobs associated with the user credentials.

* * * * *